(12) United States Patent
Khalid et al.

(10) Patent No.: US 9,241,062 B2
(45) Date of Patent: Jan. 19, 2016

(54) METHODS AND SYSTEMS FOR USING EXTERNAL DISPLAY DEVICES WITH A MOBILE COMPUTING DEVICE

(75) Inventors: Shafiqul Khalid, Redmond, WA (US); Daniel C. Benson, Lake Forest Park, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1004 days.

(21) Appl. No.: 12/469,623

(22) Filed: May 20, 2009

(65) Prior Publication Data

US 2010/0299436 A1    Nov. 25, 2010

(51) Int. Cl.
| | |
|---|---|
| G06F 15/173 | (2006.01) |
| G06F 15/16 | (2006.01) |
| H04M 1/725 | (2006.01) |
| G06F 1/16 | (2006.01) |
| G06F 3/0481 | (2013.01) |
| G06F 3/0486 | (2013.01) |
| G06F 3/0488 | (2013.01) |
| G06F 3/14 | (2006.01) |
| G06F 9/44 | (2006.01) |
| G09G 5/00 | (2006.01) |
| G09G 5/36 | (2006.01) |
| G09G 5/12 | (2006.01) |

(52) U.S. Cl.
CPC ........... *H04M 1/7253* (2013.01); *G06F 1/1643* (2013.01); *G06F 3/0481* (2013.01); *G06F 3/0486* (2013.01); *G06F 3/04886* (2013.01); *G06F 3/1415* (2013.01); *G06F 3/1454* (2013.01); *G06F 9/4445* (2013.01); *G09G 5/006* (2013.01); *G09G 5/363* (2013.01); *H04M 1/72527* (2013.01); *G06F 2203/04803* (2013.01); *G09G 5/12* (2013.01); *G09G 2340/145* (2013.01); *G09G 2360/06* (2013.01); *G09G 2370/16* (2013.01); *H04M 2250/16* (2013.01)

(58) Field of Classification Search
CPC . G06F 3/1454; G06F 3/04886; G06F 9/4445; G06F 1/1643; G06F 3/0486; G06F 3/1415; G06F 3/0481; G06F 2203/04803; G09G 5/006; G09G 5/363; G09G 5/12; G09G 2340/145; G09G 2360/06; G09G 2370/16; H04M 1/72527; H04M 1/7253; H04M 2250/16
USPC ................................................... 709/203, 226
See application file for complete search history.

(56) References Cited

U.S. PATENT DOCUMENTS

| | | | | |
|---|---|---|---|---|
| 5,831,664 | A  * | 11/1998 | Wharton et al. | 725/81 |
| 7,580,005 | B1 * | 8/2009 | Palin | 345/1.1 |
| 7,996,461 | B1 * | 8/2011 | Kobres et al. | 709/204 |

(Continued)

OTHER PUBLICATIONS

Server. Microsoft® Computer Dictionary, Fifth Edition [online]. Microsoft Press, May 1, 2002. Retrieved on Mar. 14, 2011. Retrieved from the Internet: <URL:http://proquest.safaribooksonline.com/0735614954>.*

*Primary Examiner* — Philip Chea
*Assistant Examiner* — Wing Ma
(74) *Attorney, Agent, or Firm* — Foley & Lardner LLP; John D. Lanza

(57) ABSTRACT

The present disclosure relates to methods and systems for using external display devices with a mobile computing device. The mobile computing device may be repurposed to display a virtual input device for interacting with a resource with output data being displayed on an external display device.

20 Claims, 38 Drawing Sheets

(56) References Cited

U.S. PATENT DOCUMENTS

| | | | |
|---|---|---|---|
| 2003/0122856 A1* | 7/2003 | Hubbard | 345/700 |
| 2003/0137539 A1* | 7/2003 | Dees | 345/762 |
| 2003/0179243 A1* | 9/2003 | Numano | 345/782 |
| 2004/0064593 A1* | 4/2004 | Sinclair et al. | 709/250 |
| 2004/0235463 A1* | 11/2004 | Patel | 455/418 |
| 2005/0010877 A1* | 1/2005 | Udler | 715/826 |
| 2005/0080915 A1* | 4/2005 | Shoemaker et al. | 709/231 |
| 2005/0091302 A1* | 4/2005 | Soin et al. | 709/200 |
| 2006/0026535 A1* | 2/2006 | Hotelling et al. | 715/863 |
| 2006/0031400 A1* | 2/2006 | Yuh et al. | 709/218 |
| 2006/0033724 A1* | 2/2006 | Chaudhri | G06F 3/0482 345/173 |
| 2006/0069750 A1* | 3/2006 | Momtchilov et al. | 709/219 |
| 2006/0079214 A1* | 4/2006 | Mertama et al. | 455/414.1 |
| 2006/0179118 A1* | 8/2006 | Stirbu | 709/217 |
| 2006/0184614 A1* | 8/2006 | Baratto et al. | 709/203 |
| 2006/0206827 A1* | 9/2006 | DeWitt | 715/762 |
| 2007/0042807 A1* | 2/2007 | Khoo | G06F 3/0238 455/557 |
| 2007/0061488 A1* | 3/2007 | Alagappan et al. | 709/246 |
| 2007/0150822 A1* | 6/2007 | Mansour et al. | 715/762 |
| 2007/0203968 A1* | 8/2007 | Jung et al. | 709/200 |
| 2007/0271525 A1* | 11/2007 | Han et al. | 715/786 |
| 2008/0016187 A1* | 1/2008 | Neil et al. | 709/220 |
| 2008/0082603 A1* | 4/2008 | Mansour et al. | 709/203 |
| 2008/0098006 A1* | 4/2008 | Pedersen et al. | 707/10 |
| 2008/0284907 A1* | 11/2008 | Chiao | 348/448 |
| 2008/0285857 A1* | 11/2008 | Sharan | G06F 3/0237 382/209 |
| 2009/0070098 A1* | 3/2009 | Patryshev | 704/3 |
| 2009/0094523 A1* | 4/2009 | Treder et al. | 715/738 |
| 2009/0100129 A1* | 4/2009 | Vigil et al. | 709/203 |
| 2009/0195556 A1* | 8/2009 | Turcotte | G09G 5/003 345/629 |
| 2010/0011299 A1* | 1/2010 | Brodersen et al. | 715/740 |
| 2010/0138780 A1* | 6/2010 | Marano et al. | 715/804 |
| 2010/0197353 A1* | 8/2010 | Marui | G06F 3/04886 455/566 |
| 2010/0222102 A1* | 9/2010 | Rodriguez | 455/557 |
| 2010/0261466 A1* | 10/2010 | Chang et al. | 455/420 |
| 2010/0268813 A1* | 10/2010 | Pahlavan et al. | 709/224 |
| 2010/0268941 A1* | 10/2010 | Pahlavan et al. | 713/155 |
| 2010/0269152 A1* | 10/2010 | Pahlavan | G06F 9/4445 726/3 |
| 2010/0302141 A1* | 12/2010 | Shankar et al. | 345/156 |
| 2011/0113121 A1* | 5/2011 | Sarkar | 709/218 |
| 2011/0199389 A1* | 8/2011 | Lu | G06F 3/017 345/619 |
| 2012/0089992 A1* | 4/2012 | Reeves et al. | 719/318 |
| 2012/0204115 A1* | 8/2012 | Barrett | 715/744 |

* cited by examiner

METHODS AND SYSTEMS FOR USING EXTERNAL DISPLAY DEVICES WITH A MOBILE COMPUTING DEVICE

FIELD OF THE INVENTION

The present disclosure relates to methods and systems for using external display devices with a mobile computing device. When an external display device is connected or attached to a mobile computing device, output data associated with a resource executing on the mobile computing device may be displayed on the external display device. The output data may include a user interface appropriate for the display of the external display device. Execution of the resource may be transferred from the mobile computing device to the external display device. The mobile computing device may be repurposed to display a virtual input device for interacting with a resource with output data being displayed on an external display device.

BACKGROUND OF THE INVENTION

With the pervasiveness of computers, network access, and Internet usage in daily personal and business-related activities, many users desire mobility and flexibility in their computing activities. As users physically move from location to location, and shift from activity to activity, they typically seek convenience and familiarity in performing computing activities. Users may carry one or more mobile computing devices—such as a smartphone, personal digital assistant, laptop or notebook computer—to provide a personalized computing experience as they move from location to location. Many users also use a portable storage device, such as a flash drive, to carry files, documents or applications in a convenient and portable manner. With such a storage device, a user accesses desired files or documents from publicly available computers to which the portable storage device can connect.

Many widely available modern computer desktop applications include rich graphical user interfaces (GUI) that have been developed for use on conventional personal computers, workstations, laptops, or other computing devices, typically have large displays, keyboard and mouse, etc. In contrast, mobile devices are often designed to be small enough to fit in a pocket, have relatively small displays, and some (often limited) means for data input such as telephone keypad, full keyboard, touch screen, stylus, etc. When it comes to supporting desktop or enterprise applications on mobile devices, limiting factors include the small display size and meager computational capacity. Various methods have been developed to run some desktop applications on mobile devices, but the results typically range from cumbersome and clumsy to not feasible or cost-prohibitive. The most common examples include rewriting applications, in whole or in part, to accommodate mobile device limitations, providing limited or "lite" versions of applications, scaling the application's graphics to fit on the mobile device display, and using zooming and scrolling to turn the mobile device display into a "virtual lens" to view sub-regions of the application at a time.

BRIEF SUMMARY OF THE INVENTION

By enabling mobile computing devices to leverage external display devices, users may continue to benefit from a small form factor device's portability and convenience without sacrificing quality of display or resource capabilities. Transferring a resource's display from a mobile computing device to an external display device and selecting a user interface optimized for the external display can greatly improve a user's comfort and ease while using the resource. Repurposing the mobile computing device as an input device for the external display minimally disrupts a user's work since the repurposing eliminates the need to obtain and configure additional devices that interact with the external display device. Further, by accessing the external display device's superior computational capacity, a user may run resources with complex and desired features without being constrained by the mobile computing device's own limitations.

In one aspect, a method for displaying, on an external display device connected to a mobile computing device, output data associated with at least one resource. The method includes the step of receiving, by a virtual graphics driver on the mobile computing device, an identification of an external display device connected to the mobile computing device. The method includes the step of selecting, by a window management service on the mobile computing device according to the identification, at least one resource to display on the external display device. The method includes the step of positioning, by the window management service, output data associated with the at least one resource in a virtual screen space. The method includes the step of transmitting, by the virtual graphics driver, the output data to the external display device according to the virtual screen space.

In some embodiments, the method includes the step of allocating, by the window management service, a screen space corresponding to the external display device in the virtual screen space according to the identification. In some embodiments, the method includes the step of allocating, by the window management service, the screen space corresponding to the external display device according to a resolution of the external display device. In some embodiments, the method includes the step of removing, by the window management service, output data associated with the at least one resource from a position in the virtual screen space corresponding to a native display of the mobile computing device. In some embodiments, the method includes the step of positioning, by the window management service, the output data in the virtual screen space according to a type of the resource. In some embodiments, the method includes the step of positioning, by the window management service, the output data in the virtual screen space according to a user association between the resource and a cell in a grid display layout. In some embodiments, the method includes the step of positioning, by the window management service, the output data in the virtual screen space according to a policy associated with cells in a grid display layout. In some embodiments, the method includes the step of re-positioning, by the window management service, the output data in the virtual screen space according to an alteration of a grid display layout. In some embodiments, the method includes the step of positioning, by the window management service, the output data in the virtual screen space according to a user command to display the output data in an empty cell. In some embodiments, the method includes the step of positioning, by the window management service, the output data in the virtual screen space according to a policy associated with a dynamic display layout. In some embodiments, the method includes the step of positioning, by the window management service, the output data in the virtual screen space according to a default position associated with the resource. In some embodiments, the method includes the step of receiving, by the window management service, information associated with a user interaction with the output data. In some embodiments, the method includes the step of re-positioning, by the window management service, the output data according to the information associated with the user interaction. In some embodiments, the method includes the step of re-positioning, by the window management service, the output data to a position in the virtual screen space corresponding to a native display of the mobile computing device or a different external display device. In some embodiments, the method includes the step of obscuring, by the window management service, output data associated with a different resource. In some embodiments, the method includes the step of re-sizing, by the window management service, the output data associated with the resource.

In another aspect, a mobile computing device for displaying output data associated with at least one resource on an external display device. The mobile computing device also includes a window management service that selects, according to an identification of the external display device, the at least one resource to display on the external display device and positions output data associated with the at least one resource in a virtual screen space. The mobile computing device also includes a virtual graphics driver that transmits the output data to the external display device according to the virtual screen space. In some embodiments, the window management service allocates a screen space corresponding to the external display device in the virtual screen space according to the identification. In further embodiments, the window management service allocates a screen space corresponding to the external display device in the virtual screen space according to a resolution of the external display device. In additional embodiments, the window management service removes output data associated with the at least one resource from a position in the virtual screen space corresponding to a native display of the mobile computing device.

In yet another aspect, a method for displaying, on an external display device connected to a mobile computing device, a user interface for a resource. The method includes the step of receiving from the resource, by a window management service on the mobile computing device, a first user interface for display on a native display of the mobile computing device. The method also includes the step of transmitting, by a virtual graphics driver on the mobile computing device, the first user interface to the native display. The method also includes the step of transmitting, by the window management service, an identification of the external display device to the resource. The method also includes the step of receiving from the resource, by the window management service, a second user interface according to the identification, the second user interface being distinct from the first user interface. The method also includes the step of transmitting, by the virtual graphics driver, the second user interface to the external display device.

In some embodiments, the method includes the step of receiving from the resource, by the window management service, the second user interface optimized for the external display device. In more embodiments, the method includes the step of transmitting, by the window management service, at least one property of the external display device to the resource. In additional embodiments, the method includes the step of transmitting, by the window management service, an indication that a display on the external display device has a larger resolution or size than the native display. In many embodiments, the method includes the step of receiving from the resource, by the window management service, a default user interface in the absence of a user interface optimized for the external display device. In various embodiments, the method includes the step of receiving from the resource, by the window management service, a communication that a user interface optimized for the external display device is unavailable. In some embodiments, the method includes the step of transmitting, by the window management system, an identification of the second user interface and an instruction to display the second user interface to the external display device.

In another aspect, a method for transferring execution of a virtualized resource from a mobile computing device to an external display device. The method also includes the step of receiving, by a server from the mobile computing device, an identification of an external display device connected to the mobile computing device. The method also includes the step of identifying, by the server, a virtual machine being delivered to the external display device. The method also includes the step of disconnecting, by the server, the virtualized resource from a virtual machine being delivered to the mobile computing device. The method also includes the step of connecting, by the server, the virtualized resource to the virtual machine being delivered to the external display device.

In some embodiments, the virtualized resource is a virtualized application. In some embodiments, the method includes the step of transferring, by the server, information related to the state of execution of the virtualized resource from the virtual machine being to delivered to the mobile computing device to the virtual machine being delivered to the external display device.

In another aspect, a method of repurposing a mobile computing device as a virtual input device for a first resource being displayed on an external display device. The method also includes the step of evaluating, by the server, input capabilities of the mobile computing device and input needs of the first resource. The method also includes the step of delivering according to the evaluation, by the server to the mobile computing device, a second resource that generates a virtual input device.

In some embodiments, the method includes the step of delivering, by the server to the mobile computing device, the second resource that generates a virtual keyboard, virtual track pad, virtual pointing device, virtual camera, virtual microphone, virtual point-of-sale device, virtual speaker, virtual headphone jack, or any combination thereof. In many embodiments, the method includes the step of delivering, by the server to the mobile computing device, the second resource that allows user interaction with output data of the first resource. In various embodiments, the method includes the step of delivering, by the server to the mobile computing device, the second resource that transmits an identification of a user interaction with the virtual input device to the first resource. In additional embodiments, the method includes the step of delivering, by the server to the mobile computing device, the second resource that generates at least one user interaction element. In some embodiments, the method includes the step of delivering, by the server to the mobile computing device, the second resource that redirects user interactions with the virtual input device to the input capabilities of the mobile computing device. In many embodiments, the method includes the step of delivering, by the server to the mobile computing device, the second resource that correlates a location of a touch input with a displayed user interaction element. In various embodiments, the method includes the step of delivering, by the server to the mobile computing device, a third resource that generates another virtual input device in conjunction with the virtual input device of the second resource. In some embodiments, the method includes the step of delivering, by the server to the mobile computing device, the second resource for display in conjunction with the first resource on a single display surface. In various embodiments, the method includes the step of delivering, by the server to the mobile computing device, the second resource that generates a virtual input device for a second external device connected to the mobile computing device.

In another aspect, a system for repurposing a mobile computing device as a virtual input device for a first resource being displayed on an external display device. The system also includes a server that evaluates input capabilities of the mobile computing device and input needs of the first resource and delivers to the mobile computing device, according to the evaluation, a second resource that generates a virtual input device.

In many embodiments, the second resource generates a virtual keyboard, virtual track pad, virtual pointing device, virtual camera, virtual microphone, virtual point-of-sale device, virtual speaker, virtual headphone jack, or any combination thereof. In some embodiments, the second resource allows user interaction with output data of the first resource. In additional embodiments, the second resource transmits an identification of a user interaction with the virtual input device to the first resource. In various embodiments, the second resource generates at least one user interaction element. In some embodiments, the second resource redirects user interactions with the virtual input device to the input capabilities of the mobile computing device. In many embodiments, the second resource correlates a location of a touch input with a displayed user interaction element. In many embodiments, the server delivers a third resource that generates another virtual input device in conjunction with the virtual input device of the second resource. In various embodiments, the second resource is displayed in conjunction with the first resource on a single display surface. In several embodiments, the second resource generates a virtual input device for a second external device connected to the mobile computing device.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

TABLE OF CONTENTS

Figure 1A:
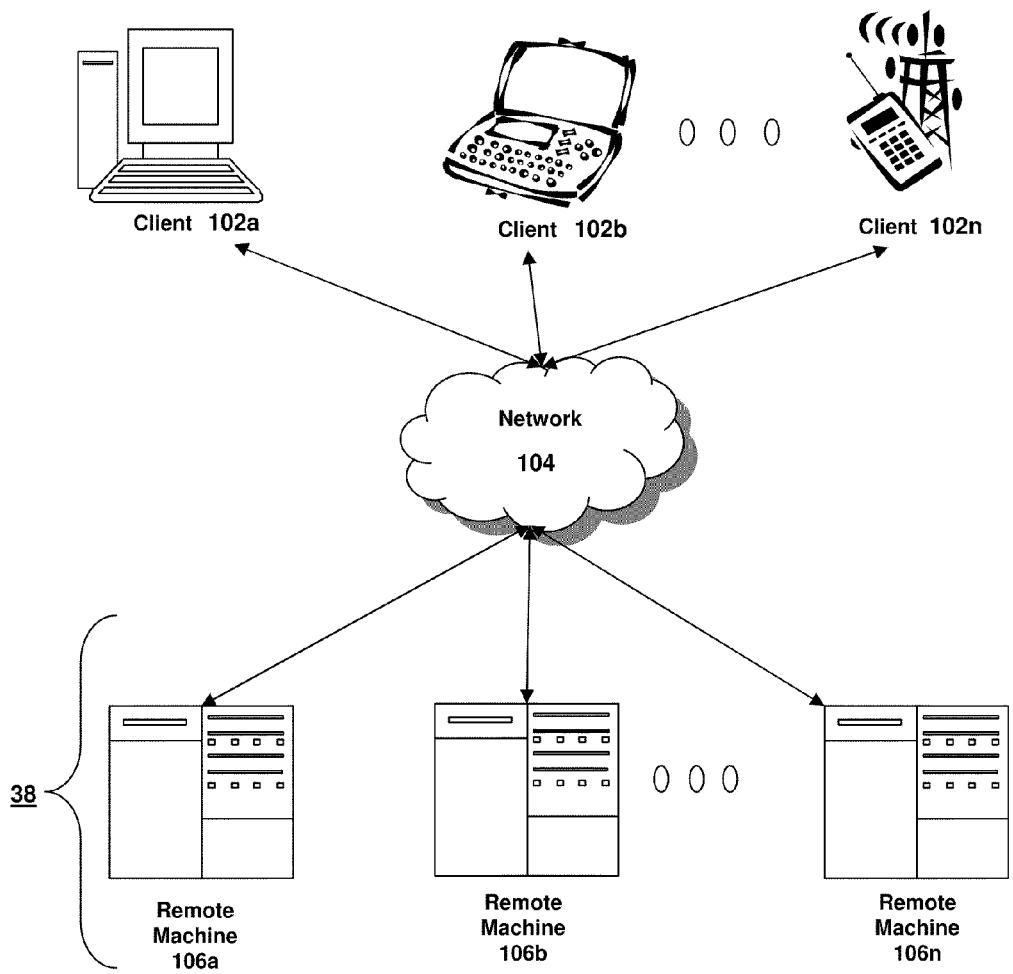
FIG. 1A is a block diagram depicting an embodiment of a network environment comprising client machines in communication with remote machines.
Figure 1B:
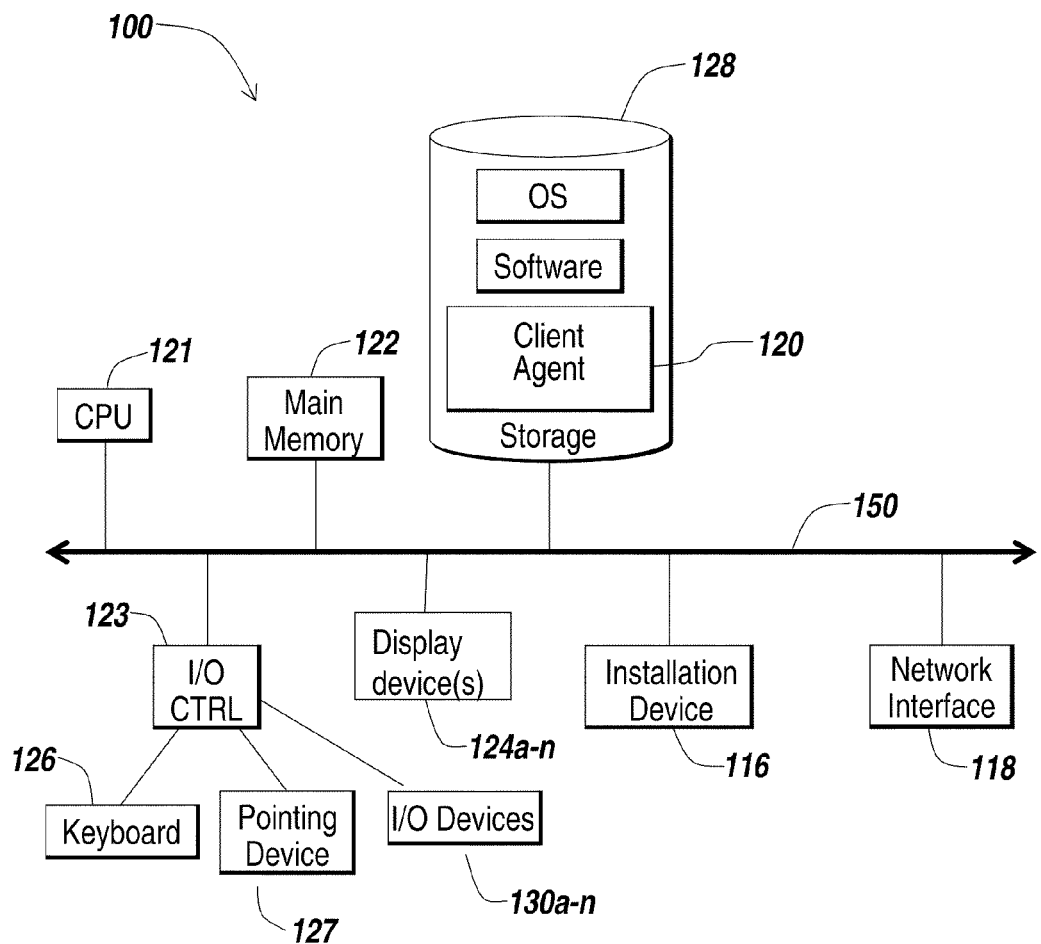
FIGS. 1B and 1C are block diagrams depicting embodiments of computers useful in connection with the methods and systems described herein.
Figure 1C:
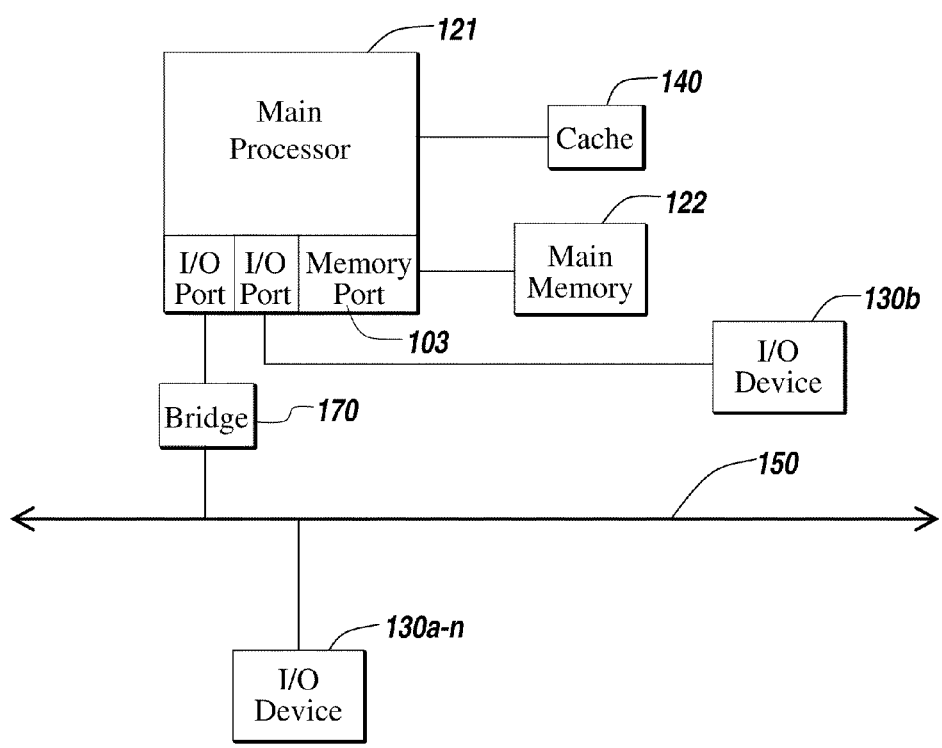
Figure 5A:
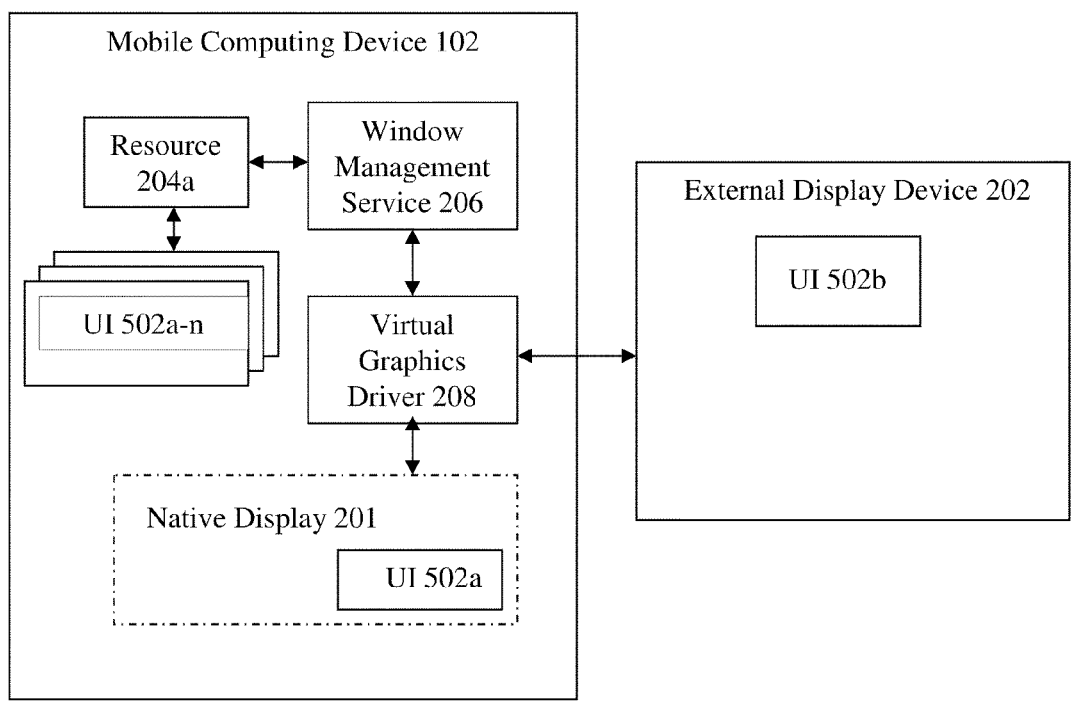
FIG. 5A is a block diagram depicting one embodiment of a system for displaying, by an external display device, a first user interface to a resource distinct from a second user interface to the resource displayed by a mobile computing device executing the resource.
Figure 5B:
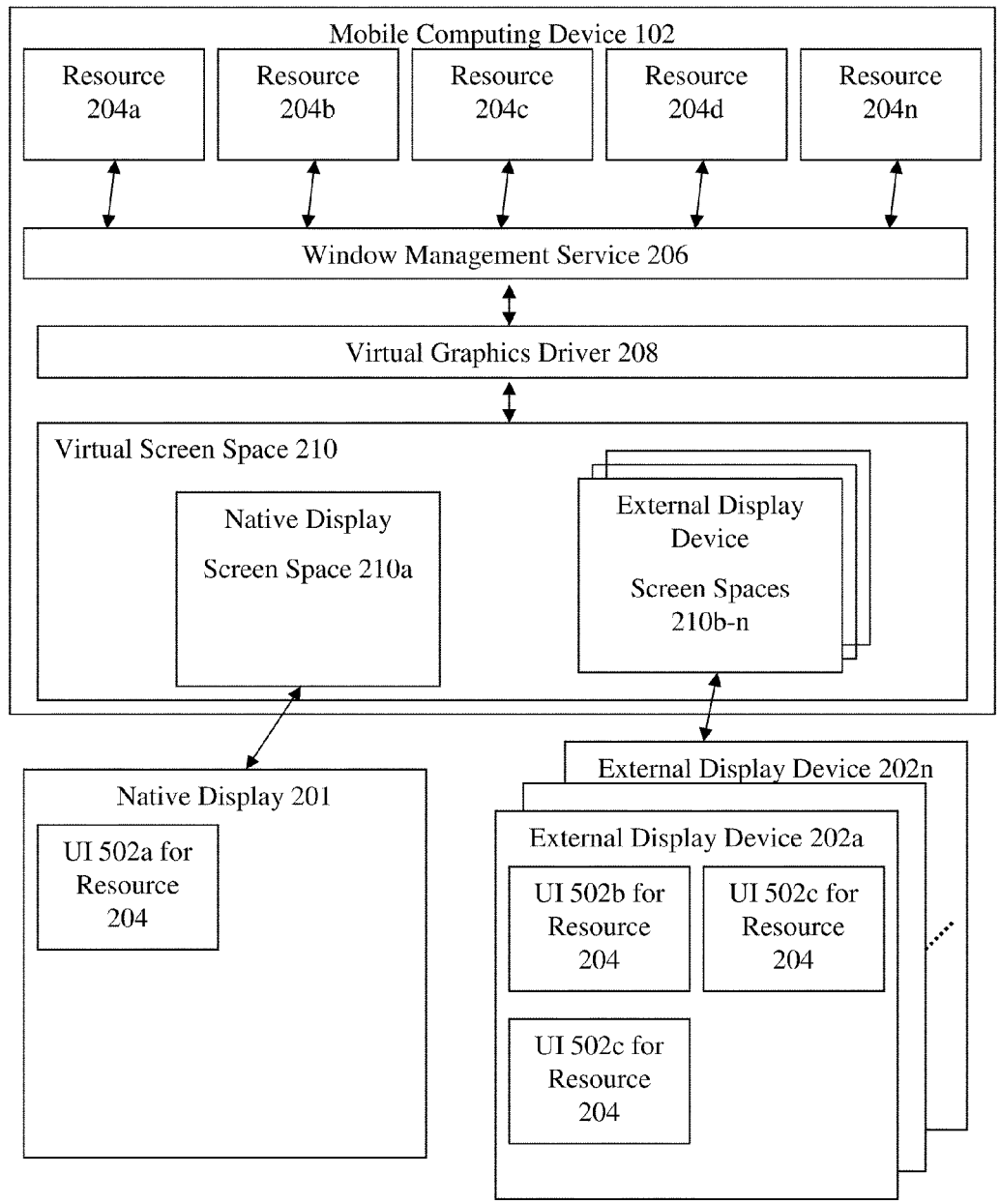
FIG. 5B is a block diagram depicting a system for mapping a display of one or more user interfaces to one or more display devices.
Figure 5C:
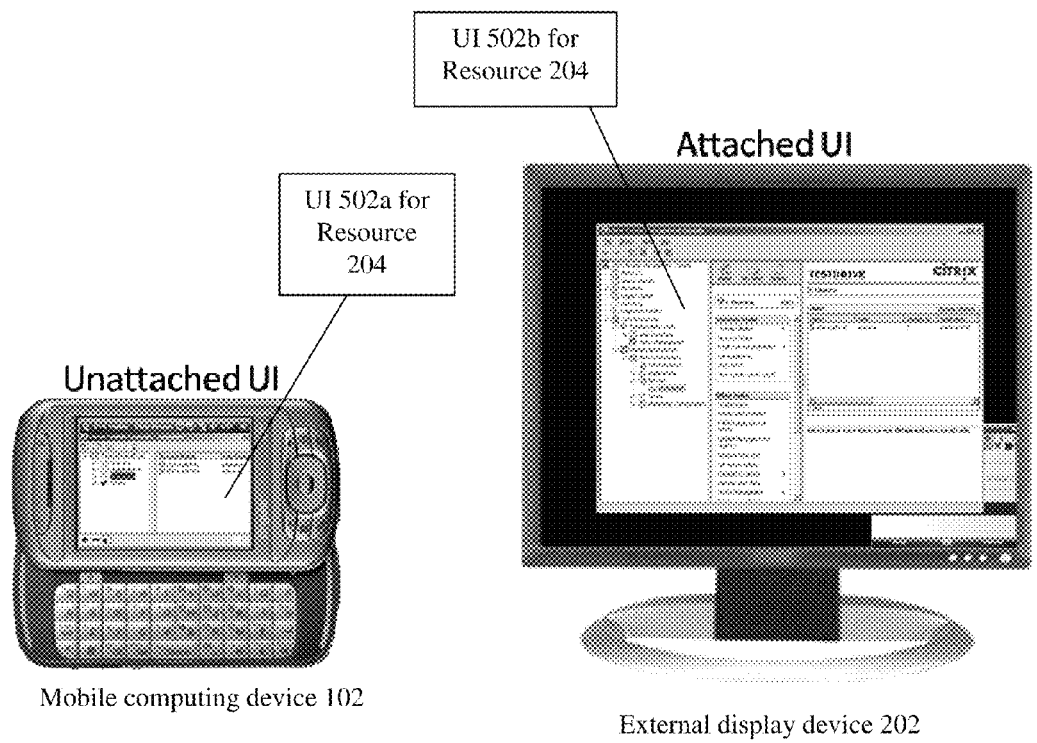
FIG. 5C is a screen shot depicting one embodiment of a system for displaying, by an external display device, a first user interface to an application distinct from a second user interface to the application displayed by a mobile computing device executing the application.
Figure 6:
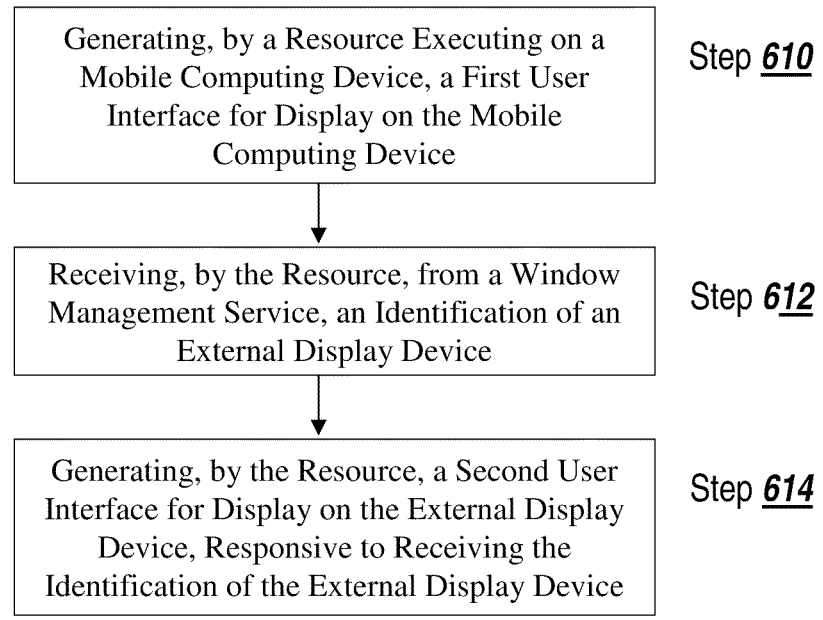
FIG. 6 is a flow diagram depicting an embodiment of the steps taken in a method for displaying, by an external display device, a first user interface to a resource distinct from a second user interface to the resource displayed by a mobile computing device executing the resource.
Figure 7A:
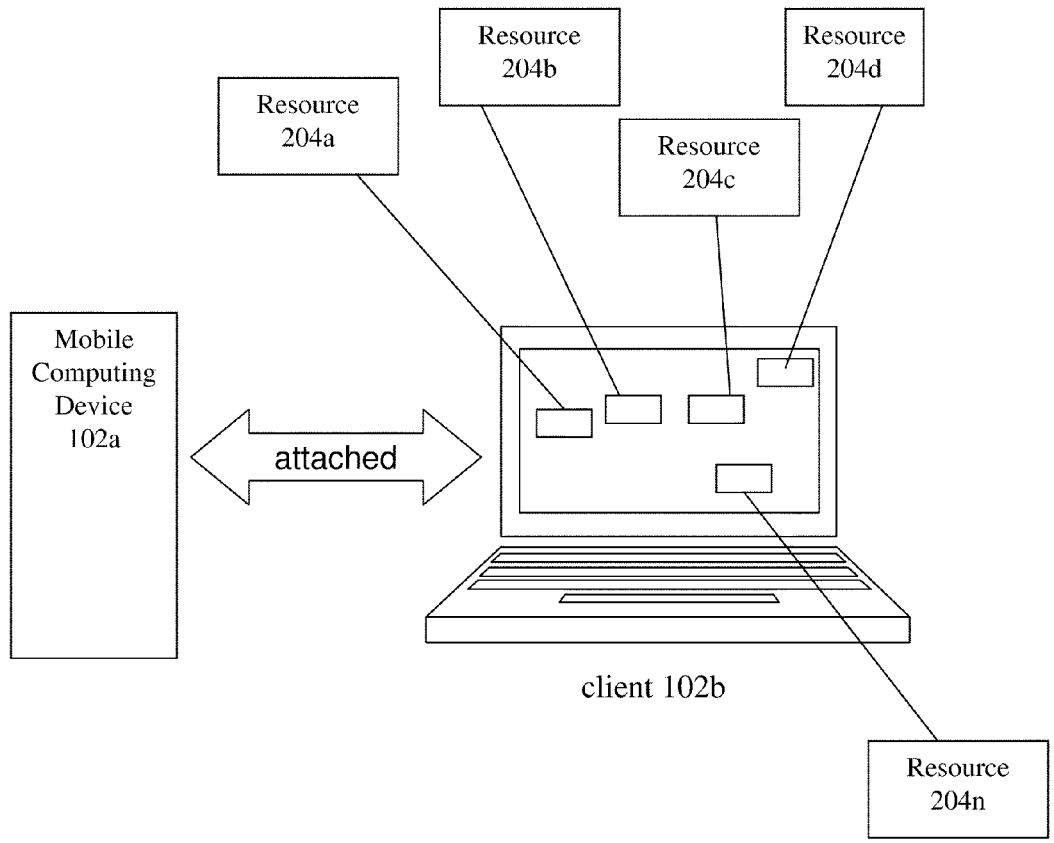
FIG. 7A is a block diagram depicting one embodiment of a system for executing and displaying a plurality of resources on a client computing device.
Figure 7B:
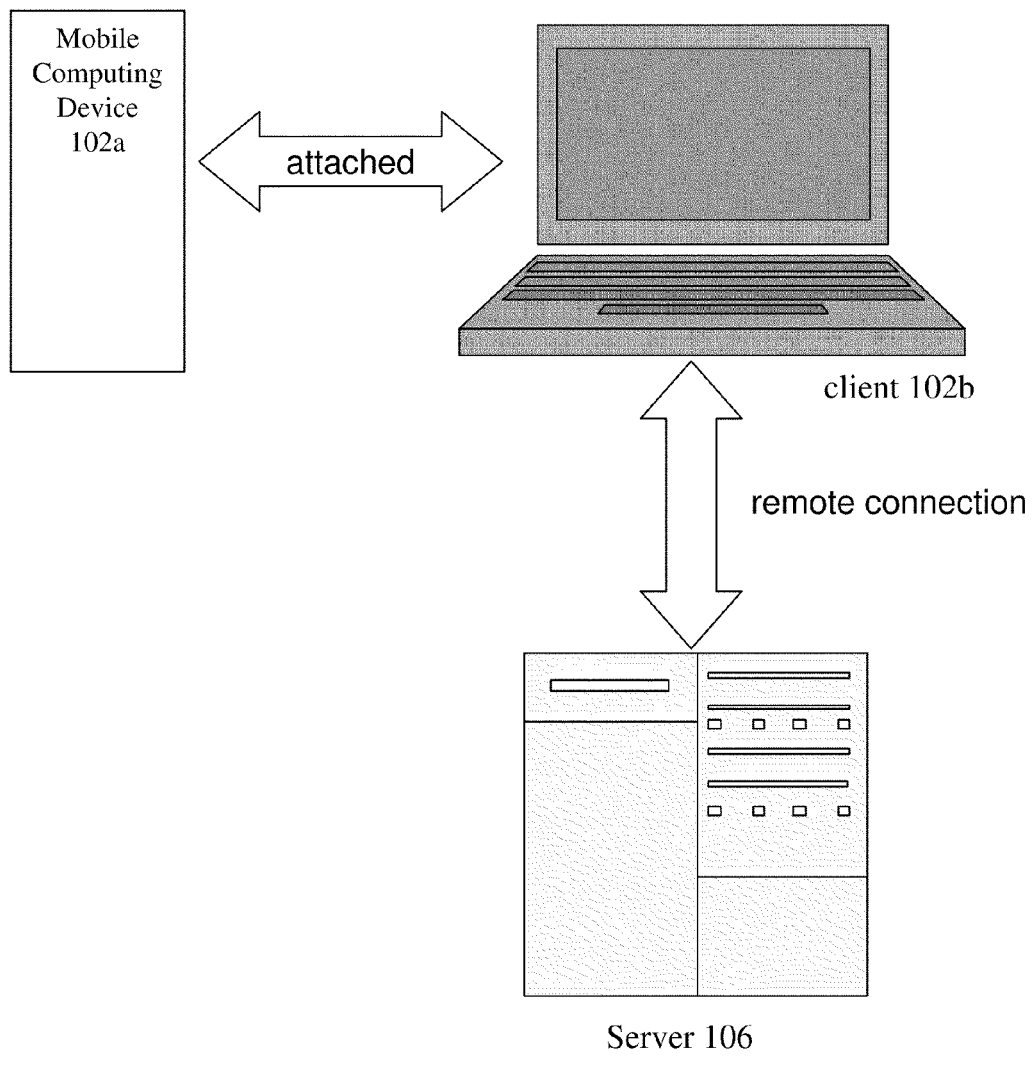
FIG. 7B is a block diagram depicting one embodiment of a system for executing a plurality of resources on a server and displaying them on a client computing device.
Figure 8A:
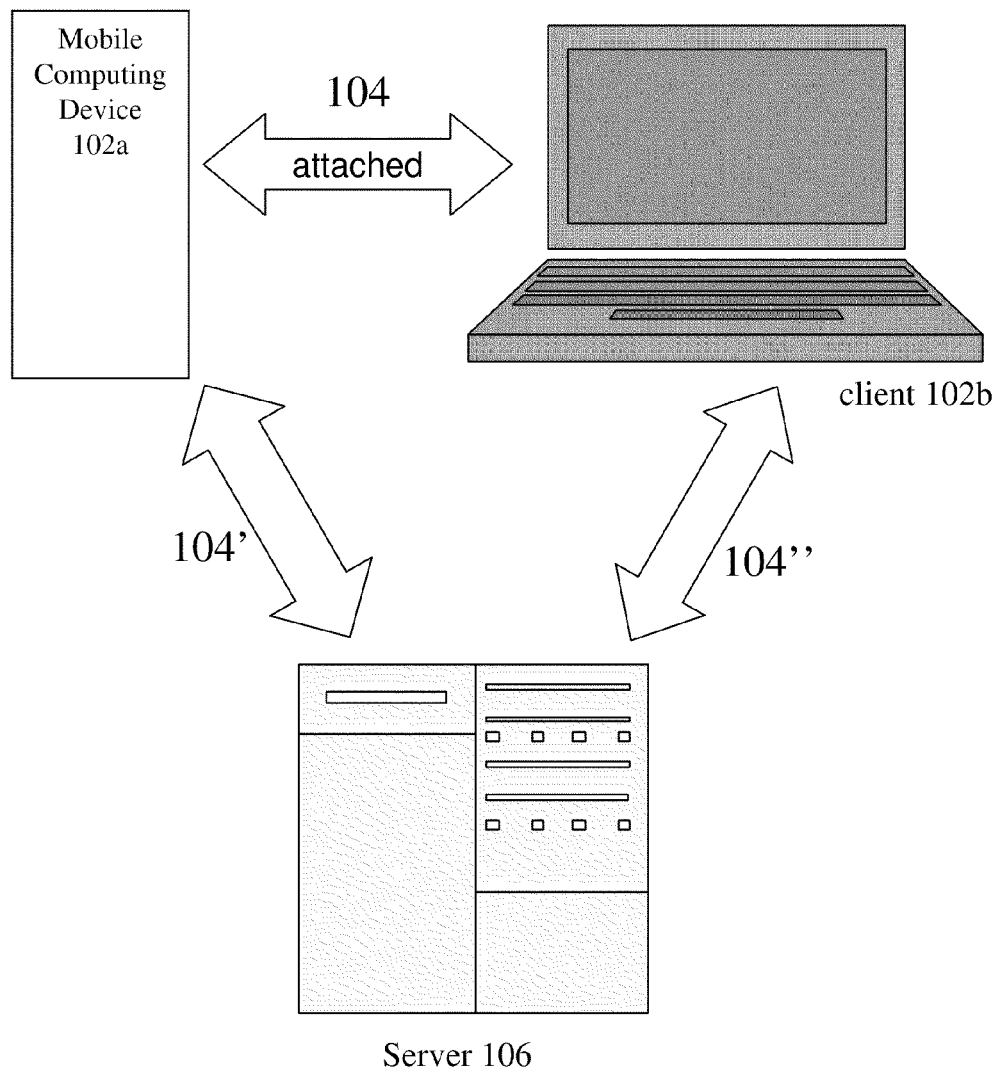
FIG. 8A is a block diagram of one embodiment of a system for executing a plurality of resources from a mobile computing device on a remote server and displaying results on a client computing device.
Figure 8B:
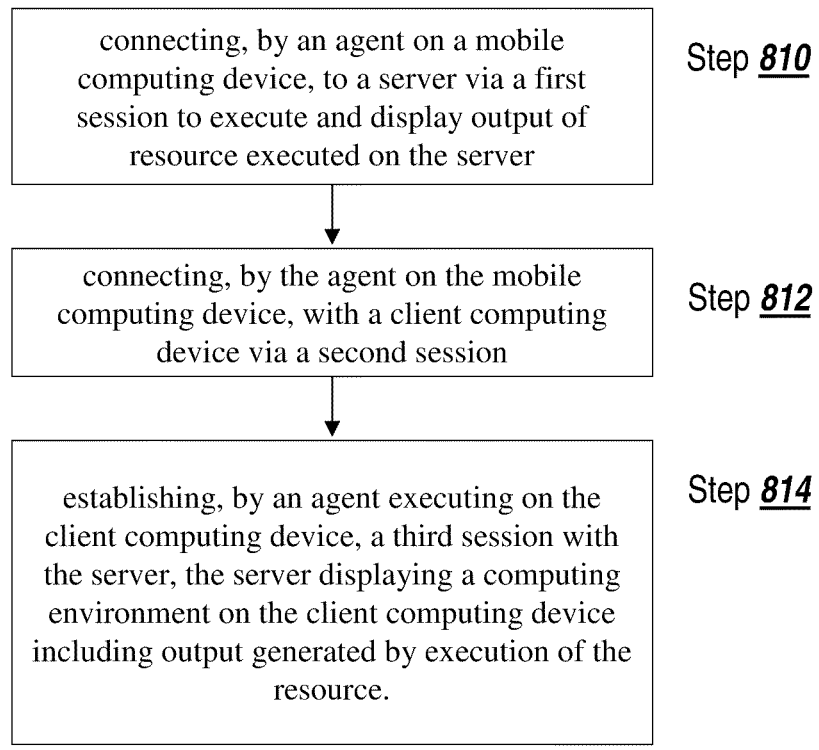
FIG. 8B is a flow diagram depicting one embodiment of the steps taken in a method for executing a plurality of resources from a mobile computing device on a remote server and displaying results on a client computing device.
Figure 9A:
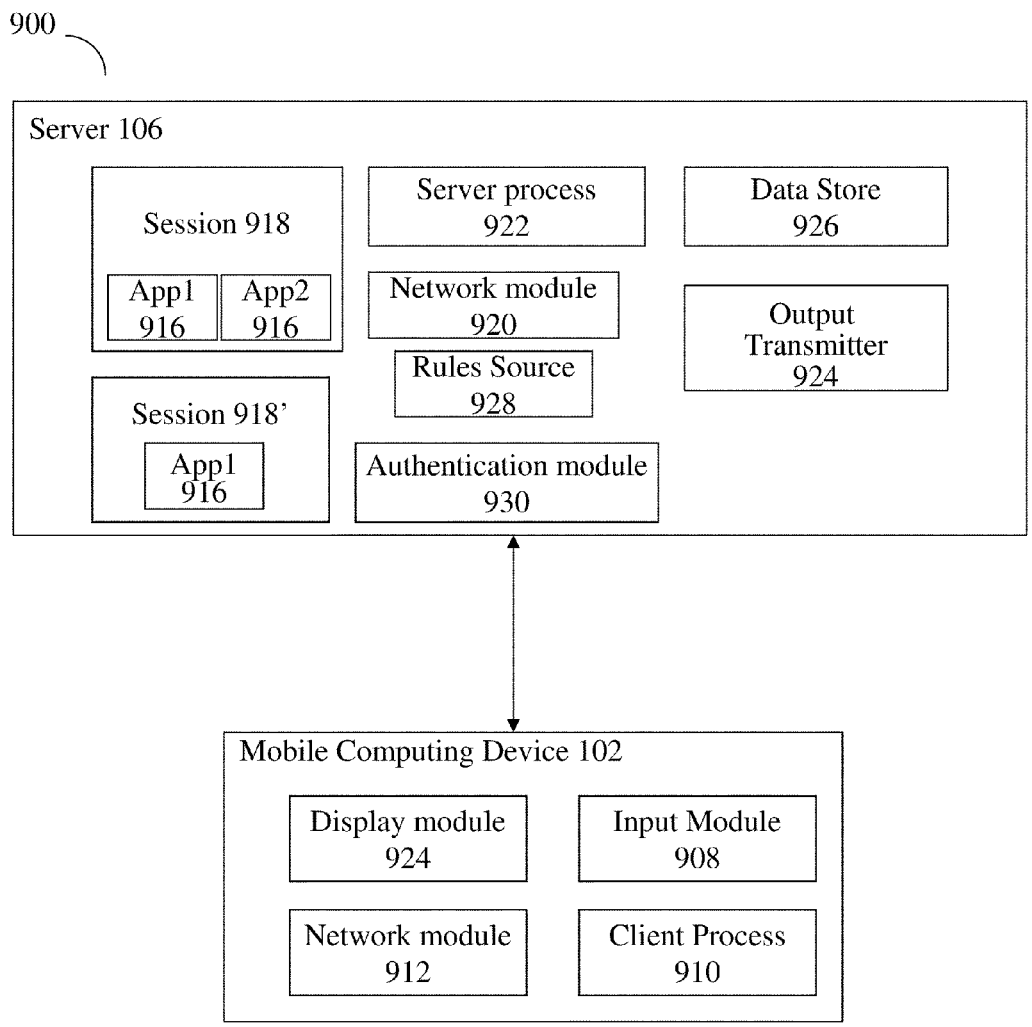
FIG. 9A is a block diagram depicting one embodiment of a server for displaying and activating disconnected sessions with a mobile computing device and/or a client computing device.
Figure 9B:
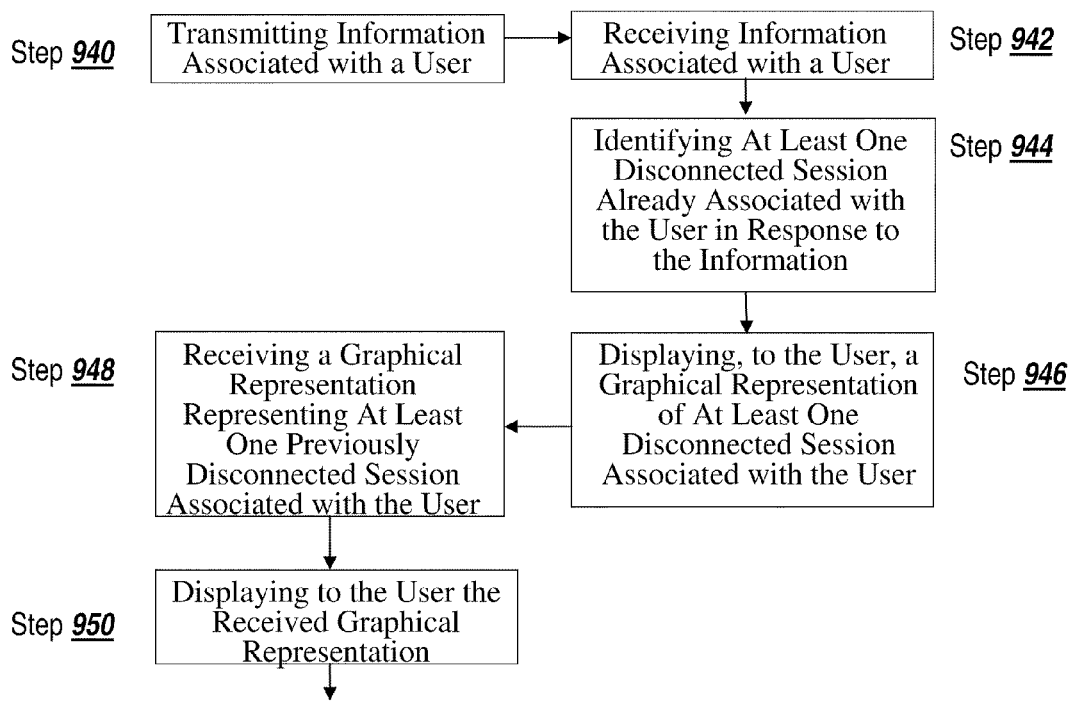
FIG. 9B is a flow diagram depicting an embodiments of the steps taken in a method for receiving output data generated by the at least one previously disconnected session.
Figure 9C:
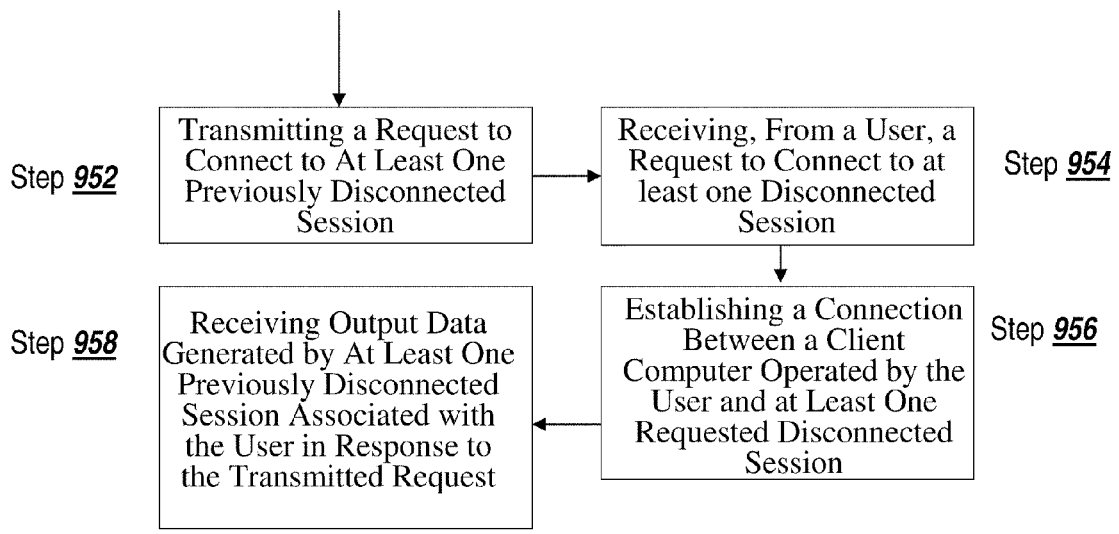
FIG. 9C is a flow diagram depicting one embodiment of the steps taken in a method for displaying and activating disconnected sessions with a mobile computing device and/or a client computing device.

FIGS. 1A-1C relate to general computing devices and networks;

FIGS. 2A-4E relate to methods and systems for displaying resources executing on a mobile computing device in a user configurable layout on an external display;

FIGS. 5A-6 relate to dynamic switching between user interfaces;

FIGS. 7A-7B relate to methods and systems for displaying on a client computing device, output data generated by resources executed on the client computing device or a server;

FIGS. 8A-8B relate to methods and systems for displaying on a client computing device, output data generated by resources executed on a mobile computing device;

FIGS. 9A-9C relate to methods and systems for handling disconnected sessions between one or more of computing devices (included to support workspace control/smooth roaming aspects of a mobile computing device communicating with a server); and FIGS. 10A-13 relate to methods and systems for generating a computing environment on one or more remote machines and displaying them on a local machine (included to provide support for combining Nirvana techniques with reverse seamless subject matter).

Figure 14A:
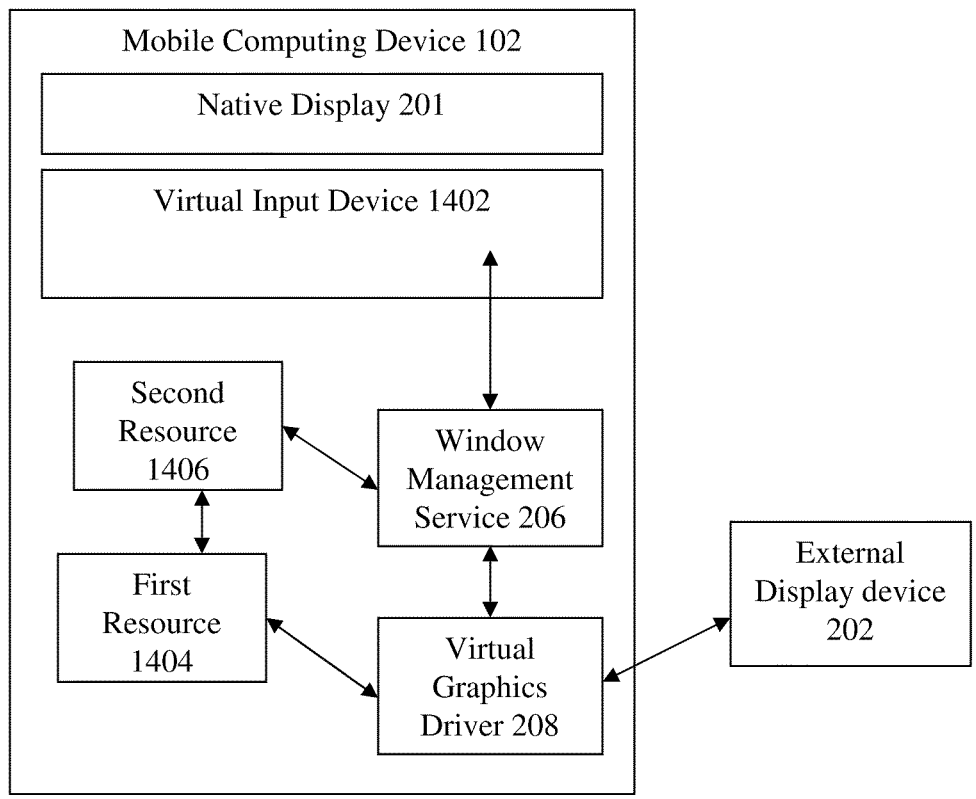
FIG. 14A is a block diagram depicting one embodiment of a system for displaying, on a screen of a mobile computing device, a virtual input device for interacting with a resource generating output data displayed on a display surface external to the mobile computing device.
Figure 14B:
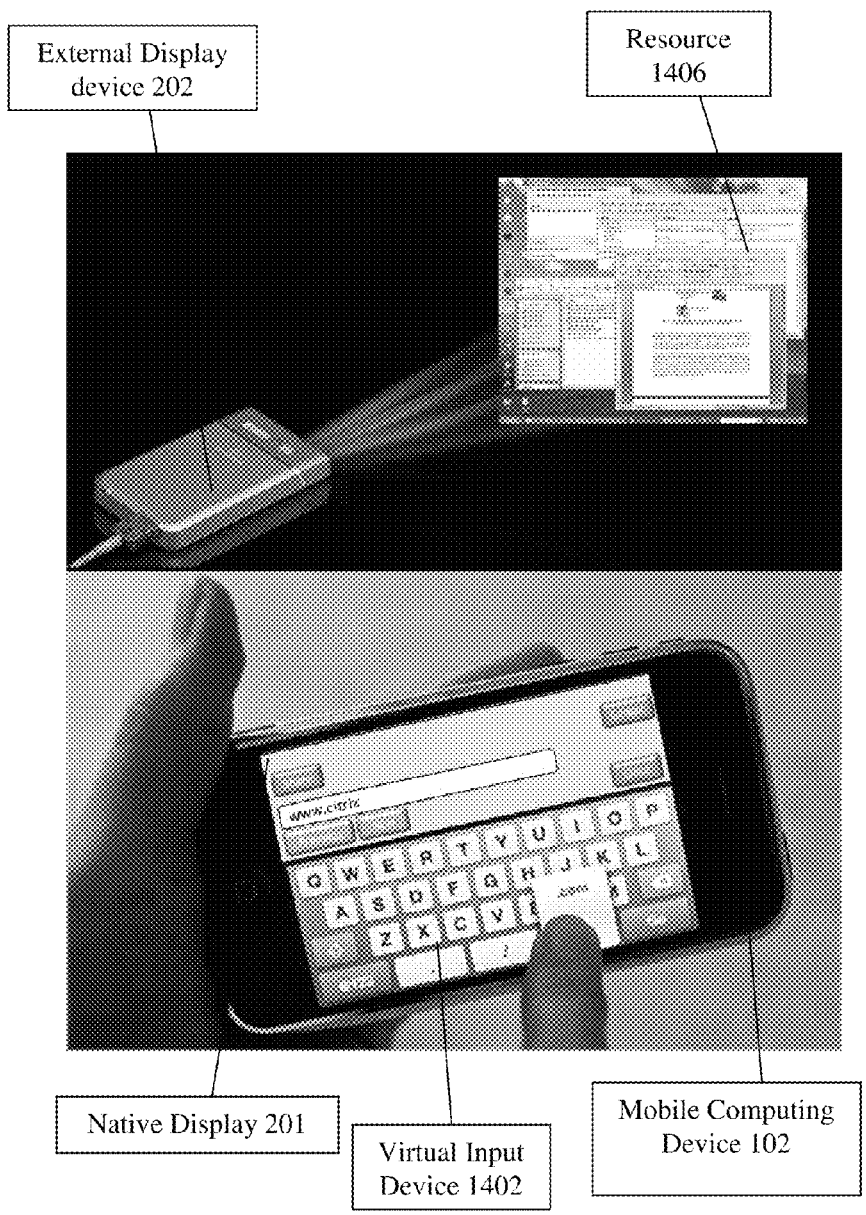
FIGS. 14B and 14C are screen shots depicting an embodiment of a mobile computing device displaying a virtual input device for interaction by a user of the mobile computing device with a display of output data generated by an execution of a resource.
Figure 14C:
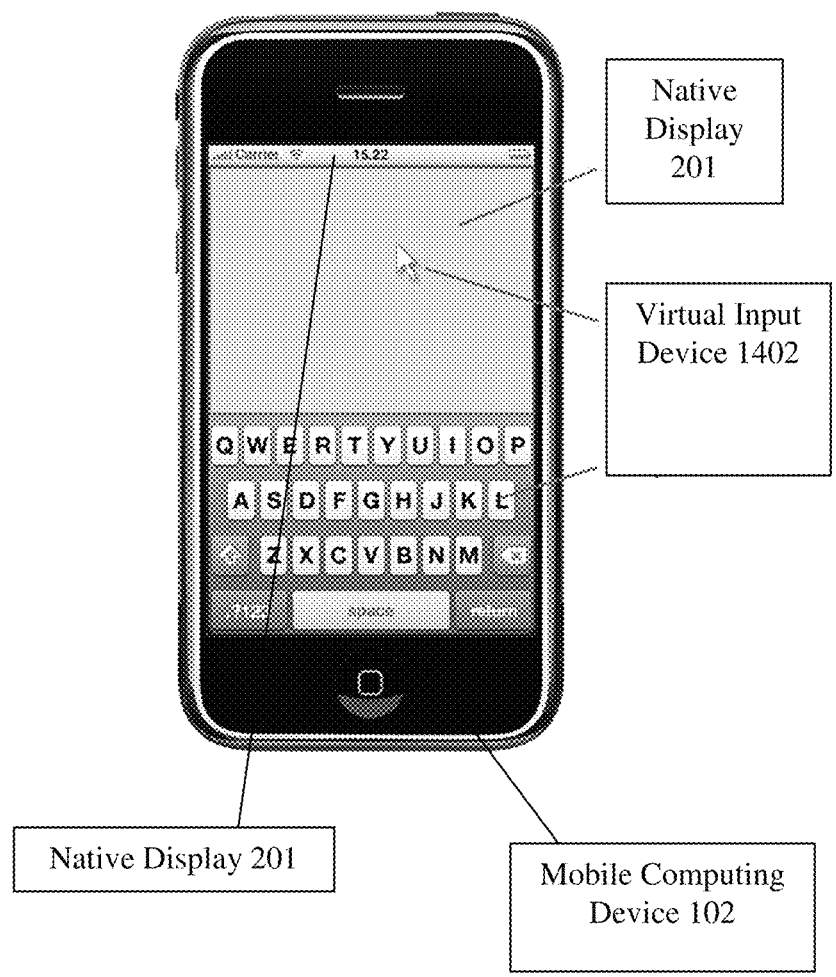
Figure 15:
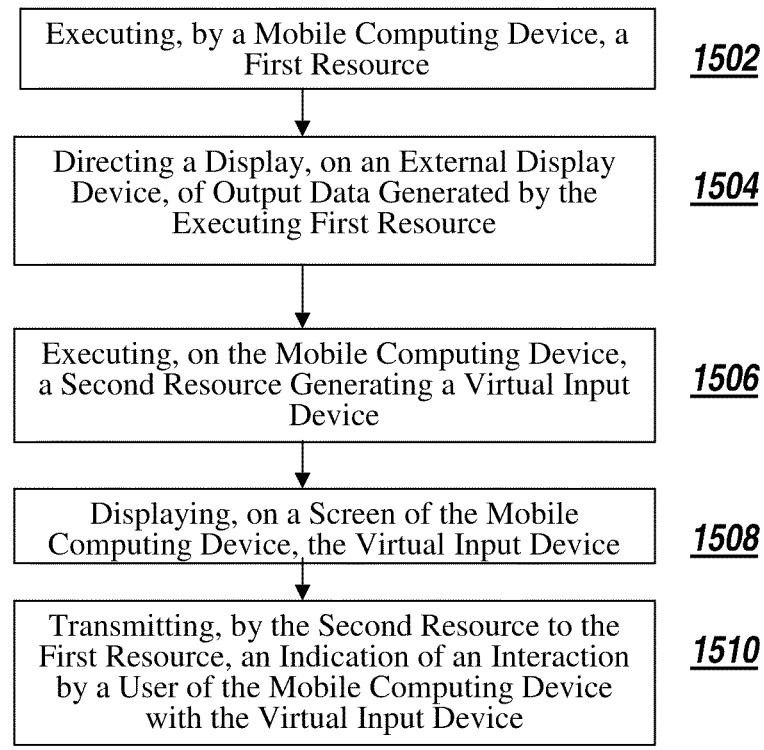
FIG. 15 is a flow diagram depicting one embodiment of a method for displaying, on a screen of a mobile computing device, a virtual input device for interacting with a resource generating output data displayed on a display surface external to the mobile computing device.

FIGS. 14A-15 relate to methods and systems for displaying, on a screen of a mobile computing device, a virtual input device for interacting with a resource generating output data displayed on a display surface external to the mobile computing device.

Figure 16:
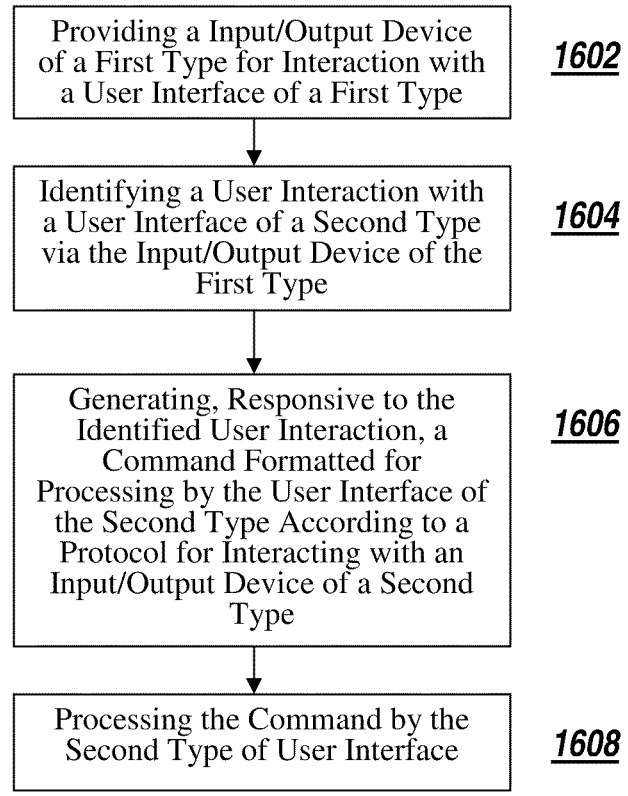
FIG. 16 is a flow diagram depicting one embodiment of a method for translating a user interaction with an input/output device of a first type into a command for processing by a user interface supporting interaction with an input/output device of a second type.

FIG. 16 relates to methods and systems for translating a user interaction with an input/output device of a first type into a command for processing by a user interface supporting interaction with an input/output device of a second type.

DETAILED DESCRIPTION OF THE INVENTION

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38. In another of these embodiments, the servers 106 may be geographically dispersed. In other embodiments, a server farm 38 may be administered as a single entity. In still other embodiments, the server farm 38 comprises a plurality of server farms 38. The servers 106 within each server farm 38 can be heterogeneous—one or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

The servers 106 of each server farm 38 do not need to be physically proximate to another server 106 in the same server farm 38. Thus, the group of servers 106 logically grouped as a server farm 38 may be interconnected using a wide-area network (WAN) connection or a metropolitan-area network (MAN) connection. For example, a server farm 38 may include servers 106 physically located in different continents or different regions of a continent, country, state, city, campus, or room. Data transmission speeds between servers 106 in the server farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a server 106. In one embodiment, the client 102 communicates directly with one of the servers 106 in a server farm 38. In another embodiment, the client 102 executes a program neighborhood application to communicate with a server 106 in a server farm 38. In still another embodiment, the server 106 provides the functionality of a master node. In some embodiments, the client 102 communicates with the server 106 in the server farm 38 through a network 104. Over the network 104, the client 102 can, for example, request execution of various applications hosted by the servers 106a-106n in the server farm 38 and receive output of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the METAFRAME or CITRIX PRESENTATION SERVER and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Figure 2A:
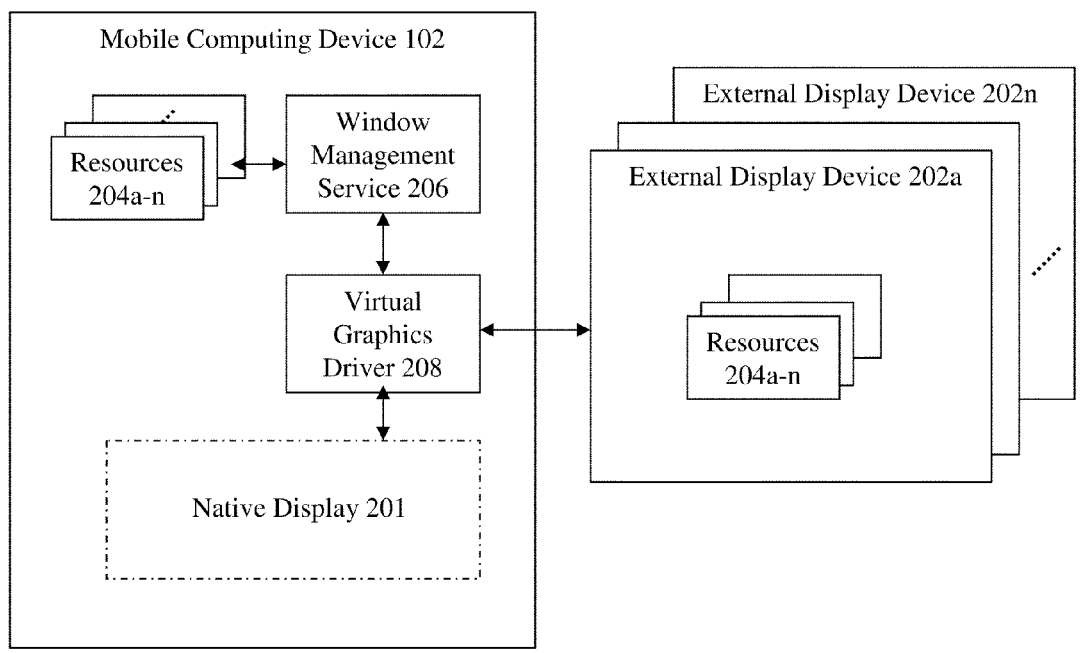
FIG. 2A is a block diagram depicting one embodiment of a system for displaying a plurality of resources in a user-configurable display layout on an external display device.

Referring now to FIG. 2A, a block diagram depicts one embodiment of a system for displaying a plurality of resources on one or more display devices. In brief overview, the system includes a mobile computing device 102 that may communicate with one or more external display devices 202a-n. The embodiment in FIG. 2A shows a mobile computing device 102 with a native display 201, although devices without native displays may be used in other embodiments. The mobile computing device 102 executes a plurality of resources 204a-n (collectively, 204). The window management system 206 and virtual graphics driver 208 manage the locations and sizes of the display of output data associated with each of the plurality of resources in a user-configurable display layout. In many embodiments, the mobile computing device 102 transmits the output data associated with each of the plurality of resources 204 to an external display device 202. In some of these embodiments, the mobile computing device 102 transmits the output data upon establishing a connection with the external display device 202. In various embodiments, the mobile computing device 102 transmits the output data associated with each of the plurality of resources 204 to the device's native display 201. In many embodiments, the mobile computing device 102 transmits the output data associated with certain of the plurality of resources 204 to the native display 201 and transmits the output data associated with other of the plurality of resources 204 to the external display devices 202a-n.

Referring now to FIG. 2A, and in greater detail, a mobile computing device 102 executes a plurality of resources 204. In one embodiment, the mobile computing device 102 is a client 102 as described above in connection with FIGS. 1A-1C. In another embodiment, the mobile computing device 102 displays the output data associated with a resource 204a in a plurality of resources 204a-n executed by the mobile computing device 102. In some embodiments, the mobile computing device 102 displays the output data associated with each of the plurality of resources 204.

In one embodiment, a resource in the plurality of resources 204 may include, without limitation, a data file, an executable file, configuration files, an application, a desktop environment (which may itself include a plurality of applications for execution by the user), a computing environment image (such as a virtual machine image), and/or operating system software or other applications needed to execute a computing environment image.

In one embodiment, the mobile computing device 102 includes a window management service 206 allowing an external display device 202 to display the output data associated with each of a plurality of resources 204 executed on the mobile computing device 102. In still another embodiment, the window management service 206 allows multiple resources running on the mobile computing device 102 to be viewed on an external display device 202 or the native display 201 at substantially the same time, as opposed to allowing the output of one resource 204 to be viewed exclusively on the native display 201 or external display device 202. In yet another embodiment, the window management service 206, in conjunction with a virtual graphics driver 208, manages the display layout of the windows displayed on the external display device 202 and the native display 201. In some embodiments, the virtual graphics driver 208 is a driver-level component that manages a virtual screen frame buffer storing output data that will be displayed by the native display 201 on the mobile computing device 102 or an external display device 202. In one of these embodiments, the window management service 206, in conjunction with the virtual graphics driver 208, manages the boundaries and size of a screen space used to display output data and on which display device the output data is displayed.

In some embodiments, an external display device 202 receives output data associated with each of the plurality of resources 204 and displays the output data in a user-configurable display layout. In one embodiment, the external display device 202 includes a dock to which the mobile computing device 102 connects. In another embodiment, the external display device 202 includes a receiver for communicating with the mobile computing device 102 wirelessly, for example, via BLUETOOTH, Wi-Fi or other networking protocols, as described above in connection with FIGS. 1A-1C. In still another embodiment, the external display device 202 is a display device 124 as described above in connection with FIG. 1B-1C.

Figure 2B:
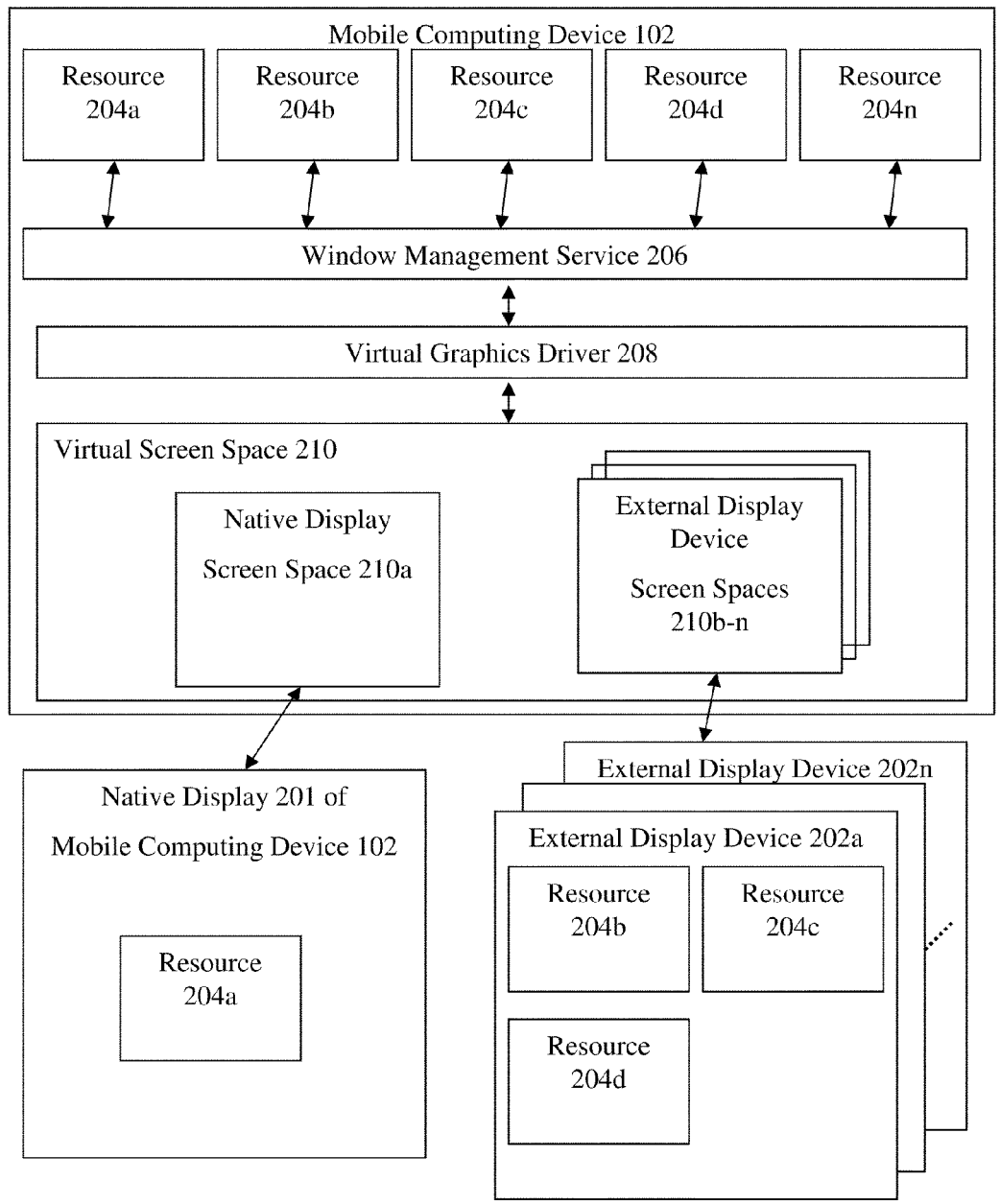
FIG. 2B is a block diagram depicting a system for mapping a display of one or more resources to one or more display devices.

Referring now to FIG. 2B, a block diagram depicts one embodiment of a system for mapping the display of one or more resources 204 of the mobile computing device 102 on one or more display devices 201 and/or 202. In various embodiments, the window management service 206 manages a virtual screen space 210. The virtual screen space 210 may map to the native display 201 and one or more external display devices 202. The window management service 206 may position output data associated with the user interfaces of one or more resources 204 on the virtual screen space 210 to specify where each user interface will be displayed. In some embodiments, the window management service 206 positions the output data according to a user preference. In additional embodiments, the window management service 206 positions the output data according to a policy. In various embodiments, the window management service 206 positions the output data based on the resource 204 associated with the output data.

The window management service 206 communicates with the virtual graphics driver 208 to transmit output data associated with user interfaces of resources 204 to the native display 201 and one or more external display devices 202. In some embodiments, the window management service 206 may transmit output data and associated coordinates from the virtual screen space 210 to the virtual graphics driver 208. In various embodiments, the virtual graphics driver 208 stores the output data in a virtual screen frame buffer. In many embodiments, the virtual graphics driver 208 transmits the entries in the virtual screen frame buffer to the native display 201 and external display devices 202. In many embodiments, the virtual graphics driver 208 transmits an entry in the virtual screen frame buffer to a native display 201 or an external display device 202 based on the position of the entry in the frame buffer.

Figure 2C:
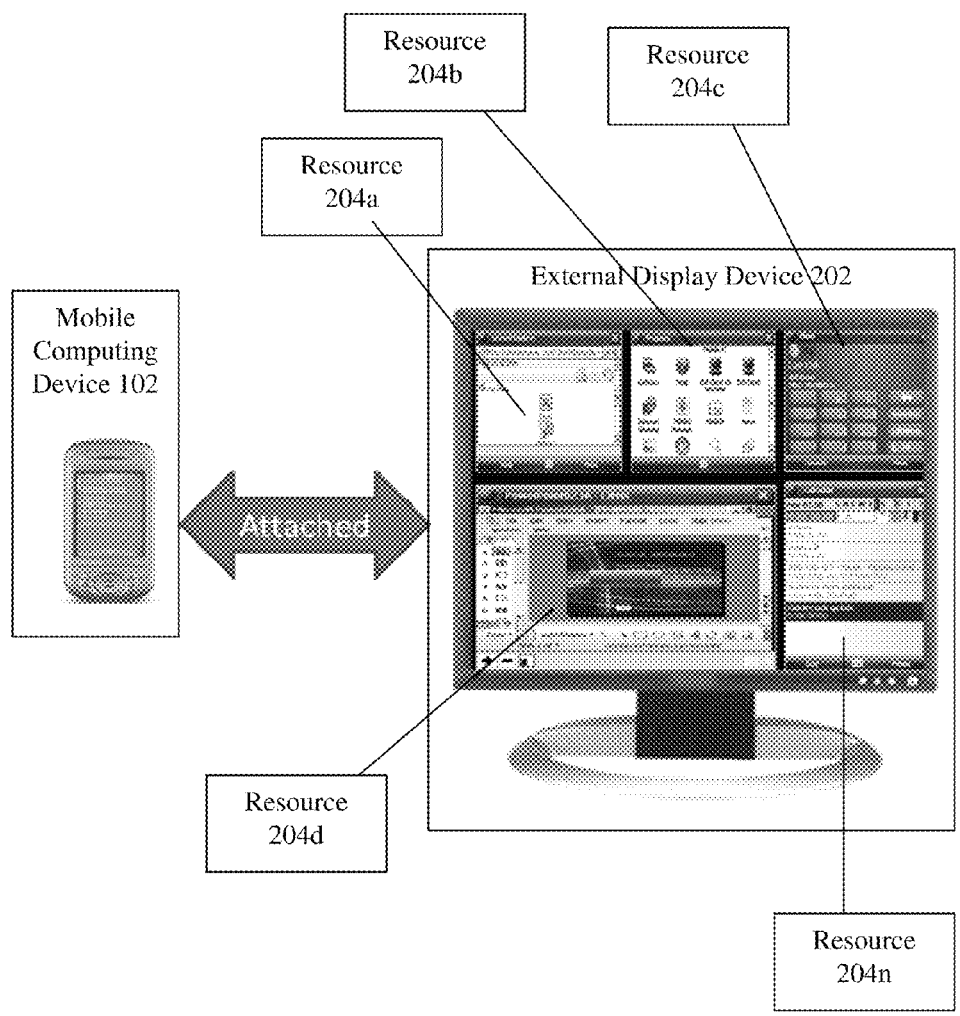
FIG. 2C is a screen shot depicting one embodiment of a system for displaying a plurality of resources in a user-configurable display layout on an external display device, the user-configurable display layout divided into a grid.

Referring now to FIG. 2C, a screen shot depicts one embodiment of a user-configurable display layout in which the external display device 202 displays the output data of the resources 204. In this embodiment, the output data of the resources 204 is displayed in a grid display layout. The grid display layout may include one or more cells in an arrangement. A cell may display output data associated with a resource. In some embodiments, more than one cell displays output data associated with the same resource.

In some embodiments, the cells are uniformly sized, whereas in other embodiments, the cells have different sizes. The cells may be arranged in any configuration. In some embodiments, the cells may be arranged in rows, columns, or both. A cell may have a descriptor associated with the cell's position in the grid. The descriptor may indicate the position of a cell within a row. In the embodiment depicted in FIG. 2C, the cell for resource 204a may have the descriptor "1-1," the cell for resource 204b may have the descriptor "1-2," the cell for resource 204c may have the descriptor "1-3," the cell for resource 204d may have the descriptor "2-1," and the cell for resource 204d may have the descriptor "2-2." In other embodiments, the cells may be numbered, e.g. "Cell 1," "Cell 2," etc. However, any system of choosing descriptors known to those of ordinary skill in the art may be used.

In various embodiments, the window management service 206 configures a grid display layout according to the resources 204 being displayed on the native display 201 or the external display device 202. In some embodiments, the service 206 configures a grid display layout according to the number of resources 204 being displayed. In other embodiments, the service 206 configures a grid display layout according to the size or amount of content in the user interfaces of the resources 204. For example, if an external display device 202 will display four resources with comparable amounts of content, the window management service 206 may configure a grid display layout with four uniform cells. In another example, if an external display device 202 will display four resources and one resource includes three times as much content as the others, the window management service 206 may configure a grid display layout with three uniform cells in a first row and a single cell in a second row. The single cell in the second row may be three times as wide as the cells in the first row. In various embodiments, the window management service 206 may configure a grid display layout to reserve a cell for displaying information about the resources being displayed, such as a menu of the resources. In many embodiments, the window management service 206 may configure a grid display layout to reserve a cell for allowing a user to configure the grid display layout.

Figure 2D:
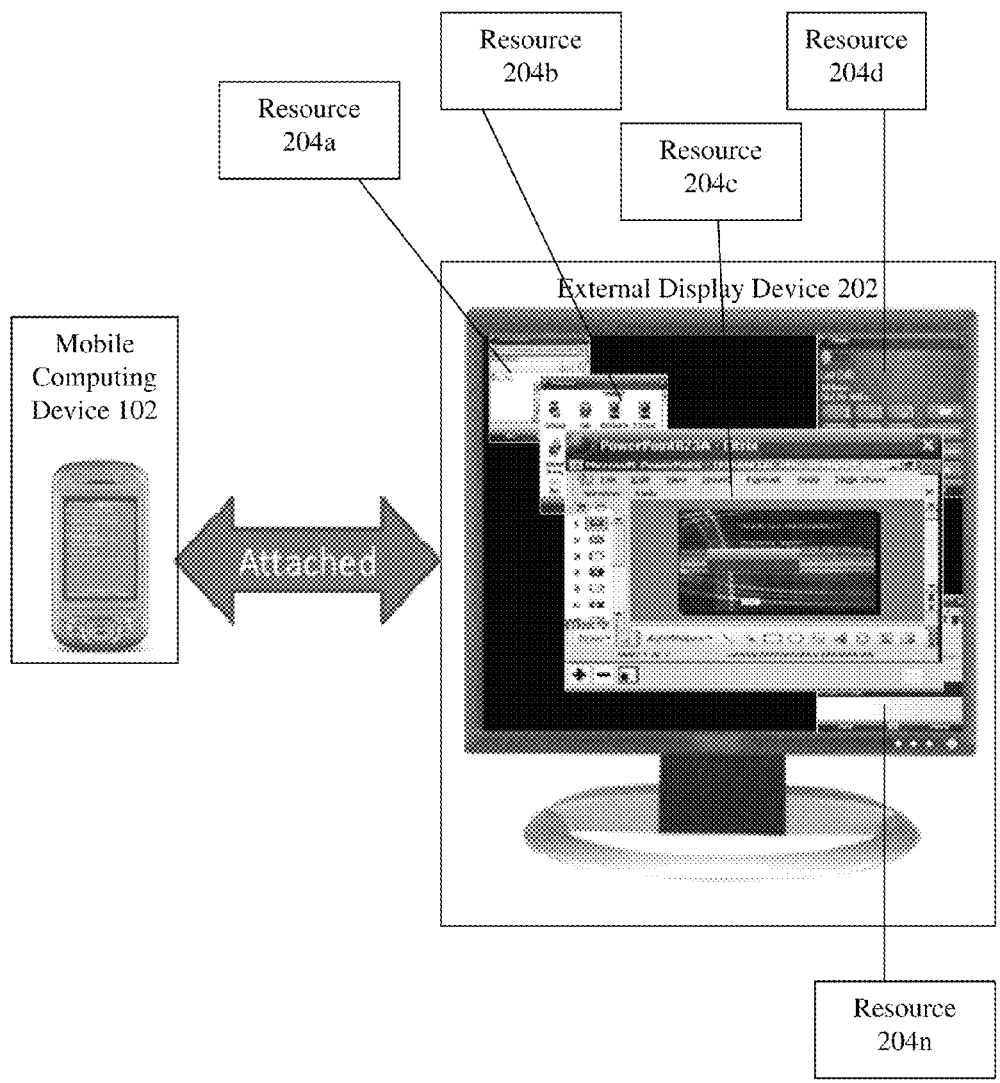
FIG. 2D is a screen shot depicting one embodiment of a system for displaying a plurality of resources in a user-configurable, dynamic display layout on an external display device.

Referring now to FIG. 2D, a screen shot depicts one embodiment of a user-configurable display layout providing a dynamic display layout in which the external display device 202 displays the output data associated with the plurality of resources 204. In this embodiment, windows on the external display device 202 that display output data for resources 204 may be dynamically positioned and sized. The window management service 206 may position a user interface for a resource at a default position and with a default size chosen according to a policy, the resource 204, or any other method. The window management service 206 may order overlapping user interfaces such that higher-order user interfaces obscure lower-order user interfaces. The window management service 206 may transmit output data to the virtual graphics driver 208 reflecting the obfuscation. The user may re-position or re-size a window by, for example, clicking and dragging the window or a window edge. In these embodiments, the virtual graphics driver 208 may detect the user's change to the window, and transmit information about the user's change to the window management service 206. The window management service 206 may process the change and transmit updated output data to the virtual graphics driver 208. In some embodiments, the user moves the user interface for a resource 204 to any location on a native display 201 or external display device 202. In some embodiments, the user moves the user interface for a resource 204 to a different display device. In some embodiments, the updated output data indicates that one user interface's size has been increased or location has been adjusted to obscure another user interface. In other embodiments, the updated output data indicates that one user interface's size has been decreased or location has been adjusted such that more of another user interface shall be visible.

Figure 3A:
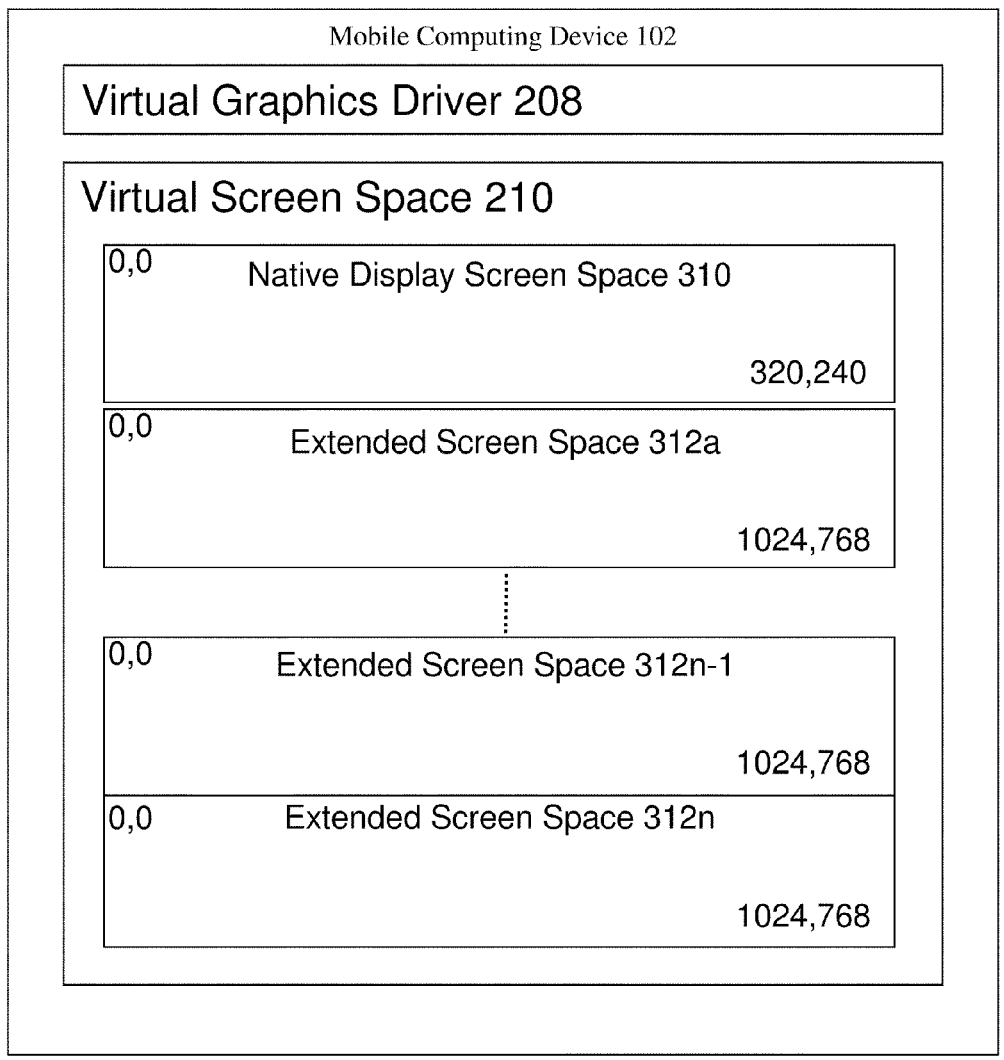
FIG. 3A is a block diagram depicting one embodiment of a plurality of screen spaces provided by a mobile computing device attached to one or more external display devices.

Referring now to FIG. 3A, a block diagram depicts one embodiment of virtual screen spaces 210 provided by a mobile computing device attached to one or more external display devices. As shown in FIG. 3A, the mobile computing device 102 includes a virtual graphics driver 208 and a virtual screen 210. The virtual screen 210 includes a plurality of virtual screen spaces 310 and 312a-n. Virtual screen space 310 may be a native display screen space for the native display 201 on the mobile computing device 102. The other virtual screen spaces 312a-n may be extended screen spaces that correspond to the displays of external display devices 202. The window management service 206 and virtual graphics driver 208 manage the virtual screen 210. In one embodiment, the virtual graphics driver 208 uses a virtual screen frame buffer to manage the mobile computing device's native display 201 and change the native display's 201 screen resolution. In another embodiment, the virtual graphics driver 208 uses a virtual screen frame buffer to manage an extended screen space 312 and to change a resolution of the extended screen 312.

In some embodiments, the virtual graphics driver 208 allocates and manages a plurality of virtual screen spaces 310, 312a-n and virtual screen frame buffers. In some of these embodiments, each virtual screen space and virtual screen frame buffer has a resolution independent of the other screen spaces and frame buffers. In one of these embodiments, output data associated with each of the plurality of resources 204 can reside within any of the virtual screen spaces 310, 312a-n. In another of these embodiments, each of the extended screen spaces 312a-n is associated with at least one external display device 202, depending on the capabilities of the device.

In various embodiments, the window management service 206 and the virtual graphics driver 208 allocate and manage the display, on a plurality of external display devices 202, of output data associated with a plurality of resources. In one of these embodiments, for example, output data associated with a resource 204a displays on a mobile computing device 102, output data associated with a resource 204b displays on one external display device 202a, and output data associated with a resource 204c display on another external display device 202b. In another of these embodiments, the window management device 206 identifies one of the external display devices 202 for displaying output data generated by a resource 204a based upon a type of the resource 204a. For example, the window management service 206 may determine that a type of resource rendering a video may display on a television screen, while a type of resource rendering a word processing application may render on a display of a laptop computer.

Figure 3B:
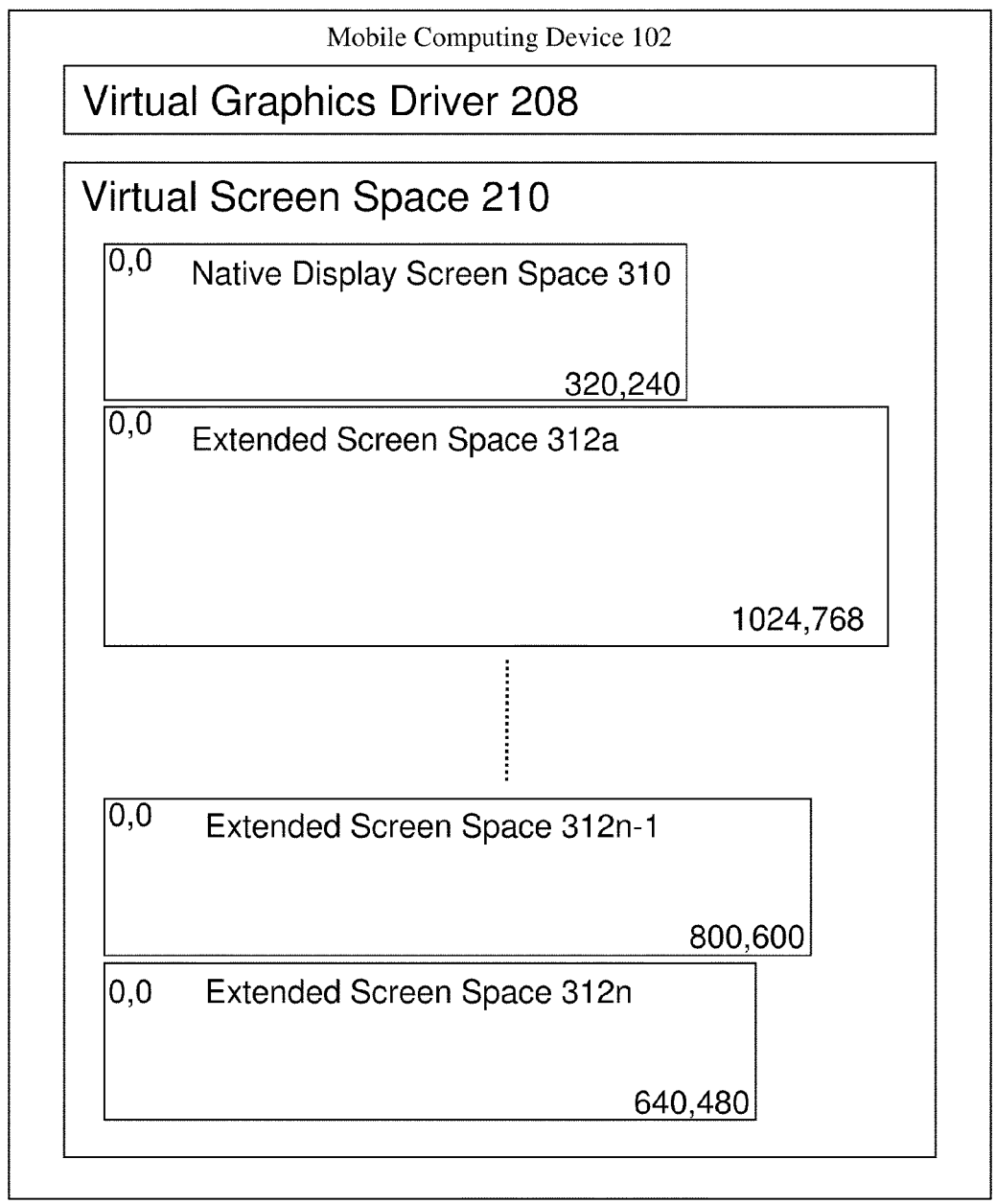
FIG. 3B is a block diagram depicting one embodiment of a mobile computing device providing a plurality of screen spaces.

Referring now to FIG. 3B, a block diagram depicts one embodiment of a mobile computing device 102 providing a virtual screen 210 with virtual screen spaces 310, 312a-n of varying resolutions. In this embodiment, the virtual screen 210 includes a native display screen space 310 corresponding to the native display 201 of the mobile computing device 102 with a resolution of 320 pixels×240 pixels. The virtual screen 210 also includes an extended screen 312a corresponding to the display of an external display device 202 with a resolution of 1024 pixels×768 pixels, an extended screen 312n-1 corresponding to the display of an external display device 202 with a resolution of 800 pixels×600 pixels, and an extended screen 312n corresponding to the display of an external display device 202 with a resolution of 640 pixels×480 pixels. In many embodiments, the virtual screen 210 may include a native display screen space 310 and any number of extended screens 312 of any resolution. The entire virtual screen space 210 may be mapped into a single virtual screen frame buffer, although embodiments that map into multiple buffers may be used.

Figure 3C:
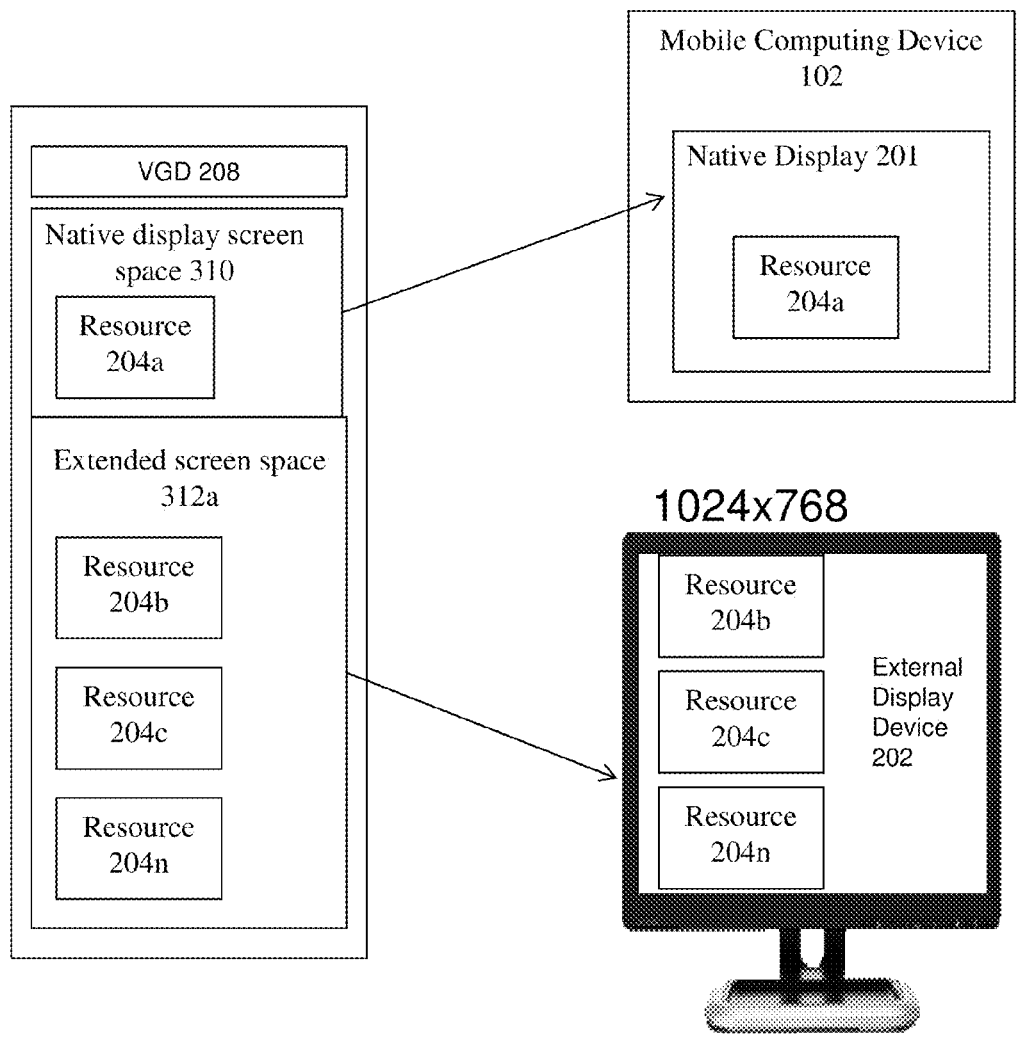
FIG. 3C is a block diagram depicting one embodiment of a logical representation of a plurality of screen spaces managed by a virtual graphics driver.

Referring now to FIG. 3C, a block diagram depicts one embodiment of a logical representation of a plurality of virtual screen spaces managed by a virtual graphics driver. In this embodiment, the virtual graphics driver 208 manages multiple virtual screen spaces with different resolutions in a virtual screen frame buffer. In this embodiment, the native display 201 of the mobile computing device is the primary display and the external display device 202, corresponding to the extended screen 312a, is a secondary display. In various embodiments, output data associated with resources 204 on the native display screen space 310 will be displayed on the native display 201 and output data associated with resources 204 on the extended screen space 312a will be displayed on the external display device 202 associated with the extended screen spaces 312a.

Figure 4A:
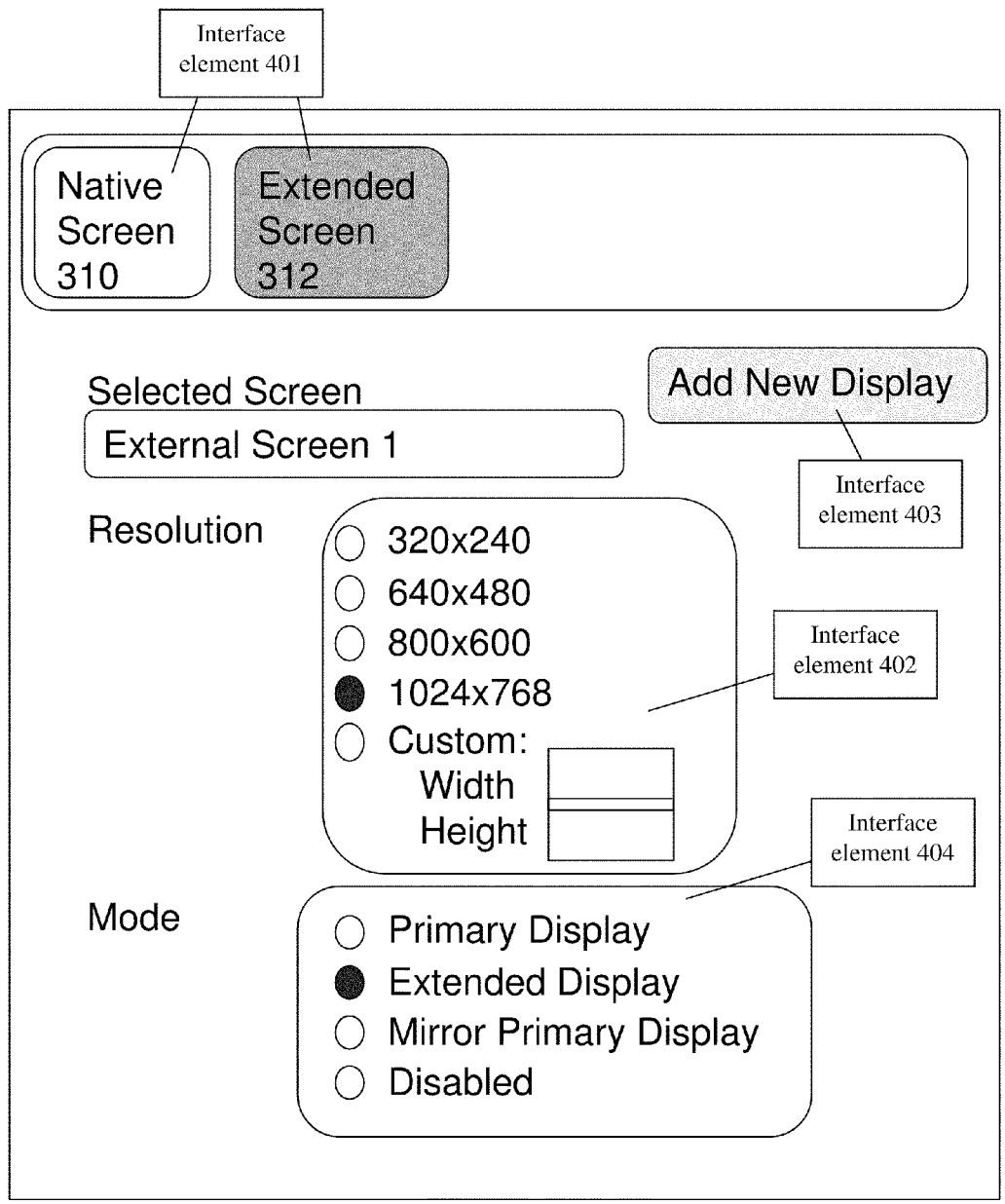
FIG. 4A is a block diagram depicting one embodiment of a graphical user interface for the addition of and configuration of additional screen spaces.

Referring now to FIG. 4A, a block diagram depicts one embodiment of a graphical user interface for customizing a dynamic display layout. In general overview, the user selects a screen space and sets parameters to configure the space. In this embodiment, the user selects a screen space from interface element 401. In various embodiments, the user may select a screen space by selecting a tab, icon, button, or radio button associated with a screen space, selecting a screen space from a drop-down menu, typing the name of a screen space into a text box, or any other methods known to persons of ordinary skill in the art. In further embodiments, the user may create a new screen space. In this embodiment, the user may create a new screen space by selecting the "Add New Display" button 403, and an interface element 401 corresponding to the new screen space may be created and added to the graphical user interface. The user may name the new screen space, assign an external display device 202 corresponding to the space, and configure the screen space according to the methods described below.

In various embodiments, the graphical user interface may include interface elements the user manipulates to set parameters for the space. In this embodiment, the graphical user interface includes interface elements 402 and 404 for setting the resolution and mode of the screen space, respectively, and in many embodiments, the graphical user interface may include interface elements for setting any other parameters such as z-order or default position. In this embodiment, the user sets the resolution by selecting a radio button from an interface element 402 corresponding to a predetermined resolution or selecting a radio button to customize the width and height of the screen's resolution. In other embodiments, the user may set the resolution by adjusting a slider to a desired resolution, selecting a thumbnail from a group of thumbnails representing displays of the screen space at different resolutions, or clicking and dragging a boundary of an image representing the screen space to change the resolution. In this embodiment, the user sets the mode by selecting a radio button from an interface element 404 indicating whether the user wishes the screen space to be a primary display, an extended display, a display that mirrors the primary display, or a disabled display, although any other modes may be used. In other embodiments, the user may set the mode by selecting an icon representing the mode, selecting the mode from a drop-down menu, or any other method.

Figure 4B:
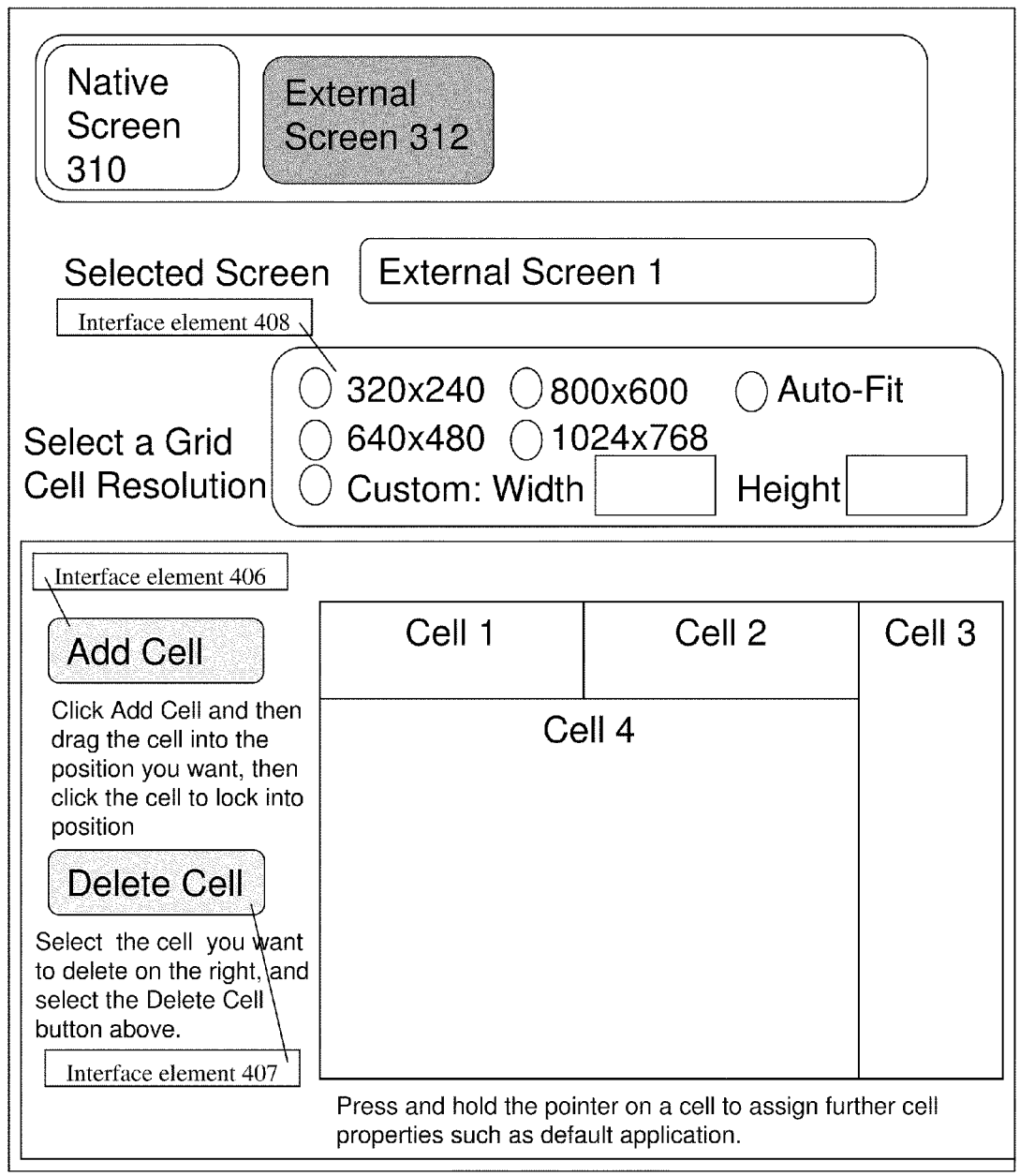
FIG. 4B is a block diagram depicting one embodiment of a graphical user interface for customizing a grid display layout.

Referring now to FIG. 4B, a block diagram depicts one embodiment of a graphical user interface for customizing a grid display layout. The user may select the screen space to customize according to any of the methods described in FIG. 4A. In many embodiments, the graphical user interface allows users to configure the number, size, and position of cells within a grid in which the output data for each of the plurality of resources 204 is displayed. In one embodiment, the user may add cells to the grid by selecting the user interface element 406, an "Add Cell" button. Each time the user selects the "Add Cell" button, a new numbered cell appears in the grid, and the user may delete a cell by selecting the cell and the user interface element 407, a "Delete Cell" button. In many embodiments, the user may configure the position, resolution, or both of each cell. In some embodiments, the user may configure the position by dragging and dropping the cell to the desired location. In other embodiments, the user may configure the position by entering a numerical value corresponding to the desired position for the cell. For example, the user may select a cell and input the position "2-1" to indicate the cell should appear in the second row and first column of the grid. In all of these embodiments, the remaining cells may automatically readjust their positions in response to the user's selection of a position for the new cell.

In various embodiments, the user may configure the resolution of each cell. In some embodiments, the user configures the resolution by dragging and dropping a boundary of a cell to the desired size. In other embodiments, the user configures the resolution by selecting from a group of resolutions. The embodiment shown in FIG. 4B depicts a user interface element 408 in the form of radio buttons corresponding to a group of resolutions, including a radio button that permits the user to customize the resolution of the cell. In other embodiments, a user may select a resolution by selecting a check box, clicking a button, choosing a resolution from a drop-down menu, or any other known method of inputting information.

In many embodiments, a user may configure the grid display layout prior to the display of output data by the external display device 202. For example, the user may choose a setting associated with a preferred cell position and resolution for each resource in the plurality of resources 204 in a user profile. Upon execution of the resource, the window management service 206 may consult the user profile to determine how to display the user interface of the resource 204. In other embodiments, the user may configure the grid display layout during the display of output data by the external display device 202. For example, upon execution of a resource 204 by the mobile computing device 102, the user may choose or modify a setting associated with a preferred cell position and resolution for the resource 204.

In various embodiments, a user may associate output data for a resource 204 with a cell in the grid display layout. In some embodiments, the user may select a cell on the grid display layout and associate a resource with the cell such that output data of the resource appears in the selected cell. In some embodiments, the user may associate a plurality of resources with the same cell and prioritize the resources to determine which output data will be displayed in the cell if more than one of the associated resources are being executed. In other embodiments, the user may associate a resource with a cell by dragging the output data generated by the resource to the cell in the grid display layout. The window management service 206 may store the association between the cell and the resource 204.

Figure 4C:
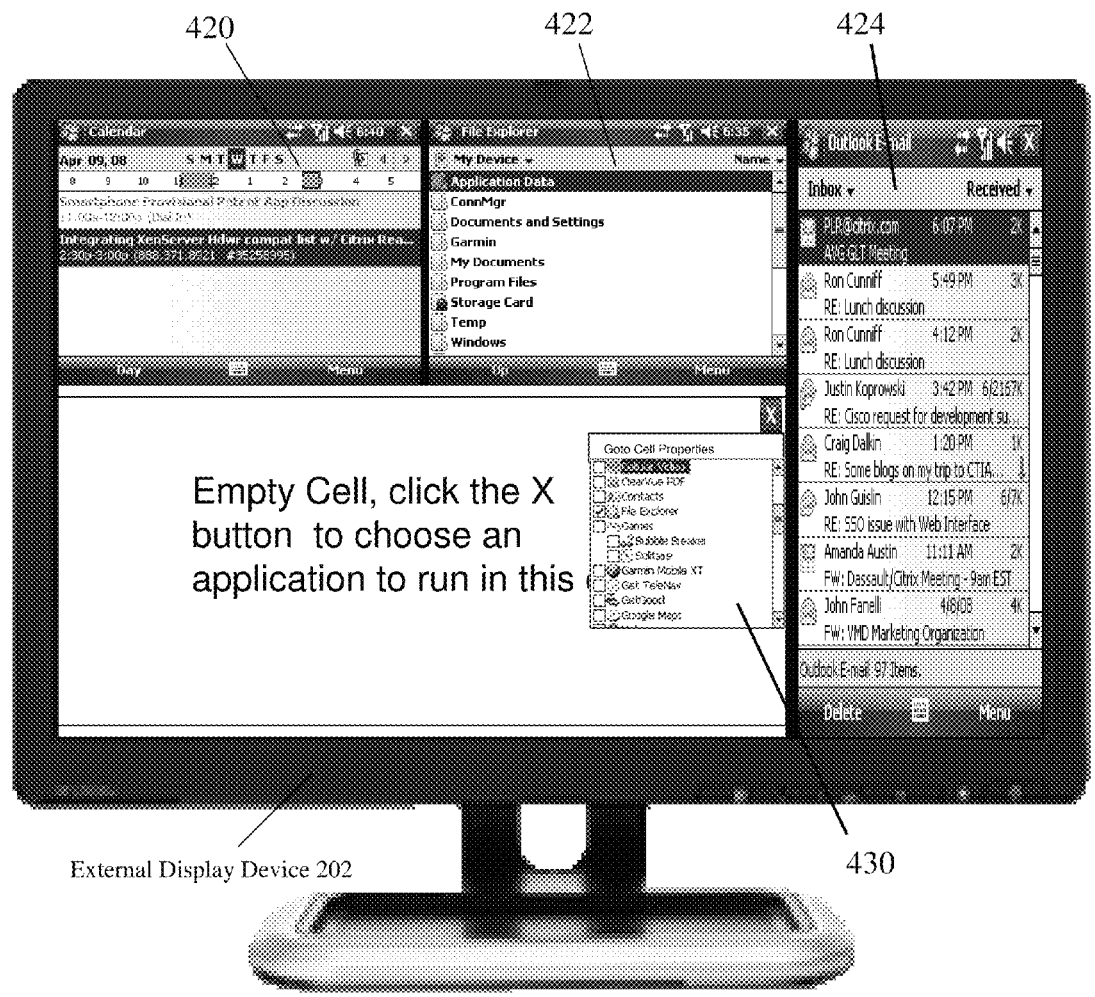
FIG. 4C is a screen shot depicting one embodiment of a customizable grid display layout.

Referring now to FIG. 4C, a screen shot depicts one embodiment of a customized grid display layout. In this embodiment, the grid display layout includes output data for a calendar 420, file explorer 422, and e-mail 424 corresponding to cells 1, 2, and 3 in the grid layout of FIG. 4B. In this embodiment, no resources have been associated with the interface element 430 corresponding to cell 4, an empty cell. In various embodiments, empty cells include a user interface element 430 for selecting a resource whose output data should display in the cell. In some embodiments, the user interface element 430 enumerates at least one resource 204 whose output data is available for display on the external display device 202. In still another embodiment, upon selection of a resource 204 by a user via the user interface element 430, the window management system 206 receives an identification of the selected resource 204. The window management system 206 may associate the selected resource with the cell corresponding to the user interface element 430. In still even another embodiment, the window management system 206, in communication with the virtual graphics driver 208, manages an association between the selected resource and the cell corresponding to the user interface element 430 to output data associated with the resource to the cell in the customizable grid display layout.

Figure 4D:
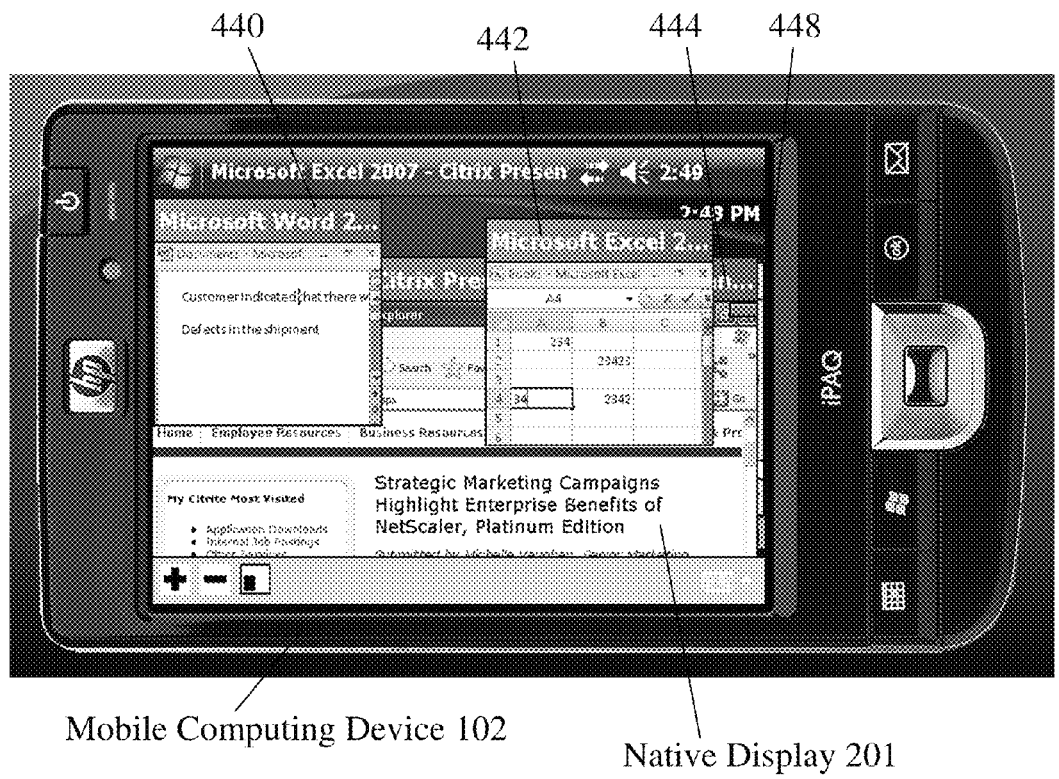
FIG. 4D is a screen shot depicting one embodiment of unstacked displays on a mobile computing device.

Referring now to FIG. 4D, a screen shot depicts one embodiment of a dynamic display layout provided by a mobile computing device 102 displaying the output data generated by each of a plurality of resources 204 on the native display 201 of the mobile computing device 102. In this embodiment, the output data for all the resources may be displayed on the native display 201 because the mobile computing device 102 is not attached to any external display devices. In this embodiment, the dynamic layout includes four windows 440, 442, 444, and 446 that contain output data generated by four resources executing on the mobile computing device 102. In various embodiments, a window 440 for a resource 204 may be dynamically displayed on the native display 201 of the mobile computing device 102 when the resource 204 is first executed. In many embodiments, the user may dynamically resize the window 440 by, for example, dragging and dropping a boundary of a window 440 to the desired location. In further embodiments, the user may move the window 440 to any position on the native display 201. In some embodiments, the user may move the window 440 to an external display device 202 connected to the mobile computing device 102. In some embodiments, the user may minimize the window 440 on the native display 201 of the mobile computing device 102. In many embodiments, the user may change focus from a window displaying output data associated with one resource 204a to a window displaying output data associated with another resource 204b. The user may change focus by selecting the window containing output data for the desired resource 204b. When the user changes the focus to resource 204b, the output data generated by resource 204b may obscure output data generated by other resources 204 executing on the mobile computing device 102. In still another embodiment, the windows 440-448 can be adjusted in any manner and/or form on any display, either the native display 201 or external display devices 202, as apparent to one of ordinary skill in the art.

Figure 4E:
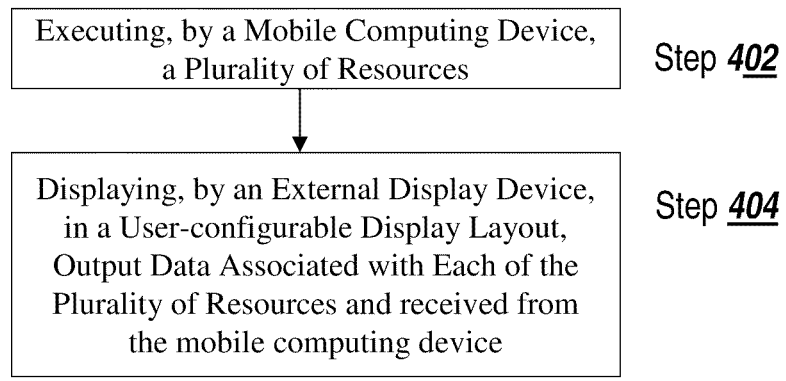
FIG. 4E is a flow diagram depicting one embodiment of the steps taken in a method for displaying, by an external display device, output data generated by a plurality of resources executing on a mobile computing device.

Referring now to FIG. 4E, a flow diagram depicts one embodiment of the steps taken in a method for displaying, by an external display device 202, output data generated by a resource 204 executing on a mobile computing device 102. In brief overview, the method includes the step of executing, by a mobile computing device 102, a plurality of resources 204 (step 402). The method includes the step of displaying, by the external display device 202, in a user-configurable display layout, the received output data associated with each of the plurality of resources 204 (step 404).

Referring still to FIG. 4E, and in greater detail, a mobile computing device 102 executes a plurality of resources 204 (step 402). In one embodiment, the mobile computing device 102 substantially simultaneously executes the plurality of resources 204. In another embodiment, the mobile computing device 102 substantially simultaneously executes a subset of the plurality of resources 204.

The external display device displays, in a user-configurable grid display layout, the received output data generated by each of the plurality of resources 204 (step 404). As described above in connection with FIGS. 2A-2D, in various embodiments, the mobile computing device 102 determines for each of the plurality of resources 204 whether to transfer output data associated with the resource 204 to the external display device 202.

In some embodiments, a window management service 206 manages the size, position, resolution, or any other characteristic of a resource 204 in the virtual screen space 210. In one embodiment, a window management service 206 executing on the mobile computing device 102, and in communication with a virtual graphics driver 208, identifies the resources 204 whose output data the external display device 202 should display. In another embodiment, the window management service 206 receives, from the virtual graphics driver 208, an identification of an external display device 202 attached to the mobile computing device 102. In still another embodiment, the window management service 206 evaluates each of the plurality of resources 204 to determine whether the external display device 202 should display the output data generated by each of the plurality of resources 204. In still even another embodiment, the window management service 206 evaluates a setting associated with each of the plurality of resources 204 to determine whether the external display device 202 should display the output data generated by each of the plurality of resources 204. In yet another embodiment, the window management service 206 evaluates a user-specified preference setting associated with each of the plurality of resources 204 to determine whether the external display device 202 should display the output data generated by each of the plurality of resources 204.

In one embodiment, the window management service 206 instructs the virtual graphics driver 208 to forward output data generated by a resource 204 executing on the mobile computing device to the external display device 202 for display. In another embodiment, the window management service 206 instructs the virtual graphics driver 208 to forward the output data generated by the resource 204 to the external display device responsive to determining that a setting associated with the resource 204 indicates that the output data generated by the resource 204 should be displayed on the external display device 202. In still another embodiment, a plurality of settings are associated with the resource 204, each of the plurality of settings indicating whether the output data generated by the resource 204 should be displayed on each of a plurality of types of external display device 202; for example, a first setting associated with the resource 204 may indicate that the generated output data should be displayed on the external display device 202 if the external display device 202 is a television screen and a second setting associated with the resource 204a may indicate that the generated output data should not be displayed on the external display device 202 if the external display device 202 has a display below a certain size and/or resolution.

In one embodiment, the window management service 206 instructs the virtual graphics driver 208 to have the output data for a resource 204 displayed on the external display device 202 in a grid display layout. In another embodiment, the window management service 206 instructs the virtual graphics driver 208 to have the output data for a resource 204 displayed on the external display device 202 in a dynamic display layout. In still another embodiment, the window management service 206 evaluates a setting associated with each of the plurality of resources 204 to identify a display layout according to which the external display device 202 should display the output data generated by each of the plurality of resources 204. In yet another embodiment, the window management service 206 evaluates a user-specified preference setting associated with each of the plurality of resources 204 to identify a display layout according to which the external display device 202 should display the output data generated by each of the plurality of resources 204; for example, and in some embodiments, a user specifies a subset of the plurality of resources 204 for which the external display device 202 should display output data.

In one embodiment, the virtual graphics driver 208 forwards output data generated by a resource 204 executing on the mobile computing device to the external display device 202 for display. In another embodiment, the virtual graphics driver 208 instructs an operating system of the mobile computing device 102 to forward output data generated by a resource 204 executing on the mobile computing device to the external display device 202 for display. In still another embodiment, the virtual graphics driver 208 forwards an identification of a display layout to the external display device 202. In yet another embodiment, the virtual graphics driver 208 instructs an operating system of the mobile computing device 102 to forward an identification of a display layout to the external display device 202.

Referring now to FIG. 5A, a block diagram depicts one embodiment of a system for displaying, by an external display device 202, a second user interface for a resource 204 distinct from a first user interface for the resource 204 displayed by the mobile computing device 102 that is executing the resource 204. The system includes a window management service 206, a virtual graphics driver 208, and resources 204 that may provide more than one user interfaces 502a-n. In some embodiments, the resource 204 may provide a user interface 502a optimized for the native display 201 on the mobile computing device 102. In additional embodiments, the resource 204 may provide a user interface 504b optimized for display on the external display device 202. In further embodiments, the resource 204 may provide user interfaces 502a-n optimized for display on different external display devices 202. In various embodiments, the window management service 206 provides functionality to allow resources to dynamically change user interfaces 502 to adapt to the external display device 202 that will display output data generated by the resource. In some embodiments, the window management service 206 indicates to a resource 204 the properties of the external display device 202 that will display the resource's output data. In response, the resource 204 provides a user interface 502b-n appropriate for the properties of the external display device 202, which may differ from the user interface 502a provided to the native display 201 of the mobile computing device. In various embodiments, the mobile computing device 101 may execute a plurality of resources 204, and each resource may provide a plurality of user interfaces 502 optimized for display on the native display 201 of a mobile computing device 102 or on an external display device 202.

Referring now to FIG. 5B, a block diagram depicts one embodiment of a system for mapping a first user interface 502a on the native display 201 of the mobile computing device 102 to a second user interface 502b on one or more external display devices 202. In one embodiment, the virtual graphics driver 208 maps all the screen spaces 210a-n from the display of the mobile computing device 102 and/or the external display devices 202 into one virtual screen space 210. In another embodiment, the virtual graphics driver 208 communicates the coordinates related to the virtual screen space 210 to the window management service 206. In still another embodiment, the window management service 206 positions user interfaces of one or more resources 204 onto the virtual screen space 210. In yet another embodiment, the window management services 206 uses information provided by the virtual graphics driver 208 to position the user interfaces on an external display device 202. In one embodiment, the user interface 502b for the resource 204 displayed by an external display device 202 is substantially same as the user interface 502a displayed on the native display 201. In another embodiment, the user interface 502b displayed by an external display device 202 is distinct from the user interface 502a displayed on the native display 201. In various embodiments, the user interface for any resource 204 displayed on an external display device 202 is distinct from the user interface 510 displayed on a different external display device 202.

Referring now to FIG. 5C, a screen shot depicts one embodiment of a system for displaying, by an external display device 202, a second user interface 502b for a resource 204 distinct from a first user interface 502a for the resource 204 displayed by a mobile computing device 102 that is executing the resource 204. As depicted in FIG. 5C, and in many embodiments, a resource 204 may generate a plurality of user interfaces 502a and 502b, each of which may be optimized for use with a different type of display device. In one embodiment, a first user interface 502a of the plurality of user interfaces may be optimized for use with the native display 201 of a mobile computing device 102. In another embodiment, the second user interface 502b of the plurality of user interfaces may be optimized for use with an external display device 202. In various embodiments, the first user interface 502a may be displayed on the native display 201 of the mobile computing device 102 until the mobile computing device 102 is attached to an external display device 202. When the mobile computing device 102 is attached, the second user interface 502b may be displayed on the external display device 102. In some embodiments, the mobile computing device 102 may cease to display the first user interface 502a upon attachment, and in other embodiments, the mobile computing device 102 may continue to display the first user interface 502a as the external display device 102 displays the second user interface 502b.

Referring now to FIG. 6, a flow diagram depicts an embodiment of the steps taken in a method for displaying, by an external display device, a first user interface to an application distinct from a second user interface to the application displayed by a mobile computing device executing the application. In brief overview, the method includes the step of generating, by a resource executing on a mobile computing device, a first user interface for display on the mobile computing device (step 610). The method includes the step of receiving, by the resource, from a window management service, an identification of an external display device (step 612). The method includes the step of generating, by the resource, a second user interface for display on the external display device, responsive to receiving the identification of the external display device (step 614).

Referring now to FIG. 6, and in greater detail, a resource executing on a mobile computing device generates a first user interface for display on the mobile computing device (step 610). In one embodiment, the resource 204 generates a user interface 502a optimized for use with the mobile computing device 102. The resource receives, from a window management service, an identification of an external display device (step 612). In one embodiment, the resource receives the identification of the external display device 202 via a virtual graphics driver 208.

In response to receiving the identification of the external display device 202, the resource generates a second user interface 502b for display on the external display device (step 614). In one embodiment, the window management service 206 receives an identification of an external display device 202 to which the mobile computing device 102 has attached. In some embodiments, the window management service 206 transmits, to the resource, an application programming interface (API) call indicating to the resource that the external display device 202 is available. The window management service 206 may inform the resource 204 executing on the mobile computing device of the identification of the attached external display device 202. In some embodiments, the window management service 206 indicates to the resource 204 that the external display device 202 has a display with a larger resolution or size than the native display 201 on the mobile computing device 102. In further embodiments, the window management service 206 allows the resource to change its user interface to an interface more optimized for use with the external display device 202.

In one embodiment, the window management service receives, from the resource, an identification of a user interface associated with the attached external display device. In some embodiments, the window management service 206 receives the identification via a virtual graphics driver 208. In other embodiments, the window management service 206 forwards the identification to the virtual graphics driver 208.

In one of these embodiments, the window management service 206 receives, from the resource, a user interface associated with the attached external display device 202. In another embodiment, when a user interface associated with the attached external display device is not available, the window management service 206 receives, from the resource, a default user interface. In still another embodiment, the window management service 206 receives from the resource a communication that a user interface associated with the attached external display device 202 is not available.

In one embodiment, the resource 204 generates a user interface 502b optimized for use with an external display device 202 to which the mobile computing device 102 is attached. In another embodiment, the resource 204 instructs an operating system on the mobile computing device 102 to display one of a plurality of user interfaces selected in response to receiving an identification of the external display device 202 upon which the user interface will be displayed. In still another embodiment, the resource 204 instructs the window management system 206 on the mobile computing device 102 to display one of the plurality of user interfaces selected responsive to receiving an identification of the external display device 202 upon which the user interface will be displayed. In some embodiments, the window management system 206 transmits, to the external display device 202, an identification of a user interface 504 with an instruction to display the user interface 504. In other embodiments, the window management system 206 transmits, to a virtual graphics driver 208, an identification of a user interface 504 with an instruction to display the user interface 502b on the external display device 202.

Referring now to FIG. 7A, a block diagram depicts one embodiment of a system for executing and displaying a plurality of resources 204a-204n (204 in general) on a client 102b. In one embodiment, the system includes a client 102a, which is a mobile computing device, in connection with another client 102b. In one embodiment, the client 102b includes a dock to which the mobile computing device 102a attaches. In another embodiment, the client 102b includes a receiver for communicating with the mobile computing device 102a wirelessly, for example, via BLUETOOTH, Wi-Fi or other networking protocols, as described above in connection with FIGS. 1A-1C. In still another embodiment, the client 102b includes an external display 124 as described above in connection with FIG. 1B-1C.

In one embodiment, one or more resources 204 execute on the mobile computing device 102a. In another embodiment, the mobile computing device 102a accesses hardware and/or software components of the client 102b to execute the resources 204. In still another embodiment, a version of a resource 204 is executed on the client 102b. In one embodiment, the version of the resource 204 on the client 102b can be a local copy of the resource 204 installed on the client 102b. In another embodiment, the version on the client 102b can offer more functionalities of the resource 204 than available on the mobile computing device 102a. In still another embodiment, the version on the client 102b can be another resource 204b producing the same output data as the resource 204 executing on the mobile computing device 102a. In yet another embodiment, the mobile computing device 102a and the client 102b share hardware and software resources to execute one or more resources 204.

Execution of the resource 204 may be transferred to the client 102b in many ways. In one embodiment, the execution of the resource 204 is terminated on the mobile computing device 102a and the version of the resource 204 on the client 102b is started. In another embodiment, information and/or data values related to the state of execution of the resource 204 on the mobile computing device 102a is transferred to the client 102b. In still another embodiment, no information and/or data values related to the state of execution of the resource 204 on the mobile computing device 102a is transferred to the client 102b. In such an embodiment, recent updates are not transferred to the client 102b when the execution is transferred from the mobile computing device 102a to the client 102b. In yet another embodiment, the resource 204 is transferred to the client 102b when the execution is transferred from the mobile computing device 102a to the client 102b. In one embodiment, information and/or data values related to the state of execution is also transferred when the resource 204 is transferred to the client 102b.

In some embodiments, the client 102b includes an operational or performance characteristic not provided by the mobile computing device 102a. In one of these embodiments, the client 102b has a more powerful processor and/or larger memory than the processor and memory of the mobile computing device 102a. In another of these embodiments, the client 102b provides an I/O device, display device, installation device, or other peripherals, such as a keyboard or printer not available to the mobile computing device 102a. In still another of these embodiments, the client 102b may provide a feature, a resource, or peripheral desired to be used by the user of the mobile computing device 102a For example, the user may want to access a file or an application provided on a remote machine available via a connection across a network. In yet another of these embodiments, the client 102b provides access to machines on a network 104, such as those in machine farm 38, not available to the mobile computing device 102a, or to a user of the mobile computing device 102a.

In one embodiment, one or more resources 204 may execute in a virtual machine on the mobile computing device 102a. In another embodiment, a virtual machine executing on the mobile computing device 102a provides access to a computing environment based at a remote location. In still another embodiment, an application program stored in the mobile computing device 102a executes to access data associated with the computing environment provided on the mobile computing device 102a. In another embodiment, the mobile computing device 102a executes virtualization software, at least a portion of which is stored on the mobile computing device 102a. In still another embodiment, the mobile computing device 102a provides access to a computing environment by executing an operating system with access to one or more applications stored on the mobile computing device 102a, the operating system and the one or more applications having access to user data stored in the mobile computing device 102a.

In one embodiment, the mobile computing device 102a executes a virtual machine, responsive to data stored in the mobile computing device 102a. In another embodiment, the mobile computing device executes a virtual machine responsive to a policy stored in the mobile computing device 102a. In still another embodiment, the mobile computing device 102a executes a virtual machine that provides access to a requested resource or computing environment, the virtual machine executed responsive to a virtual machine image stored in the mobile computing device 102a. In yet another embodiment, the mobile computing device 102a transfers execution of the virtual machine to the client 102b.

In another embodiment, the client 102b connects to the mobile computing device 102a, executes a virtual machine, and provides access to a computing environment responsive to data stored in the mobile computing device 102a. In one embodiment, the client 102b may mount the storage device of the mobile computing device 102a as a removable hard drive or storage element 128 of the client 102b. In some embodiments, the mobile computing device 102a may be a plug and play device (PnP) of the client 102b, such that a PnP protocol such as that manufactured by Microsoft Corporation of Redmond, Wash., is used between the mobile computing device 102a and client 102b, such as via I/O devices 130a-130n or a network interface 118.

In one embodiment, the client 102b provides access to a computing environment based on a portable computing environment provided in the mobile computing device 102a. The client 102b executes a virtual machine and a virtualization layer to execute the computing environment based on a virtualization software, virtual machine image, or user data. In some embodiments, the client 102b includes a transceiver for accessing data stored in the mobile computing device 102a.

In some embodiments, a loading mechanism on the mobile computing device 102a actuates the establishment of the computing environment on the client 102b based on the portable computing environment stored in the mobile computing device 102a. In other embodiments, the loading mechanism of the client 102b actuates the establishment of the computing environment. In yet another embodiment, a loading mechanism on the mobile computing device 102a works in conjunction with the loading mechanism of the client 102b to establish the computing environment.

Referring now to FIG. 7B, a block diagram depicts one embodiment of a system for executing resources 204 on a remote server 106 and displaying output data on a client computing device 102b. In one embodiment, the system includes the mobile computing device 102a, a client 102b and a server 106. The mobile computing device 102a may be attached or connected to the client 102b in a plurality of possible ways as described with reference to FIG. 7A.

In one embodiment, the client 102b connects to a remote server 106 to request execution of a resource 204 by the server 106. In some embodiments, the server 106 may have an operational or performance characteristic not present in the client 102b. In another embodiment, the server 106 has more powerful hardware and/or software resources not available to the client 102b. In still another embodiment, the server 106 provides access to machines on a network 104, such as those in machine farm 38, not directly available to the client 102b.

In one embodiment, one or more resources 204 execute on the client 102b. In another embodiment, the one or more resources 204 may include an application program to establish a remote connection with the server 106. The client 102b may execute, operate or otherwise provide the application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the client 102. In some embodiments, the application may be a server-based application executed on behalf of the client 102 on a server 106. In one embodiment, the server 106 may communicate with the client 102 using a presentation layer protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash.

In one embodiment, one or more resources 204 may execute in a virtual machine on the client 102b as described above in connection to FIG. 7A. In another embodiment, the server 106 connects to the client 102b, executes a virtual machine, and provides access to a computing environment. In one embodiment, the server 106 may transmit the virtual machine image to the client 102b. In another embodiment, the server 106 transmits output data generated by the virtual machine image executed on the server 106 to the client 102b. In still another embodiment, the virtual machine image includes a version of each of the plurality of resources 204 of the mobile computing device 102a.

Output data from the execution of the resources 204 are displayed in one or more ways. In one embodiment, the output data generated by an execution of a resource 204a on the server 106 is displayed on the mobile computing device 102a. In another embodiment, the output data generated by an execution of a resource 204 on the server 106 is displayed on the client 102b. In still another embodiment, the output data from the server 106 is displayed on the client 102b as a part of a computing environment. In yet another embodiment, a resource 204 is executed locally on the mobile computing device 102a and displayed on the client 102b. In some embodiments, output data is simultaneously displayed in the mobile computing device 102a and the client 102b.

Referring now to FIG. 8A, a block diagram depicts one embodiment of a system for executing resources for a mobile computing device remotely on a server and displaying output data generated by the resources on the mobile computing device, the client, or both. In one embodiment, the system includes a mobile computing device 102a in communication with a client 102b over a connection 104. The system also includes a server 106 communicating with the mobile computing device 102a over a connection 104' and the client 102b over a connection 104".

In one embodiment, one or more resources 204 executes on the mobile computing device 102a. In another embodiment, the one or more resources 204 may include an application program to establish a connection 104 with the client 102b and/or a connection 104' with the server 106. In one embodiment, the mobile computing device 102a or the client 102b may execute, operate or otherwise provide the application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the mobile computing device 102. In some embodiments, the application may be a server-based or a remote-based application executed on behalf of the mobile computing device 102a or the client 102b on a server 106. In one embodiments the server 106 may communicate with the mobile computing device 102a or the client 102b using any presentation layer protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash.

In one embodiment, one or more resources 204 may execute in a virtual machine on the mobile computing device 102a as described with respect to FIG. 7A. In one embodiment, the mobile computing device 102a transfers execution of the virtual machine to the client 102b and/or the server 106. In another embodiment, the mobile computing device 102a transfers execution of a resource 204 in a virtual machine to the client 102b and/or the server 106. In one embodiment, when the mobile computing device 102a attaches to the client 102b, the mobile computing device 102a may transmit to the server 106 an identification of the attached client 102b. The server 106 may identify a virtual machine on the client 102b. In some embodiments, the server 106 may disconnect a resource 204 executing in a virtual machine on the mobile computing device 102a and connect the resource 204 to the virtual machine on the client 102b. In these embodiments, the server 106 may transmit information regarding the state of execution of the resource to the virtual machine on the client 102b. In other embodiments, the server 106 may transfer execution of a resource executing in a virtual machine by disconnecting the virtual machine from the mobile computing device 102a and connecting the virtual machine to the client 102b.

In one embodiment, the server 106 provides access to a computing environment to the client 102b. An example of such a computing environment is the XenDesktop distributed by Citrix Inc. of Ft. Lauderdale, Fla. In another embodiment, the output of the resource 204 that is executed on the server 106 for the mobile computing device 102a is displayed as a part of the computing environment on the client 102b through the connection 104". In still another embodiment, the output of the resource 204 executing on the server 106 for the mobile computing device 102a is displayed on the client 102b through the connection 104" but not as a part of the computing environment.

Referring now to FIG. 8B, a flow diagram depicts one embodiment of the steps taken in a method for executing resources for a mobile computing device remotely on a server and displaying output from the resources on a client device. The method includes the step of connecting, by an agent on a mobile computing device 102a, to a server 106 via a first session to execute and display output data of a resource 204 executed on the server 106 (step 810). The method also includes the step of connecting by the agent on the mobile computing device 102a with a client 102b via a second session (step 812). The method further includes the step of establishing, by an agent executing on the client 102b a third session with the server 106 (step 814). In one embodiment, the server 106 displays a computing environment on the client 102b. In another embodiment, the computing environment includes a display of output generated by an execution, on a remote server 106, of the resource 204.

In one embodiment, an agent or application program on the mobile computing device 102a connects to a server 106 to establish the connection 104' (step 810). In another embodiment, a first session is established between the mobile computing device 102a and the server 106 for the mobile computing device 102a to access resources 204 on the server 106. In still another embodiment, the mobile computing device 102a executes a resource 204 on the server 106 via the first session. In yet another embodiment, the output of the execution is displayed on the mobile computing device 102a. In a further embodiment, the output of the execution is transmitted to a client 102b.

The agent on the mobile computing device 102a connects with a client 102b via a second session over connection 104 (step 812). In one embodiment, the second session is set up by the agent that sets up the first session. In another embodiment, the second session is set up by an agent separate from the agent that sets up the first session. In one embodiment, the first session and the second session function according to a substantially same protocol. In another embodiment, the first session and the second session function according to separate protocols. In still another embodiment, the connection between the mobile computing device 102a and the client 102b may be chosen from a plurality of possible connections as described with reference to FIG. 5A.

In one embodiment, an agent on the client 102b establishes a third session between the client 102b and the server 106 over the connection 104" (step 814). In another embodiment, the server 106 transmits to the client 102b a computing environment over the connection 104". In an example embodiment, the computing environment is a XenDesktop distributed by Citrix Systems Inc. of Ft. Lauderdale, Fla. In one embodiment, the output data generated by the execution of the resource 204 is incorporated into a display of the computing environment as described in greater detail in connection with FIGS. 10-11. In another embodiment, the output data generated by the execution of the resource 204 is transmitted from the server 106 to the client computing device 102b over the connection 104". In still another embodiment, the output data generated by the execution of the resource 204 is displayed on the client 102b separately from the computing environment.

In one embodiment, the resource 204 is executed on the mobile computing device 102a and output data generated by the execution of the resource 204 is transmitted to the server 106 over connection 104' to be forwarded to the client 102b over the connection 104" for display. In another embodiment, execution of the resource is transferred or relocated to the client 102*b*. In still another embodiment, output data generated by the resource 204 is displayed inside the computing environment. In yet another embodiment, the execution of the resource 204 is transferred to the server 106. In one embodiment the output data from the execution on the server 106 is transmitted to the mobile computing device 102*a* and/or the client 102*b*.

FIG. 9A depicts an embodiment of a system for displaying and activating disconnected sessions between a mobile computing device and a server. In FIG. 9A, a block diagram depicts a system 900 including the mobile computing device 102 and the server 106, although any type of client may be used in place of the mobile computing device 102. In one embodiment, the mobile computing device 102 includes an input module 908, a client process 910, a network module 912, and a display module 924. The input module 908 provides an interface for a user of the mobile computing device 102 to interact with the mobile computing device 102, for example, to request the remote execution of an application 916 in a session 918 from the server 106.

Referring now to FIG. 9A, now in greater detail, a server 106 for displaying and activating disconnected sessions includes a network module 920, a data store 926, and a server process 922. The network module 920 receives authentication information associated with a user of a mobile computing device 102. The data store 926 enumerates at least one disconnected session associated with the user. The server process 922 transmits, to the mobile computing device 102, a graphical representation of the at least one disconnected session associated with the user. The server process 922 receives a request to connect to the at least one disconnected session. The server process 922 connects the mobile computing device 102 to the requested at least one disconnected session enumerated in the data store 926.

In one embodiment, a session 918 is a process, operating on the server 106, that supports the execution of one or more applications 916. In some embodiments, execution of a session 918 includes execution of a desktop application 916 from which the execution of other applications 916 can be initiated. In other embodiments, a session 918 is a session between a mobile computing device 102 and a hosted desktop provided by a virtual machine executing on a server 106. In one of these embodiments, a desktop session 918' executes within the session 918. In another of these embodiments, one or more applications 916 execute within a desktop session 918' executing within the session 918. In still other embodiments, a session 918' may execute within a second session 918. In one of these embodiments, for example, a virtual machine on a server 106 executes a session 918 and a second session 918'—such as a desktop session within which a plurality of applications 916 executes—executes within the session 918. In yet another embodiment, the session 918 includes an instance of the execution of a single application 916.

In one embodiment, the input module 908 is, for example, a graphical user interface that provides one or more icons or menu selections for a user to select. In another embodiment, at least one icon or menu selection represents a specific application 916 available for remote execution. In still another embodiment, selecting an icon or menu selection initiates the transmittal of a log-on request to the server 106 for access to that application 916. In still even another embodiment, an icon or menu selection does not represent any specific application 916, but instead represents a general server 106 log-on procedure. In yet another embodiment, the input module 108 is non-graphical user interface. In this embodiment, the user can enter a command to send a log-on request to server 106. Entering a command can include typing a predefined set of characters or depressing a specified key sequence on an input device (e.g., a keyboard or keypad). In one embodiment, the log-on request includes user-provided authentication information. In another embodiment, the input module 908 accepts the input of the user-provided authentication information, which can include any type of authentication information, including, without limitation, any of user name-password/PIN combinations, voice samples, one-time passcodes, biometric data, digital certificates, or smart card data. In some embodiments, the input module 908 is in communication with additional hardware peripherals to facilitate acceptance of user authentication information.

Information associated with a user may be transmitted from the mobile computing device and received by the server. In one embodiment, the input module 908 accepts authentication information and provides it to the client process 910. In another embodiment, the client process 910 manages the mobile computing device-side functionality of the remotely-executing session. In still another embodiment, the client process 910 forwards user input including the authentication information and requests for termination or disconnection of sessions 918 to the server 106. In still even another embodiment, the server 106 receives the information associated with a user of a mobile computing device 102 and authenticates the user responsive to the information. In yet another embodiment, the client process 910 processes data received from the server 106, for example, by forwarding graphical output data generated in a session 918, or a graphical representation of output data from a session 918, to the display module 924.

The network module 912 provides for communication between a mobile computing device 102 and the server 106. The network module 920 provides communication functionality for the server 106. In one embodiment, the network module 912 sends user input, such as authentication information and requests for access to, disconnection from, or termination of sessions 918 executing on the server 106. In another embodiment, the network module 912 also receives output data from the sessions 918 and forwards the output data to the client process 910. In still another embodiment, the network module 912 encapsulates user input into, and reconstitutes session output data from, a predetermined protocol for transmission to the server 106. In yet another embodiment, the network module 912 encrypts outgoing transmissions and decrypts incoming transmissions.

In some embodiments, the network module 920 receives authentication information associated with a user of a mobile computing device 102. In another embodiment, the network module 920 receives communications from the mobile computing device 102 over one or more data networks or links 921. In still another embodiment, the network module 920 transmits output data to the mobile computing device 102. In still even another embodiment, the network module 920 encrypts outgoing communications and decrypts incoming communications. In one embodiment, the network module 920 of the server 106 communicates with the network module 912 of a mobile computing device 102 over a network 104. In another embodiment, incoming communications, once decrypted or retrieved from a protocol (if necessary), are forwarded to a session 918 or to the server process 922, as appropriate.

In some embodiments, the network module 920 encapsulates outgoing communications in a protocol for transmission and retrieves incoming data from transmissions received according to a communications protocol. In one of these embodiments, network module 920 uses at least one communication protocol to encapsulate data. In another of these embodiments, a first communication protocol, capable of encapsulating secondary protocols used in communications between the mobile computing device and the host service, ensures that data is maintained during a disrupted network connection. In still another of these embodiments, data communicated between the mobile computing device and the host service is buffered. When, for example, a mobile computing device roams between different access points in the same network, the buffered data is maintained during the temporarily disrupted network connection. Similarly, in another example, when a mobile computing device switches between networks (e.g., from a wired network to a wireless network) the buffered data is maintained during the temporarily disrupted connection to the host service. In still even another of these embodiments, buffered data can also be maintained, for example, when the network connection is disrupted due to a failure of a server side component (e.g., a failure of a server side proxy), due to a time-out in the system, or due to other reasons. In yet another of these embodiments, the network module 920 provides session persistence and reliability by encapsulating secondary protocols within the first communication protocol.

In one embodiment, at least one previously disconnected application session already associated with the user is identified responsive to the authentication information. In another embodiment, at least one previously disconnected desktop session already associated with the user is identified responsive to the authentication information. In some embodiments, the mobile computing device 102 receives output data generated by the at least one previously disconnected session. In one of these embodiments, an application executing within the at least one previously disconnected session generates the output data. In another of these embodiments, the mobile computing device 102 generates a graphical representation of the at least one previously disconnected session using the received output data. In still another of these embodiments, the mobile computing device 102 receives a graphical representation of the output data.

The mobile computing device 102 may receive and display a graphical representation representing at least one previously disconnected session associated with the user. In one embodiment, the display module 924 displays the graphical representation of the at least one previously disconnected session to a user of the mobile computing device 102. In some embodiments, output data is displayed to the user. In other embodiments, a graphical user interface is displayed to the user with the received graphical representation. In still other embodiments, the received graphical representation incorporates a graphical user interface element. In yet other embodiments, a text-based representation of output data generated by a disconnected session is displayed to the user.

In one embodiment, the display module 924 displays the output data generated by an application 916 or a session 918 from a remotely-executing session 918. In another embodiment, the display module 924 forwards output data received from the client process 910 directly to a display device, such as the display device 124 described above in connection with FIGS. 1B and 1C, or other suitable form of display device. In some embodiments, the received output data is encrypted, encapsulated in a protocol, or both. In one of these embodiments, the display module 924 first manipulates the output data so that the output data can be interpreted by a standard display adapter such as a computer video card.

A user may request to connect to at least one previously disconnected session, and the request may be transmitted to the server. In one embodiment, a user of the mobile computing device 102 selects a graphical representation to which to connect. In another embodiment, the mobile computing device 102 transmits the request to connect responsive to selection of a corresponding graphical representation selected by a user. Output data generated by the at least one previously disconnected session associated with the user is received in response to the transmitted request. The output data generated by the session, and by applications executing within the session, are received and displayed as described below.

The server process 922 manages the execution and termination of sessions 918 and the connections and disconnections of those sessions 918 to the mobile computing device 102. In one embodiment, the server process 922 can initiate new sessions 918, disconnect a mobile computing device 102 from a session 918, detect a mobile computing device 102 disconnection from a session 918, locate a session 918 from which a user has disconnected, locate a session 918 to which a user of a mobile computing device 102 is connected to a client computing device 102b, receive a request to connect to a disconnected session, and connect a user to a disconnected session 918. In another embodiment, the sessions 918 are configured with a user's personal preferences and authorization privileges.

The output transmitter 924 transmits output data from a session 918 to a mobile computing device 102 through the network module 920. In one embodiment, the output transmitter 924 intercepts the output data generated in a session 918 and determines which mobile computing device 102 is connected to the session 918. If the session 918 is connected to a mobile computing device 102, the output transmitter 924 transmits the output data to the connected device via the network module 920. In one embodiment, if the session 918 is not connected to a mobile computing device 102, the output transmitter 924 discards the output data and waits to receive future output data. In another embodiment, if the session 918 is not connected to a mobile computing device 102, the output transmitter 924 disregards all further output data until the output transmitter 924 receives notification that a session 918 has connected to a mobile computing device 102. In some embodiments, as described in further detail below, if the sessions 918 are not connected to a mobile computing device 102, the output transmitter 924 transmits, to a mobile computing device 102, a graphical representation of at least one disconnected session associated with the user.

In one embodiment, the output transmitter 924 stores the data until the output transmitter 924 receives notification that the session 918 has connected to a mobile computing device 102. In another embodiment, the output transmitter 924 attempts to send output data to a mobile computing device 102 until the server process 922 notifies the output transmitter 924 that the mobile computing device 102 is disconnected from the server 106. In still another embodiment, the output transmitter 924 determines which of the mobile computing device 102 or other client, if any, the session 918 is connected to by consulting the data store 926. In yet another embodiment, the server process 922 determines to which of the mobile computing device 102 or other client, if any, the session 918 is connected by consulting the data store 926 and transmits the determination to the output transmitter 924.

At least one disconnected session already associated with the user is identified in response to the information. In one embodiment, the at least one disconnected session already associated with the user continues to execute at least one application. In another embodiment, the at least one disconnected session already associated with the user continues to execute a desktop session. In still another embodiment, a server 106 identifies the at least one disconnected session.

In one embodiment, a first session executing on a first server is identified. In some embodiments, a second session executing on a second server is identified. In one of these embodiments, one of the first session and the second session is identified as a disconnected session. In other embodiments, a second session executing on the first server is identified. In one of these embodiments, one of the first session and the second session is identified as a disconnected session.

The data store 926 includes information related to sessions 918 initiated by users. In one embodiment, the data store 926 is stored in volatile or non-volatile memory. In another embodiment, the data store 926 is distributed through multiple servers. Table 1 shows the data included in a portion of an illustrative data store 926.

TABLE 1

|  | Session | | |
| --- | --- | --- | --- |
|  | Session 1 | Session 2 | Session 3 |
| User ID | User 1 | User 2 | User 1 |
| Client ID | First Client |  | First Client |
| Client Address | 172.16.0.50 |  | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative data store 926 in Table 1 includes data associating each session 918 with the user that initiated the session 918, an identification of the mobile computing device 102 or the client computing device 102b, if any, from which the user is currently connected to the server 106, and the internet protocol (IP) address of the mobile computing device 102 or the client computing device 102b. The illustrative data store 926 also includes the status of each session. A session 918 status can be, for example, "active" (meaning a user is connected to the session 918), or "disconnected" (meaning a user is not connected to the session 918). In another embodiment, a session status can also be set to "executing-disconnected" (meaning the user has disconnected from the session 918, but applications in the session 918 are still executing), or "stalled-disconnected" (meaning the user is disconnected and applications 916 in the session 918 are not executing, but their operational state immediately prior to the disconnection has been stored). The data store 926 further stores information indicating the applications 916 that are executing within each session 918 and data indicating a process associated with each application 916. In one embodiment, where the server 106 resides in a server farm, the data store 926 also includes the data in the last two rows of Table 1 that indicate on which server in the server farm each application 916 is or was executing, and the IP address of that server. In other embodiments, the data store 926 includes a status indicator for each application 916 in each session 918.

For example, and referring to Table 1, three sessions 918 exist, Session 1, Session 9, and Session 3. Session 1 is associated with User 1, who is currently using terminal 1. Terminal one's IP address is 172.16.2.50. The status of Session 1 is active, and in Session 1, a word processing program is being executed on Server A as process number 1. Server A's IP address is 172.16.2.55. Session 2 in Table 1 is an example of a disconnected session 918. Session 2 is associated with User 2, but Session 2 is not connected to a mobile computing device 102. Session 9 includes a database program that is executing on Server A, at IP address 172.16.2.55 as process number 3. Session 3 is an example of how a user can interact with sessions 918 operating on different servers 106. Session 3 is associated with User 1, as is Session 1. Session 3 includes a spreadsheet program that is executing on Server B at IP address 172.16.2.56 as process number 2, whereas the session 918 included in App Session 1 is executing on Server A.

In one embodiment, the server 106 also includes a rules source 928. In another embodiment, the rules source 928 stores rules specifying a policy applicable to a user requesting access to a session 918, or to an application 916 in a session 918. In still another embodiment, the rules stored in the rules source 928 are specified at least in part by the system administrator. In still even another embodiment, a user specifies at least some of the rules stored in the rules source 928. In this embodiment, the user-specified rule(s) may be referred to as preferences. In yet another embodiment, the rules source 928 can be stored in volatile or non-volatile memory or distributed through multiple servers.

In one embodiment, a rule stored in the rule source 928, for example, might require or forbid automatic connection to disconnected sessions 918. In another embodiment, a rule might require or forbid automatic connection to active sessions 918 currently connected to a different mobile computing device 102. In still another embodiment, a rule might make a connection contingent on the mobile computing device 102 residing within a secure network. In still even another embodiment, a rule might only allow connection to sessions 918 after receiving user approval. In still another embodiment, a rule might only allow connection for a predetermined time after disconnection. In yet another embodiment, a rule may only allow connection to sessions 918 that provide access to specific applications 916.

In some embodiments, the authentication module 930 authenticates a user that attempts to log on to the server 106. In one embodiment, the authentication module 930 receives user-provided authentication information transmitted from the mobile computing device 102. In another embodiment, the authentication module 930 authenticates the user based on user-provided authentication information. In yet another embodiment, the authentication module 930 transmits, responsive to a successful authentication, the results of the authentication process (e.g., allow or deny access, the user's system ID, mobile computing device ID, user access permissions, etc.) to the server process 922.

Unintentional termination of sessions 918 resulting from imperfect network connections or users' failure to terminate their sessions 918 themselves can lead to user difficulties. In one embodiment, these difficulties are addressed by differentiating disconnection (which is treated as if the user is not done working with a session 918) from termination (which is assumed to be an intentional completion of the session) and by correlating sessions 918 with users as opposed to correlating sessions with client computers. In some embodiments, when a user is finished executing an application 916 operating in a session 918, the user can terminate a session 918. In one of these embodiments, termination generally involves the affirmative input of the user indicating that the server should no longer maintain the session 918. In another of these embodiments, affirmative user input can include selecting an "Exit" option from a menu, clicking on an icon, or entering a termination command into a command-line interface. In still another of these embodiments, in response to receiving a termination request, the server process 922 terminates the execution of the session 918 and of any application 916 within that session 918 is halted. In another of these embodiments, data related to the session 918 is also removed from the data store 926.

In other embodiments, disconnection, either intentional or unintentional does not result in termination of sessions 918. In one of these embodiments, the application or applications operating in a session 918 are executing on the server 106 and a connection to the mobile computing device 102 is not usually necessary to continue execution of the applications 916. In another of these embodiments, the applications 916 continue to execute while waiting for a user to connect to the session 918. In still another of these embodiments, upon disconnection of a user, the server process 922 stalls the execution of the applications 916 operating in the session 918. In this embodiment, the server process 922 halts further execution of the applications 916, and the server process 922 stores the operational state of the application 916 and any data the application 916 is processing. In still even another of these embodiments, the server process 922 can selectively stall execution of specific applications 916 after a user disconnects. For example, and in one embodiment, the server continues execution of an application 916 for a fixed time period, and if a user fails to connect within that time period, the server process 922 stalls the application 916. In yet another of these embodiments, the server process 922 stalls specified sessions 918 that cannot continue executing without user input. In other embodiments, the server process 922 updates a data record associated with the application 916 or with the session 918 to include an identification of the status of the application or session.

In some embodiments, the server process 922 continues execution of the application 916 while the session 918 remains disconnected from the mobile computing device 102. In other embodiments, if the user of a mobile computing device 102 disconnects from the server 106 and then connects to the server 106 while operating the mobile computing device 102, the client computing device 102b, or a second client computing device 102n (not shown), the server process 922 can connect the user to one or more previously initiated, non-terminated session(s) 918 associated with the user, and reinitiate execution of any stalled applications 916.

In one embodiment, the server process 922 detects a disconnection. A user can intentionally and manually instruct the server to disconnect a session 918 from the mobile computing device 102. For example, in one embodiment, sessions 918 provide a menu option for disconnection (as distinguished from termination above) that a user can select. The server process 922 can also detect an unintentional disconnection. For example, in one embodiment, the network module 920 of the server 106 informs the server process 922 when a predetermined number of data packets transmitted by the network module 920 to a mobile computing device 102 have not been acknowledged by the mobile computing device 102. In another embodiment, the mobile computing device 102 periodically transmits a signal to the server 106 to confirm that a connection is still intact. If the server process 922 detects that a predetermined number of expected confirmation signals from a mobile computing device 102 have not arrived, the server process 922 determines that the mobile computing device 102 has disconnected. If the server process 922 detects that a user has disconnected from a session 918, either intentionally, or unintentionally, the entry in the data store 926 related to the disconnected session 918 is modified to reflect the disconnection.

A graphical representation of the at least one disconnected session associated with the user may be displayed to the user. The server process 922 transmits, to the client 102, a graphical representation of the at least one disconnected session associated with the user. In one embodiment, the graphical representation displays a representation of output data generated by an executing, disconnected session. In another embodiment, the graphical representation displays a representation of output data generated by an application executing in a disconnected session. In still another embodiment, the server process 922 transmits, to a mobile computing device 102, output data generated by an executing, disconnected session. In still even another embodiment, the mobile computing device 102 displays, to the user, a graphical representation of the output data. In yet another embodiment, the server process 922 transmits, to the mobile computing device 102, a graphical representation comprising a user interface element. In some embodiments, an output transmitter 924 transmits, to the mobile computing device 102, the output data generated by an executing, disconnected session.

In one embodiment, the server process 922 transmits, to the mobile computing device 102, a representation of a state of the at least one disconnected session associated with the user. In another embodiment, the server process 922 transmits, to the mobile computing device 102, a description of a state of the at least one disconnected session associated with the user. In still another embodiment, the server process 922 transmits, to the mobile computing device 102, a text-based description of a state of the at least one disconnected session associated with the user.

In some embodiments, the server process 922 transmits, to the mobile computing device 102 output data generated in the at least one disconnected session. In one of these embodiments, the mobile computing device 102 generates the representation, graphical or text-based, of the output data received from the at least one disconnected session. In another of these embodiments, the mobile computing device 102 displays the output data as described above. In still another of these embodiments, the mobile computing device 102 displays the representation of the output data in a window generated by an internet browser application. In yet another of these embodiments, the mobile computing device 102 replaces an existing representation of output data with an updated version of the representation. In some embodiments, the representation 950 (not shown) of the output data is graphical. In other embodiments, the representation of the output data is text-based.

In some embodiments, a graphical representation 950 may depict the output of multiple applications executing within a disconnected session 918. In one of these embodiments, the graphical representation 950 depicts the output of multiple applications executing from a desktop application, which is provided by a session 918. In other embodiments, a plurality of graphical representations 950 is displayed to the user of the mobile computing device 102. In one of these embodiments, a first graphical representation 950 in the plurality of graphical representations depicts a first type of session 918 and a second graphical representation 950' (not shown) in the plurality of graphical representations depicts a second type of session 918. For example, the first graphical representation 950 may depict the application-output data generated by a single application executing in a session 918, while the second graphical representation 950' may depict the output data generated by a plurality of applications executing within a hosted desktop session 918'. In still other embodiments, a single graphical representation 950 is depicted.

In some embodiments, the server process 922 identifies a change in the at least one disconnected session associated with the user and transmits a modified version of the at least one disconnected graphical representation of the at least one session displayed to the user, responsive to the identified change. In one of these embodiments, the server process 922 requests an identification of a change in the at least one disconnected session. In another of these embodiments, the server process 922 requests the identification of the change from a server executing the session 918. In still another of these embodiments, the server process 922 requests, after a time interval, an identification of a second change in the at least one session associated with the user. In still even another of these embodiments, the server process 922 polls a server executing the session 918 for changes in the at least one application session. In yet another of these embodiments, the server process 922 updates, after a time interval, the graphical representation of the at least one application session displayed to the user, responsive to an identification of a second change in the at least one application session associated with the user.

In other embodiments, the server process 922 queries the data store 926 to determine that a previously connected session has become disconnected from a mobile computing device 102. In one of these embodiments, the server process 922 instructs the output transmitter 924 to transmit, to the mobile computing device 102, the output data generated by the session 918 prior to the disconnection.

In some embodiments, the server process 922 receives a request for the identification of the change. In one of these embodiments, the server process 922 receives the request from the mobile computing device 102. In another of these embodiments, the server process 922 transmits the identification of the change to the mobile computing device 102. In other embodiments, the server process 922 transmits, to the mobile computing device 102, an updated graphical representation of the at least one session, responsive to an identification of a change in the at least one session associated. In still other embodiments, the server process 922 transmits, to the mobile computing device 102, output data generated in the session 918. In one of these embodiments, the mobile computing device 102 generates the graphical representation of the output data and displays the graphical representation to the user.

In some embodiments, the mobile computing device 102 requests, from the server 106, the identification of a change in the at least one previously disconnected session associated with the user. In other embodiments, the mobile computing device 102 requests, from a server 106, which executes the at least one previously disconnected session, the identification of a change in the at least one previously disconnected session associated with the user. In still other embodiments, the mobile computing device 102 requests, after a time interval, an identification of a change in the at least one previously disconnected session associated with the user. In still even other embodiments, the mobile computing device 102 polls a server for an identification of a change in the at least one previously disconnected session associated with the user.

In some embodiments, the mobile computing device 102 receives an identification of a change in the at least one previously disconnected session. In other embodiments, the mobile computing device 102 receives output data generated by a session during a time interval. In still other embodiments, the mobile computing device 102 receives a modified version of the graphical representation. In yet other embodiments, the mobile computing device 102 displays a modified version of the graphical representation.

Referring now to FIGS. 9B and 9C, a flow diagram depicts one embodiment of the steps taken in a method for displaying, activating, and providing remote access to disconnected sessions. The steps in the lefthand column may be taken, for example, by a client, such as a mobile computing device. The steps in the righthand column may be taken, for example, by a server. The method includes the step of transmitting information associated with a user. (step 940) The method includes the step of receiving information associated with a user. (step 942) At least one disconnected session already associated with the user is identified in response to the information. (step 944) A graphical representation of at least one disconnected session associated with the user is transmitted to the user. (step 946) A graphical representation representing at least one disconnected session associated with the user is received. (step 948) The graphical representation is displayed to the user. (step 950). A request to connect to the at least one previously disconnected session is transmitted. (step 952) A request from a user to connect to the at least one disconnected session is received. (step 954) A connection is established between a client computer operated by the user and the at least one disconnected session in the request. (step 956) Output data generated by the at least one disconnected session associated with the user is received in response to the transmitted request. (step 958)

Referring to FIG. 9B, and in greater detail, information associated with a user is transmitted. (step 940) In some embodiments, the information is a log-on request. In some embodiments, the information is a log-on request for access to a resource. In other embodiments, the information is a general log-on request for a server. In various embodiments, information may include authentication information. The authentication information may be any type of authentication information, include, for example, any username-password/PIN combinations, voice samples, one-time passcodes, biometric data, digital certificates, or smart card data.

In some embodiments, the information is accepted from a user by an input module, such as input module 208, and provided to a client process, such as client process 910. In some embodiments, the information is forwarded to server by a client process, a network module, or a client process and network module in communication with one another. In any embodiments described herein where information is transmitted, the information may be encapsulated in a predetermined protocol prior to transmission. In any embodiments described herein where information is transmitted, the information may be encrypted prior to transmission. In various embodiments, the information is transmitted over a data network or link.

Referring to FIG. 9B, and in greater detail, information associated with a user is received. (step 942) In various embodiments, the information is received by a server. In any embodiments described herein where information is received, the information may be decrypted. In some embodiments, the user is authenticated according to the received information. The information may be analyzed to authenticate the user according to any known method. For example, a hash function may be performed upon the information and the results compared with entries stored in a look-up table to determine if the user should be authenticated.

Referring to FIG. 9B, and in greater detail, at least one disconnected session already associated with the user is identified in response to the information. (step 944) In various embodiments, the information associated with a user includes information that identifies the user. In many embodiments, sessions may be stored in a database, such as a data store. Each session may include information about the session's status, e.g. active, disconnected, terminated, or any other known status. Each session may include information about a user corresponding to the session. The database may be searched for sessions that have a disconnected status and that correspond to the user. Information about the sessions, such as the sessions' server addresses and process numbers, may be stored in a memory or other buffer.

Referring to FIG. 9B, and in greater detail, a graphical representation of at least one disconnected session associated with the user is transmitted to the user. (step 946) In various embodiments, the graphical representation is generated by at least one disconnected session. In some embodiments, the graphical representation is generated by at least one application executing within the at least one disconnected session. The graphical representation may be a graphical-based or text-based representation of the at least one disconnected session. In some embodiments, the graphical representation includes a description of each of the disconnected sessions. In one embodiment, the graphical representation displays output data or a representation of output data generated by at least one disconnected session. In another embodiment, the graphical representation displays output data or a representation of output data generated by an application executing in at least one disconnected session. In various embodiments, the graphical representation includes a user interface element. In many embodiments, the graphical representation of at least one disconnected session associated with the user is transmitted using an output transmitter. In some embodiments, the output transmitter intercepts output data generated by at least one executing, disconnected session and transmits the output data.

Referring to FIG. 9B, and in greater detail, a graphical representation representing at least one disconnected session associated with the user is received. (step 948) In various embodiments, the graphical representation is received by a client process, a network module, or a client process and network module in communication with one another. In some embodiments, the graphical representation is manipulated into a format suitable for interpretation by a standard display adapter. In many embodiments, the graphical representation is stored in a frame buffer. Further, the graphical representation is displayed to the user. (step 950). In many embodiments, the graphical representation is displayed on a display module 924. In some embodiments, the graphical representation is displayed on a native display 201 of a mobile computing device 102. In other embodiments, the graphical representation is displayed on an external display device 202. In some embodiments, a client process transmits the graphical representation to a display module 924 for display on the device.

Referring to FIG. 9C, and in greater detail, a request to connect to the at least one previously disconnected session is transmitted. (step 952) In various embodiments, the request may include the server address, process number, or any other information about the disconnected sessions the user wishes to connect to. The user may make a request by selecting the graphical representation, in part or in whole, of a disconnected session. For example, the user may select an icon corresponding to the disconnected session to request connection. In another example, the user may select a disconnected session from a list of enumerated disconnected sessions. In yet another example, the user may select a disconnected session from a menu of disconnected sessions.

Referring to FIG. 9C, and in greater detail, a request from a user to connect to at least one disconnected session is received (step 954) and a connection is established between a client computer operated by the user and at least one disconnected session in the request. (step 956) In many embodiments, a server process may establish the connection. The connection may be established by forming a connection using the server address, the process number, and the client address. The connection may be established if the requested connection is consistent with a policy. For example, the connection may be established if the policy permits automatic re-connection of disconnected sessions. In another example, the connection may be established if the policy requires a client to reside on a secure network before a connection may be made, and the client does reside on a secure network. In some embodiments, when the connection is established, applications that may have stalled on the previously disconnected session may be re-executed.

Referring to FIG. 9C, and in greater detail, output data generated by the at least one disconnected session associated with the user is received in response to the transmitted request. (step 958) In various embodiments, the output data may be received from storage, such as a buffer, in an output transmitter. In other embodiments, the output data may be received from an output transmitter that intercepts output data generated by applications executing in the sessions and transmits the output data to a client.

Figure 10A:
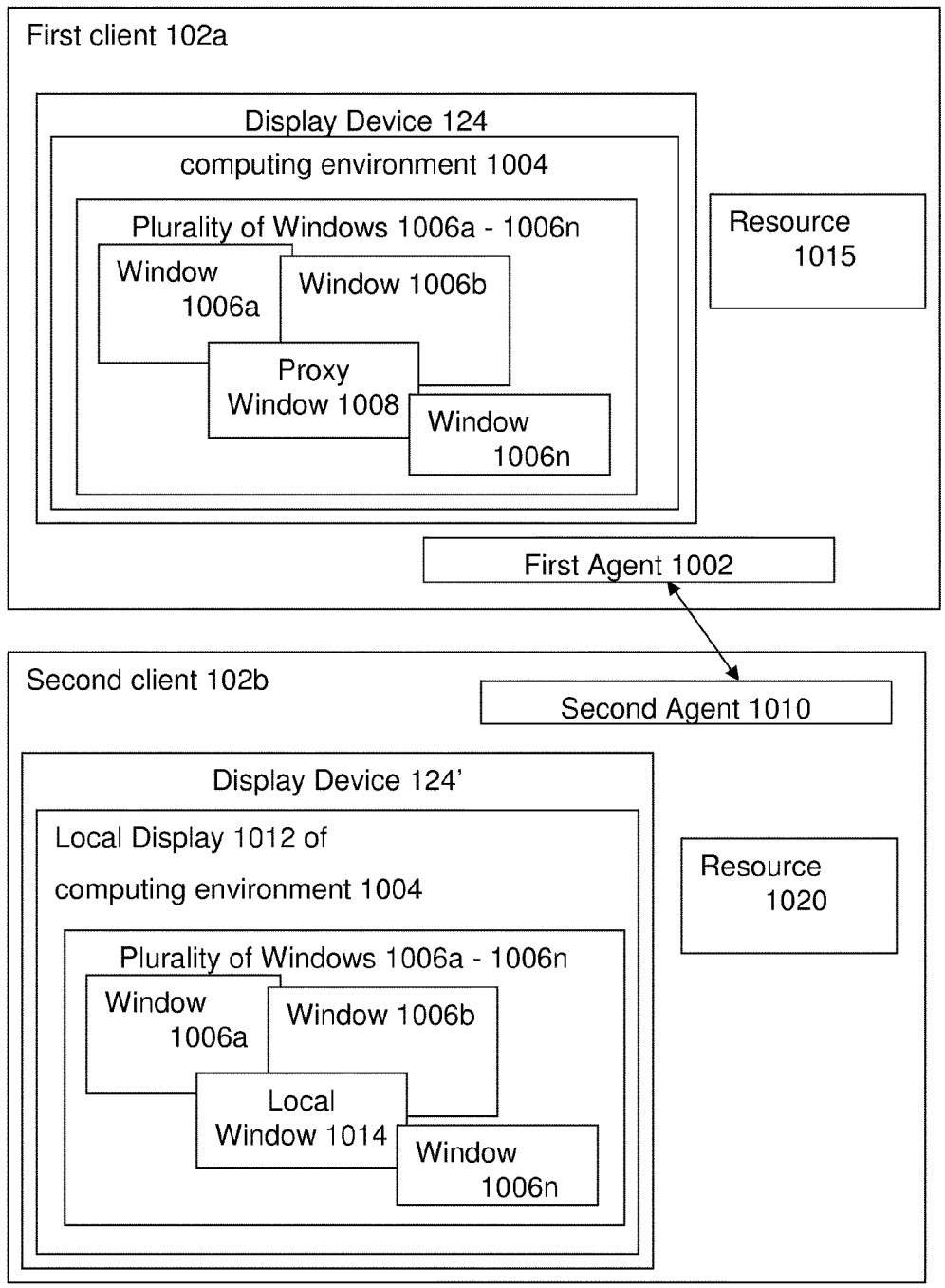
FIG. 10A is a block diagram depicting an embodiment of a system for generating a computing environment on a remote machine for display on a local machine.

Referring now to FIG. 10A, a block diagram depicts one embodiment of a system for generating a computing environment on a remote machine for display on a local machine. In brief overview, the system includes a first client 102a, a first agent 1002, a second client 102b, and a second agent 1010. The first agent 1002, executing on the first client 102a, generates a computing environment 1004, which includes a plurality of windows 1006a-1006n and provides access to i) a resource 1015 available to a user of the second client 102b and provided by the first client 102a, and ii) a resource 1020 provided by the second client 102b that is available to the user of the second client 102b. The first agent 1002 generates a proxy window 1008 for display in the computing environment 1004. The proxy window 1008 represents a local window 1014 on the second client 102b that displays output data generated by the resource 1020 provided by the second client 102b. The proxy window 1008 has a z-order entry in a z-order list associated with the plurality of windows 1006a-n in the computing environment 1004. The second agent 1010 on the second client 102b receives, from the first agent 1002, at least one entry in the z-order list associated with the computing environment 1004 and transmits, to the first agent 1002, an identification of a change to window attribute data associated with the window 1014 on the second client 102b for modification, by the first agent 1002, of the computing environment 1004.

In one embodiment, the first client 102a is a mobile computing device. In another embodiment, the second client 102b is a client computing device. In still another embodiment, one of the first client 102a and the second client 102b may be a server 106. In still even another embodiment a resource executes on an mobile computing device 102a. In yet another embodiment, the output data generated by an execution of a resource on the mobile computing device 102a is displayed on the second client which may be a client computing device. In some embodiments, the output data generated by an execution on a client 102b of a resource 204 is integrated into a display on the mobile computing device.

Referring now to FIG. 10A, and in greater detail, the first agent 1002, executing on the first client 102a, generates a computing environment 1004, which includes a plurality of windows 1006a-1006n and provides access to i) a resource 1015 available to a user of the second client 102b and provided by the first client 102a, and ii) a resource 1020 provided by the second client 102b that is available to the user of the second client 102b. In one embodiment, the first client 102a is a server 106. In another embodiment, the second client 102b is a client device 102, connecting to the server 106 to access one or more resource available to a user of the second client 102b.

In one embodiment, a resource 1015, 1020 comprises a program, an application, a document, a file, a plurality of applications, a plurality of files, an executable program file, a desktop environment, a computing environment, or other resource made available to a user of the second client 102*b*. The resource 1020 may be delivered to the second client 102*b* via a plurality of access methods including, but not limited to, conventional installation directly on the second client 102*b*, delivery to the second client 102*b* via a method for application streaming, delivery to the second client 102*b* of output data generated by an execution of the resource 1020 on a third machine 106' and communicated to the second client 102*b* via a presentation layer protocol, delivery to the second client 102*b* of output data generated by an execution of the resource 1020 via a virtual machine executing on a first client 102*a*, or execution from a removable storage device connected to the second client 102*b*, such as a USB device. In some embodiments, the second client 102*b* transmits output data generated by the execution of the resource 1020 to another client machine 102'.

In some embodiments, a user of a second client 102*b* connects to a first client 102*a* and views a display on the second client 102*b* of a local version 1012 of a computing environment 1004, comprising a plurality of windows 1006*a-n*, generated on the first client 102*a*. In one of these embodiments, at least one resource is provided to the user by the first client 102*a* and displayed in the computing environment 1004. However, there may be resources that the user executes on the second client 102*b*, either by choice, or due to a policy or technological requirement. In another of these embodiments, a user may invoke a local application from the remote desktop interface generated by the first client 102*a* and have the local application appear in the same desktop environment as the remote applications provided by the first client 102*a*. In still another of these embodiments, the user of the second client 102*b* would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In another of these embodiments, requests for execution of a resource, windowing moves, application minimize/maximize, and termination of executing resources may be controlled by interacting with a computing environment that integrates the display of the remote resources and of the local resources. In yet another of these embodiments, an application or other resource accessible via an integrated desktop environment 1004—both those generated on the second client 102*b* and those generated on the first client 102*a*—is shown on the computing environment 1004 as if it were executing on, or executable from, the computing environment. For example, a resource may also appear in a listing of available resources provided in a Start Menu, a shortcut may be provided on the desktop or the Quick Launch menu, and the resources can be launched, selected and interacted with in the same way as an application provided by the first client 102*a*.

In some embodiments, a single computing environment 1004 is displayed. In one of these embodiments, the computing environment 1004 is displayed as a full-screen desktop. In other embodiments, a plurality of computing environments 1004 is displayed. In one of these embodiments, one or more of the computing environments are displayed in non-full-screen mode on one or more display devices 124. In another of these embodiments, the computing environments are displayed in full-screen mode on individual display devices. In still another of these embodiments, one or more of the computing environments are displayed in full-screen mode on one or more display devices 124. In yet another of the embodiments, a resource provided by the second client 102*b* may be integrated with one of the plurality of computing environments 1004.

In some embodiments, the first agent 1002 generates a computing environment 1004 including a plurality of windows 1006*a*-1006*n*. In one of these embodiments, a window 1006*a* in the plurality of windows 1006 displays the output data generated by an execution of a resource provided by the first client 102*a*. In another of these embodiments, a window 1006*b* in the plurality of windows 1006*a*-1006*n* displays the output data generated by an execution of a resource provided by a third machine 106', as discussed in further detail below, in connection with FIGS. 12A and 12B. In still another of these embodiments, a window 1006*c* in the plurality of windows 1006*a*-1006*n* depicts a taskbar from a desktop environment. In still even another of these embodiments, a window 1006*d* represents a menu, such as a Start menu or a context-specific menu associated with an application. In yet another of these embodiments, a window 1006*e* in the plurality of windows 1006*a-n* has a z-order entry such that it is displayed beneath the other windows in the plurality of windows 1006*a-n* and depicts a desktop. In other embodiments, the first agent 1002 transmits, to the second agent 1010, window attribute data associated with each of the plurality of windows 1006*a-n*. In one of these embodiments, the second agent 1010 displays a local version of the plurality of windows 1006*a-n* having window attribute data corresponding to the window attribute data received from the first agent 1002.

In one of these embodiments, the graphical display and the window attribute data for the plurality of windows 1006*a-n* and for the computing environment 1004 are transmitted to the second agent 1010 for generation of a local version of the computing environment 1004. In another of these embodiments, the second agent 1010 displays, to a user of the second client 102*b*, a local version 1012 of the plurality of windows 1006 and the computing environment 1004.

Figure 10B:
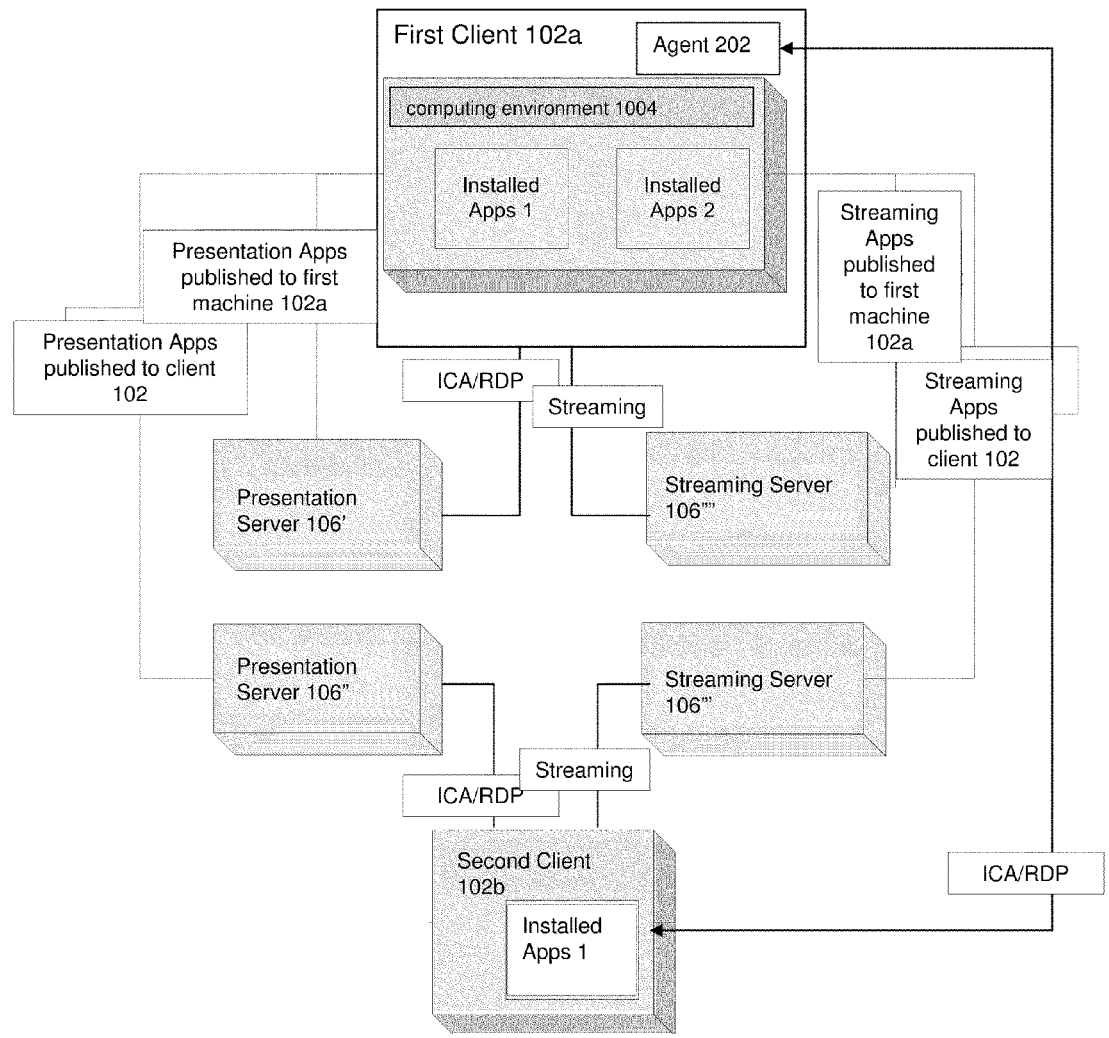
FIG. 10B is a block diagram depicting one embodiment of a system in which an agent integrates applications from various sources into a computing environment.

Referring ahead to FIG. 10B, a block diagram depicts one embodiment of a system in which the first agent 1002 integrates resources from various sources into a computing environment 1004. In some embodiments, and as shown in FIG. 10B, the first agent 1002 may receive the identification of the resources available to a user of the second client 102*b* from a plurality of servers 106. In one of these embodiments, the first agent 1002 receives an identification of the available resources from machines 106', 106", 106''', and 106''''.

In one of these embodiments, the first client 102*a* receives an identification of the available resources from server 106', receives the output data generated by an execution of the resource on server 106' and transmits the output data so generated to second client 102*b*. In another of these embodiments, the first agent 1002 receives only the identification of the available resources from the machine 106", and the machine 106" transmits the output data generated by an execution of the resource to the second client 102*b*.

In one of these embodiments, the first agent 1002 receives, from a machine 106''', an identification of resources available to the second client 102*b*. In another of these embodiments, the first agent 1002 receives, from the second agent 1010, an identification of available resources from the machines 106''' and 106''. In still another of these embodiments, the second client 102*b* receives, via a method for resource streaming, the available resource from the server 106'''. In this embodiment, the second client 102*b* executes the resource locally and the graphical output data is integrated with the computing environment 1004. In still even another of these embodiments, the first client 102*a* receives an identification of the available resources from server 106"", and receives via a method for resource streaming, the available resource from machine 106"" and transmits the output data generated by an execution of the resource to the second client 102*b*. In other embodiments, the first agent 1002 receives, from the second agent 1010, an identification of a resource 1020 available to the user of the second client 102*b* for integration into the computing environment 1004.

In one embodiment, executing a resource provided by the second client 102*b* may allow a user to leverage a characteristic of the second client 102*b* that is not provided by the first client 102*a*; for example, the second client 102*b* may have more appropriate processing ability, graphics functionality, bandwidth, or license rights for accessing the resource than the first client 102*a*. In another embodiment, the first client 102*a* may lack the ability to execute the resource; for example, because only the user of the second client 102*b* owns an application or owns a resource, such as an operating system, required to execute the application. In still another embodiment, the resource 1020 is a resource such as an application or desktop environment installed on the second client 102*b* via a method for streaming the application to the second client 102*b* from a third machine 106'. In still even another embodiment, the resource 1020 is a resource such as an application or desktop environment whose output data the second client 102*b* receives via a presentation layer protocol communication with a third machine 106'. In yet another embodiment, the first agent 1002 receives an identification of a conferencing or Internet-communication application; a user peripheral, such as a media player, a digital camera or a web camera; or a processor-intense, data-intense, or graphics-intense application, such as a media-editing application or a computer-aided design application.

Referring back to FIG. 10A, the first agent 1002 incorporates the identification of the resource 1020 into the computing environment 1004. In one of these embodiments, the first agent 1002 adds a program execution shortcut to a menu for requesting execution of resources, the program execution shortcut corresponding to the identified resource 1020. In another of these embodiments, the first agent 1002 generates a graphical representation, such as an icon, associated with the resource 1020 for display in the computing environment 1004. The first agent 1002 may alternatively receive the graphical representation from the second agent 1010 for display in the computing environment 1004. In still another of these embodiments, a user requests execution of a resource 1020 by interacting with a program execution shortcut or a graphical representation displayed in the local version of the computing environment 1004.

In one embodiment, the first agent 1002 receives the request for execution of a resource 1020, responsive to the user interaction with a program execution shortcut or a graphical representation, and sends the request for execution to the second agent 1010. In another embodiment, a user requests execution of a resource by interacting with the local display 1012 of the computing environment 1004; for example, by selecting a graphical representation of a file, document, uniform resource locator, or other resource, displayed by the desktop environment.

The first agent 1002 generates a proxy window 1008 for integration into the computing environment 1004. In one embodiment, the first agent 1002 is referred to as a proxy window management component 1002. In another embodiment, the proxy window management component 1002 is responsible for making the proxy window 1008 conform to client-initiated changes to window attribute data. In still another embodiment, the proxy window management component 1002 is responsible for monitoring any desktop-initiated changes to window attribute data and communicating them to the second agent 1010, which applies them to the corresponding local application window 1014.

In yet another embodiment (not shown in FIG. 10A), the proxy window management component 1002 provides additional functionality. In one of these embodiments, such functionality may include a MICROSOFT Active Accessibility (MSAA) hook and other monitoring mechanisms to detect new application windows and window attribute data changes initiated on the desktop. In another of these embodiments, the proxy window management component 1002 may further include support for launching published applications. In still another of these embodiments, the proxy window management component 1002 may send updates initiated from the remote machine 106 [desktop] regarding changes to window attribute data to the second agent 1010 where the updates will be applied to the local window 1014, and to the local displays of the plurality of windows 1006*a-n*. In still even another of these embodiments, the proxy management component 1002 may be enabled to apply client-initiated updates to window attribute data associated with proxy window 1008 and to the plurality of data objects 1006*a-n*. In yet another of these embodiments, the proxy management component 1002 may remove proxy windows when the client connection disappears.

In some embodiments, the first agent 1002 and the second agent 1010 include a hooking component for intercepting window-related messages. For example, and in some embodiments, an agent executing on a machine 102 or 106 on which the MICROSOFT WINDOWS operating system executes may use a version of the MICROSOFT Active Accessibility hook to monitor relevant window events. For example, and in other embodiments, an agent may include a MICROSOFT Computer-based Training (CBT) window hook, or other hooking mechanisms, to intercept and monitor window events.

The proxy window 1008 represents a window 1014 on the second client 102*b* that displays output data generated by the resource 1020 provided by the second machine. The proxy window 1008 has a z-order entry in a z-order list associated with the plurality of windows 1006*a-n* in the computing environment 1004. In one embodiment, the proxy window 1008 has a traditional window visual state—position, size, Z-order, focus state, minimized/normal/maximized state—and a taskbar button, and appears in the remote desktop Alt-TAB selection dialog. In another embodiment, the proxy window 1008 responds to requests, initiated by the remote desktop, to change visual state or to invoke its taskbar menu. In still another embodiment, the visual state of the local application window 1014 is synchronized with the visual state of the corresponding proxy window 1008. In still even another embodiment, the proxy window 1008 can pass visual state change requests to the second agent 1010, via the first agent 1002, without needing to apply them to itself.

In one embodiment, the first agent 1002 does not transmit the proxy window 1008 to the second agent 1010, only window attribute data associated with the proxy window 1008. In another embodiment, the proxy window 1008 does not need to be painted on the computing environment 1004, or can be painted very efficiently e.g. in a uniform color. In still another embodiment, the first agent 1002 is aware of the clipping regions associated with the proxy window 1008 and does not send window attribute data for those regions.

The second agent 1010 on the second client 102b receives, from the first agent 1002, at least one entry in the z-order list associated with the computing environment 1004. The second agent 1010 transmits, to the first agent 1002, an identification of a change to window attribute data associated with the window 1014 on the second client 102b for modification, by the first agent 1002, of the computing environment 1004. In one embodiment, the second agent 1010 is an integrated window management component 1010 executing on the second client 102b that enumerates, monitors, and manages local windows 1014 that are integrated into the remote desktop 1004. In another embodiment, the integrated window management component 1010 manages all local windows 1014 that are integrated into the remote desktop 1004. In still another embodiment, the integrated window management component 1010 communicates window existence and client-initiated visual state changes over a virtual channel to the first agent on the first client 102a.

In yet another embodiment, the integrated window management component 1010 provides additional functionality. In one of these embodiments, such functionality may include a MICROSOFT Active Accessibility (MSAA) hook and other monitoring mechanisms to detect new application windows and window attribute data changes initiated on the client. In still another of these embodiments, the proxy window management component 1002 may send updates initiated from the client 102a regarding changes to window attribute data to the first agent 1002 where the updates will be applied to the proxy window 1008, and to the local displays of the plurality of windows 1006a-n. In still even another of these embodiments, the proxy management component 1002 may be enabled to apply desktop-initiated updates to window attribute data associated with local window 1014 and to the local displays of the plurality of windows 1006a-n.

In some embodiments, a first client 102a and a second client 102b communicate using a presentation layer protocol, for example, by communicating via the ICA protocol, or the RDP protocol. In one of these embodiments, the first agent 1002 and the second agent 1010 exchange graphical data, i.e., the data actually displayed in each window on the desktop environment, via a first virtual channel. In another of these embodiments, the first virtual channel is an ICA virtual channel. In still another of these embodiments, information about window positioning, window size, z-ordering of window and other such information is communicated between the first client 102a and the second client 102b via a second virtual channel. In yet another of these embodiments, the second virtual channel is an ICA virtual channel. In other embodiments, the first agent 1002 and the second agent 1010 exchange window attribute data. In one of these embodiments, the first agent 1002 and the second agent 1010 also exchange graphical data. In another of these embodiments, a third agent executing on the first client 102a and the second agent 1010 exchange graphical data. In still another of these embodiments, a third agent executing on the first client 102a and a fourth agent executing on the second client 102b exchange graphical data.

Figure 11A:
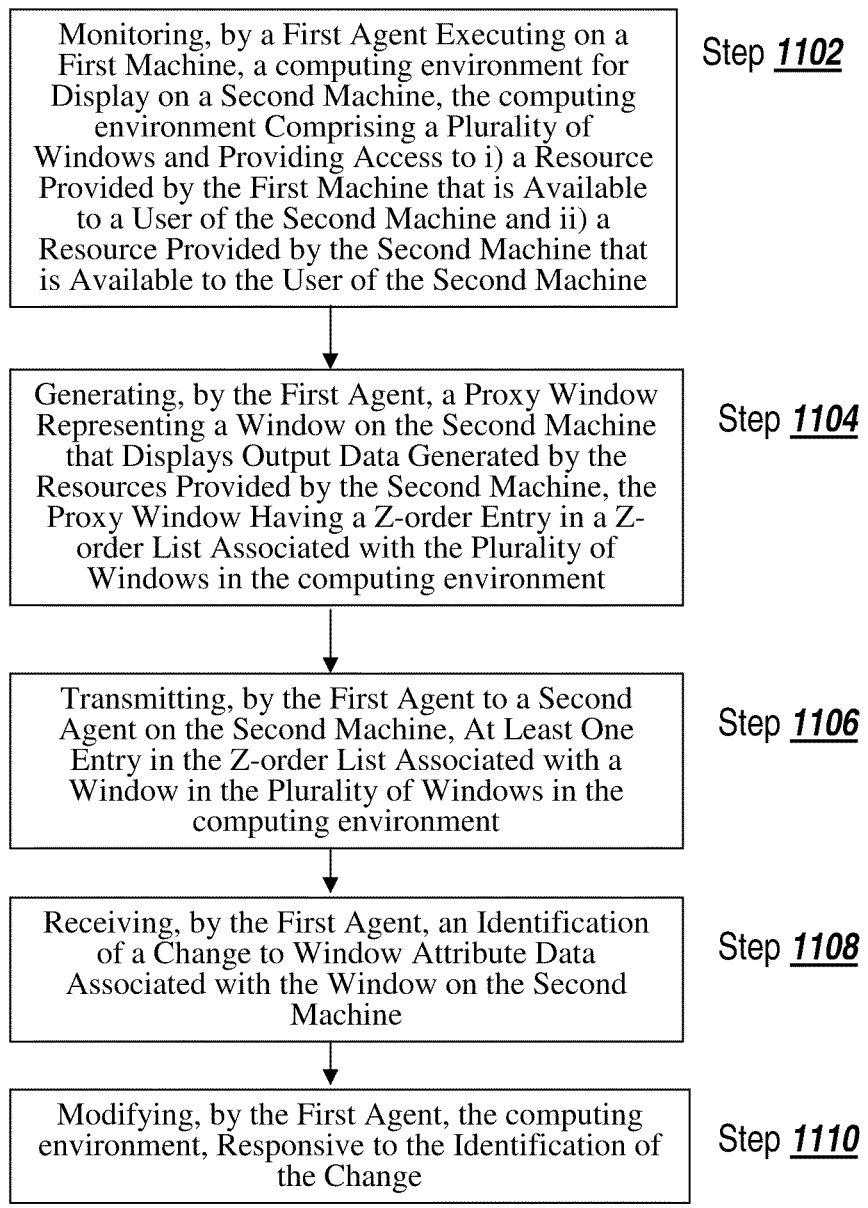
FIG. 11A is a flow diagram depicting one embodiment of the steps taken in a method for generating a computing environment on a remote machine for display on a local machine.

Referring now to FIG. 11A, a flow diagram depicts one embodiment of the steps taken in a method for generating a computing environment on a remote machine for display on a local machine. In a networked computing system including a remote machine and a local machine used by a user, a method for generating a computing environment on the remote machine for display on the local machine, the computing environment providing integrated access both to resources provided by the local machine and to resources provided by the remote machine, includes the step of monitoring, by a first agent executing on a first machine, a computing environment for display on a second machine, the computing environment comprising a plurality of windows and providing access to i) a resource provided by the first machine that is available to a user of the second machine and ii) a resource provided by the second machine that is available to the user of the second machine (step 1102). The first agent generates a proxy window representing a window on the second machine that displays output data generated by the resources provided by the second machine, the proxy window having a z-order entry in a z-order list associated with the plurality of windows in the computing environment (step 1104). The first agent transmits, to a second agent on the second machine, at least one entry in the z-order list associated with a window in the plurality of windows in the computing environment (step 1106). The first agent receives an identification of a change to window attribute data associated with the window on the second machine (step 1108). The first agent modifies the computing environment, responsive to the identification of the change (step 1110).

A first agent executing on a first machine monitors a computing environment for display on a second machine, the computing environment comprising a plurality of windows and providing access to i) a resource provided by the first machine that is available to a user of the second machine and ii) a resource provided by the second machine that is available to the user of the second machine (step 1102). In one embodiment, the first agent 1002 monitors the generation and modification of the computing environment 1004 and of a plurality of windows 1006a-n providing access to a plurality of resources 1015 executing on remote servers, such as the first client 102a, and to at least one resource 1020 provided by the second client 102b.

The first agent generates a proxy window representing a window on the second machine that displays output data generated by the resources provided by the second machine, the proxy window having a z-order entry in a z-order list associated with the plurality of windows in the computing environment (step 1104). In one embodiment, the local window 1014 is reflected into the remote desktop window list using the proxy window 1008, which has dimensions, position, Z-order value and focus state in the computing environment 1004. These window attributes are kept in synch between the second client 102b and the first client 102a.

In some embodiments, the second agent 1010 receives an identification of a region in the computing environment corresponding to a region on the local display 1012 associated with a local resource 1020. In one of these embodiments, the second agent 1010 receives the identification from the first agent 1002. In another of these embodiments, described in additional detail below, the second agent 1010 identifies the region responsive to information received from the first agent 1002. In still another of these embodiments, as described in additional detail below, the second agent 1010 identifies the region responsive to identifying a color key in a communication from the first agent 1002.

In some embodiments, the local display 1012 is a single window that displays the graphical output data of the computing environment 1004, including the window output for the plurality of windows 1006a-n. In one of these embodiments, an individual window 1006a does not need to have a corresponding seamless window on the client. In another of these embodiments, the local display 1012 is maintained as the topmost window, thus keeping local applications underneath the local display 1012 in the client Z-order. In still another of these embodiments, a region of local display 1012 is shown as transparent to allow the correct parts of a local window 1014 to show through the local display 1012, as if the local window 1014 were on the computing environment 1004. In still even another of these embodiments, the proxy window 1008 is displayed on a region of the computing environment 1004 corresponding to the region of local display 1012 which is to be transparently displayed. In yet another of these embodiments, the transparent region is referred to as a clipping region.

In some embodiments, to identify the areas to be made transparent, the first agent 1002 uses the proxy window 1008 to identify a clipping region. In one of these embodiments, the first agent 1002 intercepts a paint request on the computing environment 1004. In another of these embodiments, the first agent 1002 transmits, to the second agent 1010, an identification of a clipping region.

In other embodiments, the second agent 1010 identifies the areas of local display 1012 to be displayed by the local resource 1020. In one of these embodiments, the second agent 1010 identifies the areas responsive to information received from the first agent 1002. In another of these embodiments, the second agent 1010 identifies a key received from the first agent 1002, such as a color key or an identifiable pattern or tag identifying a clipping region.

In still other embodiments, the second agent 1010 ensures that the resource 1020 paints output data to the appropriate local window 1014, which is located in a region corresponding to the clipping region on the computing environment. In one of these embodiments, the second agent 1010, in communication with a window management component, ensures that the local display 1012 is kept topmost and displays the graphical output data associated with the computing environment 1004, other than the output data that would be displayed in a clipping region. In another of these embodiments, the second agent 1010 instructs a window management component to regard an instruction to paint a particular color or pattern to a region (for example, to a region of the local display 1012) as an instruction to keep the region transparent. This color key may include an alpha value (e.g., a 32-bit {R,G,B,alpha} rather than a 104-bit {R,G,B} value) which can be used to distinguish it from all non-transparent colors (for resources that don't use partial transparency).

In yet other embodiments, the agent 1002 paints a clipping region for a proxy window 1008 by responding to a paint request from a window management component to the proxy window by painting the window in a color key. In one of these embodiments, the agent 1010 associates a paint request in a color key with the appropriate local application window. In another of these embodiments, the agent 1010 also needs to use paint requests in a different color for a (part of) an existing clipping region to remove the painted region from the associated clipping region.

In some embodiments, the first agent 1002 may paint a clipping region in the color key rather than send a z-order entry to the second agent 1010. In other embodiments, the first agent 1002 sends at least one z-order entry for a proxy window 1008 associated with a local window 1014. In one of these embodiments, the second agent 1010 ensures that a local window 1014 has the same relative Z-order relationship on the client as the corresponding proxy window 1008 does on the first client 102*a*, i.e. if proxy window 1008 is below proxy window 1008' on the first client 102*a* (regardless of how many server windows there are, and whether they are above or below either A or B), then the second agent 1010 ensures that a local window 1014 is below a local window 1014'.

In other embodiments, the windows underneath the local display 1012 show through wherever the local display 1012 is painted in the color key. In one of these embodiments, the second agent 1010 maintains the local windows in the appropriate relative Z-order so that they will paint correctly and a window that's above another will correctly occlude the other even though both occupy the entire clipping region. In another of these embodiments, the second agent 1010 also ensures that user input will be directed to the correct window—for example a mouse click on a transparent region will be sent to the underlying window, not the local display 1012.

In some embodiments, the first agent 1002 transmits to the second agent 1010 an identification of a clipping region for each proxy window 1008 in a computing environment 1004. In one of these embodiments, the second agent 1010 directs the local resource 1020 to paint output data to the region of local display 1012 corresponding to the clipping region. In another of these embodiments, directing the local resource 1020 to paint output data to a region of the local display 1012 avoids the need for transparency. In still another of these embodiments, the first agent 1002 identifies a clipping region on the computing environment 1004 that corresponds to a region displaying local window 1014. In still even another of these embodiments, the first agent 1002 uses a color key or identifiable pattern or tag as described above to tag a clipping region. In one of these embodiments, the agent 1002 or the agent 1010 associates a paint request in a color key with the appropriate local application window. In another of these embodiments, the agent 1002 or the agent 1010 responds to paint requests in a different color for a (part of) an existing clipping region for an application window by removing the newly painted region from the associated clipping region. In still another of these embodiments, the agent 1002 or agent 1010 associates a different color key for each local window. In yet another of these embodiments, the second agent 1010 identifies a clipping region responsive to information received from the first agent 1002.

In some embodiments, the first agent 1002 may paint a clipping region in a color key rather than send a z-order entry to the second agent 1010. In other embodiments, the first agent 1002 may send an identification of a clipping region to the second agent 1010 rather than send a z-order entry to the second agent 1010. In still other embodiments, the first agent 1002 may send information other than a z-order entry to agent 1010 that allows agent 1010 to identify a clipping region rather than send a z-order entry to the second agent 1010. In yet other embodiments, the first agent 1002 does not send a z-order entry to the second agent 1010 at all.

In other embodiments, the second agent 1010 ensures that the local display 1012 is maintained topmost in the local desktop environment. In one of these embodiments, the local display 1012 is used to show all of the remote desktop graphics output including areas belonging to local window 1014. In another of these embodiments, local windows never show through. In still another of these embodiments, when the second agent 1010 receives output data not containing the color key for a portion of a clipping region associated with a local window, the second agent 1010 removes the output region from the clipping region for that window.

In still other embodiments, the second agent 1010 directs the local resource 1020 to paint the output data it generates to a region in the local display 1012 corresponding to the region identified by the first agent 1002 as a clipping region. In one of these embodiments, the second agent 1010, in communication with a window management component, sends the local resource 1020 a WM_PAINT message for a display context that references a clipping region on the local display

1012. In another of these embodiments, the second agent 1010 sends the messages for any updated portions of a local window's associated clipping region whenever portions of the clipping region change. In still another of these embodiments, the second agent 1010 sends the paint messages in a periodic refresh loop as local windows are always covered by the local display 1012 and can no longer asynchronously update their regions that are visible on the client display. In still even another of these embodiments, the second agent 1010 ensures that user input in clipping regions (including mouse clicks and, where appropriate, keyboard events) are redirected by the local display 1012 to the corresponding local application window. This means detecting mouse events in clipping regions, determining which local window is associated with the mouse event coordinates and sending the event to that window at those coordinates.

As described above, in some embodiments, a clipping region is identified. In one of these embodiments, an agent 1002 or 1010 calculates a clipping region responsive to information associated with the computing environment, including a list of windows, their Z-order, size & position (and, for non-rectangular windows, their shape). In another of these embodiments, the agent 1002 or 1010 acquires the information from one or more sources including, but not limited to, the seamless virtual channel, data used by the Headless Client, subclassing windows, Microsoft Active Accessibility (e.g. using WinEvents and MSAA hooking) and by hooking various Windows APIs. In still another embodiment, the agent 1002 or 1010 identifies a clipping region, or portion of a clipping region, by hooking or responding to window messages (including WM_PAINT, WM_NCPAINT, WM_ERASEBKGND) which allow the agent 1002 or 1010 to see requests by Windows for a window to perform a paint operation within a region. Each time the agent 1002 or 1010 identifies one of these messages, the corresponding region is added to the clipping region for the associated window. The agent 1002 or 1010 uses knowledge of which windows receive which paint requests to maintain a record of which regions of the screen "belong" to each application window. Each time the agent 1002 or 1010 intercepts a paint request for a different window covering (all or part of) an existing clipping region for another window, that part is removed from that window's clipping region. The agent 1002 or 1010 can also directly retrieve the clipping region using Windows API functions such as GetRandomRgn( ) which allows the agent 1002 or 1010 to directly interrogate a window for clipping regions. In some embodiments, the agents 1002 and 1010 communicate as described above to exchange information required by the second agent 1010 to modify the local display 1012 or local windows 1014 or local windows corresponding to the plurality of windows 1006*a-n*, as described below in connection with FIG. 11B.

The first agent transmits, to a second agent on the second machine, at least one entry in the z-order list associated with a window in the plurality of windows in the computing environment (step 1106). In some embodiments, the first agent 1002 transmits to the second agent 1010 the entire z-order list. In other embodiments, the first agent 1002 transmits to the second agent 1010 a partial z-order list. In one embodiment, the first agent 1002 transmits the at least one entry in the z-order list to the second agent 1010 via a virtual channel coupled to the computing environment 1004. In another embodiment, the first agent 1002 transmits, to the second agent 1010, via a virtual channel conveying window attribute data associated with the proxy window 1008, messages directing the modification of a corresponding local window 1014, which displays, in accordance with the window attribute data conveyed by the virtual channel, graphical output data generated by a resource 1020 executing on the second client 102*b*.

In one embodiment, the second client 102*b* displays a local version of each of the plurality of windows 1006*a-n*. In another embodiment, the second agent 1010 directs a window management component on the second client 102*b* to assign each of the locally-displayed windows 1006*a-n* a z-order entry in a z-order list of windows displayed on the second client 102*b*. Each of the assigned z-order entries for each of the locally-displayed windows 1006*a-n* result in the display of the locally-displays windows 1006*a-n* above a local window associated with a local application on the second client 102*b* other than the local display of a local application displayed in local window 1014. In this embodiment, the local window is kept below the local display 1012 of the computing environment 1004 in the client-side Z-order—that is, it is kept below each of the windows in the plurality of windows 1006*a-n* and below the local window 1014, which is integrated with the plurality of windows 1006*a-n*. In still another embodiment, the plurality of windows 1006*a-n* and the local window 1014 are displayed on the second client 102*b* according to the z-order list maintained on the first client 102*a*.

The first agent receives an identification of a change to window attribute data associated with the window on the second machine (step 1108). In one embodiment, the first agent 1002 receives the identification of the change via a virtual channel. In another embodiment, the first agent 1002 receives a message that a user minimized the local window 1014. In still another embodiment, the first agent 1002 receives a message that a user restored a minimized local window 1014. In still even another embodiment, the first agent 1002 receives a message that a user changed a size or position of the local window 1014. In yet another embodiment, the first agent 1002 receives a message that a user maximized a local window 1014.

The first agent modifies the computing environment, responsive to the identification of the change (step 1110). In some embodiments, the first agent 1002 directs a window management component of an operating system executing on the first client 102*a* to modify a window displayed in the computing environment. In other embodiments, the first agent 1002 sends a message to the second agent 1010 to restore the local window 1014. In one of these embodiments, the second agent 1010 sends a message to the resource 1020 to restore the minimized local window 1014. In another of these embodiments, the first agent 1002 sends a message to a window management component of an operating system executing on the first client 102*a* to restore the proxy window 1008. In still other embodiments, the first agent 1002 sends a message to the second agent 1010 to terminate the execution of a local resource 1020 when the first agent 1002 terminates the generation and display of the computing environment 1004. In some embodiments, the first agent 1002 sends a message to the second agent 1010 to terminate an operating system executing on the second client 102*b*. In one of these embodiments, the first agent 1002 sends a message to the second agent 1010 to shut down the second client 102*b*.

In one embodiment, when a window 1006*a* associated with a remote resource 1015 is selected by a user and the local window 1014 loses focus, the second agent 1010 transmits a message to the first agent 1002 instructing the first agent 1002 to direct a window management component to remove focus from the proxy window 1008 and to focus on a window 1006*a* in the plurality of windows 1006*a-n*. In another embodiment, when a window 1006*a* associated with a remote resource 1015 is selected by a user and the local window 1014 loses focus, the second agent 1010 allows the resource 1020 to paint inside its window, resulting in a completely transparent view of local and remote resources.

Figure 11B:
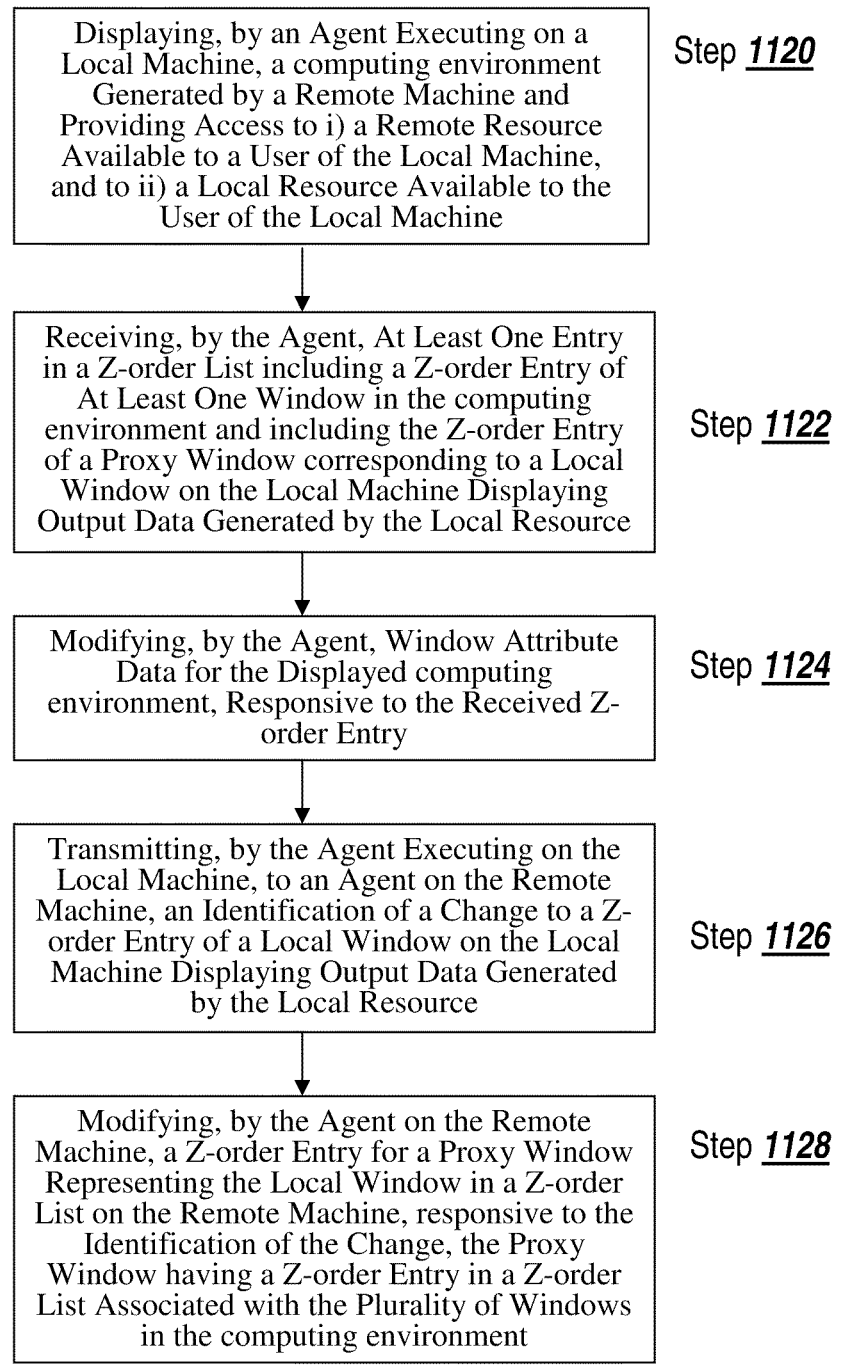
FIG. 11B is a flow diagram depicting one embodiment of the steps taken in a method for displaying, on the local machine, a desktop environment that is generated by the remote machine.

Referring now to FIG. 11B, a flow diagram depicts one embodiment of the steps taken in a method for displaying, on the local machine, a desktop environment that is generated by the remote machine, the computing environment providing integrated access to both resources provided by the local machine and to resources provided by the remote machine. In brief overview, the method includes the step of displaying, by an agent executing on a local machine, a computing environment generated by a remote machine and providing access to i) a remote resource available to a user of the local machine, and to ii) a local resource available to the user of the local machine (step 1120). The agent receives at least one entry in a z-order list including a z-order entry of at least one window in the computing environment and including the z-order entry of a proxy window corresponding to a local window on the local machine displaying output data generated by the local resource (step 1122). The agent modifies window attribute data for the displayed computing environment, responsive to the received z-order entry (step 1124). The agent executing on the local machine transmits, to an agent on the remote machine, an identification of a change to a z-order entry of a local window on the local machine displaying output data generated by the local resource (step 1126). The agent on the remote machine modifies a z-order entry for a proxy window representing the local window in a z-order list on the remote machine, responsive to the identification of the change, the proxy window having a z-order entry in a z-order list associated with the plurality of windows in the computing environment (step 1128).

An agent executing on a local machine displays a computing environment generated by a remote machine and providing access to i) a remote resource available to a user of the local machine, and to ii) a local resource available to the user of the local machine (step 1120). In one embodiment, the agent 1010 receives graphical data and window attribute data from the agent 1002 and displays the graphical data in a window formed according to the window attribute data. In another embodiment, the agent 1010 receives graphical data and corresponding window attribute data for a plurality of windows forming a computing environment and displays the graphical data in a plurality of windows formed according to the window attribute data. In other embodiments, the first agent 1002 and the second agent 1010 exchange window attribute data. In one of these embodiments, the first agent 1002 and the second agent 1010 also exchange graphical data. In another of these embodiments, a third agent executing on the first client 102a and the second agent 1010 exchange graphical data. In still another of these embodiments, a third agent executing on the first client 102a and a fourth agent executing on the second client 102b exchange graphical data. In yet another of these embodiments, the first agent 1002 on the first client 102a and a fourth agent executing on the second client 102b exchange graphical data.

The agent receives at least one entry in a z-order list including a z-order entry of at least one window in the computing environment and including the z-order entry of a proxy window corresponding to a local window on the local machine displaying output data generated by the local resource (step 1122). In one embodiment, the agent 1010 displays a local window 1014 displaying output data, generated by an execution of the resource 1020, and a plurality of windows 1006a-n formed in accordance with received window attribute data, in accordance with the at least one entry in the z-order. In another embodiment, the agent 1010 monitors the local display of the plurality of windows 1006a-n and of the local window 1014. In another embodiment, the agent 1010, in communication with a window management component of an operating system executing on the second client 102b, manages the local display of the plurality of windows 1006a-n and of the local window.

The agent modifies window attribute data for the displayed computing environment, responsive to the received z-order entry (step 1124). In some embodiments, the agent modifies a z-order entry for a local version of a window 1006a in the plurality of windows 1006a-n. In other embodiments, the agent modifies window attribute data for a local version of a window 1006a in the plurality of windows 1006a-n. In one of these embodiments, the agent resizes the local version of the window 1006a in the plurality of windows 1006a-n. In one of these embodiments, the agent repositions the local version of the window 1006a in the plurality of windows 1006a-n. For example, the agent may modify window attribute data of the local window 1014 responsive to the received z-order entry sent as a result of a window management component implementing a window cascade on the server.

In some embodiments, as described above in connection with FIG. 11A (step 1106), rather than receiving a z-order entry, the second agent 1010 receives an identification of a clipping region in the computing environment corresponding to a region on the local display 1012 associated with a local resource 1020. In one of these embodiments, the second agent 1010 receives the identification from the first agent 1002. In another of these embodiments, described in additional detail above, the second agent 1010 identifies the region responsive to information received from the first agent 1002. In still another of these embodiments, as described in additional detail above, the second agent 1010 identifies the region responsive to identifying a color key in a communication from the first agent 1002.

The agent executing on the local machine transmits, to an agent on the remote machine, an identification of a change to a z-order entry of a local window on the local machine displaying output data generated by the local resource (step 1126). In one embodiment, when a user of the second client 102b makes a change to a local window 1014, for example, by minimizing, maximizing, or resizing the window, the agent 1010 transmits a message to the agent 1002 to make a corresponding change to the proxy window 1008 and to its z-order entry in the z-order list ordering the plurality of windows 1006a-n and the proxy window 1008.

The agent on the remote machine modifies a z-order entry for a proxy window representing the local window in a z-order list on the remote machine, responsive to the identification of the change, the proxy window having a z-order entry in a z-order list associated with the plurality of windows in the computing environment (step 1128). In one embodiment, the agent 1010 assigns the local window 1014 a z-order entry synchronized with the z-order entry of the proxy window 1008, which has a z-order entry in a z-order list including z-order entries for a plurality of windows 1006a-n. In another embodiment, generating a z-order list including entries both for windows generated by a resource executing on a server 106 and for windows generated by a resource executing on a client 102 allows for integrated and overlapping displays of local and remote windows.

Figure 12A:
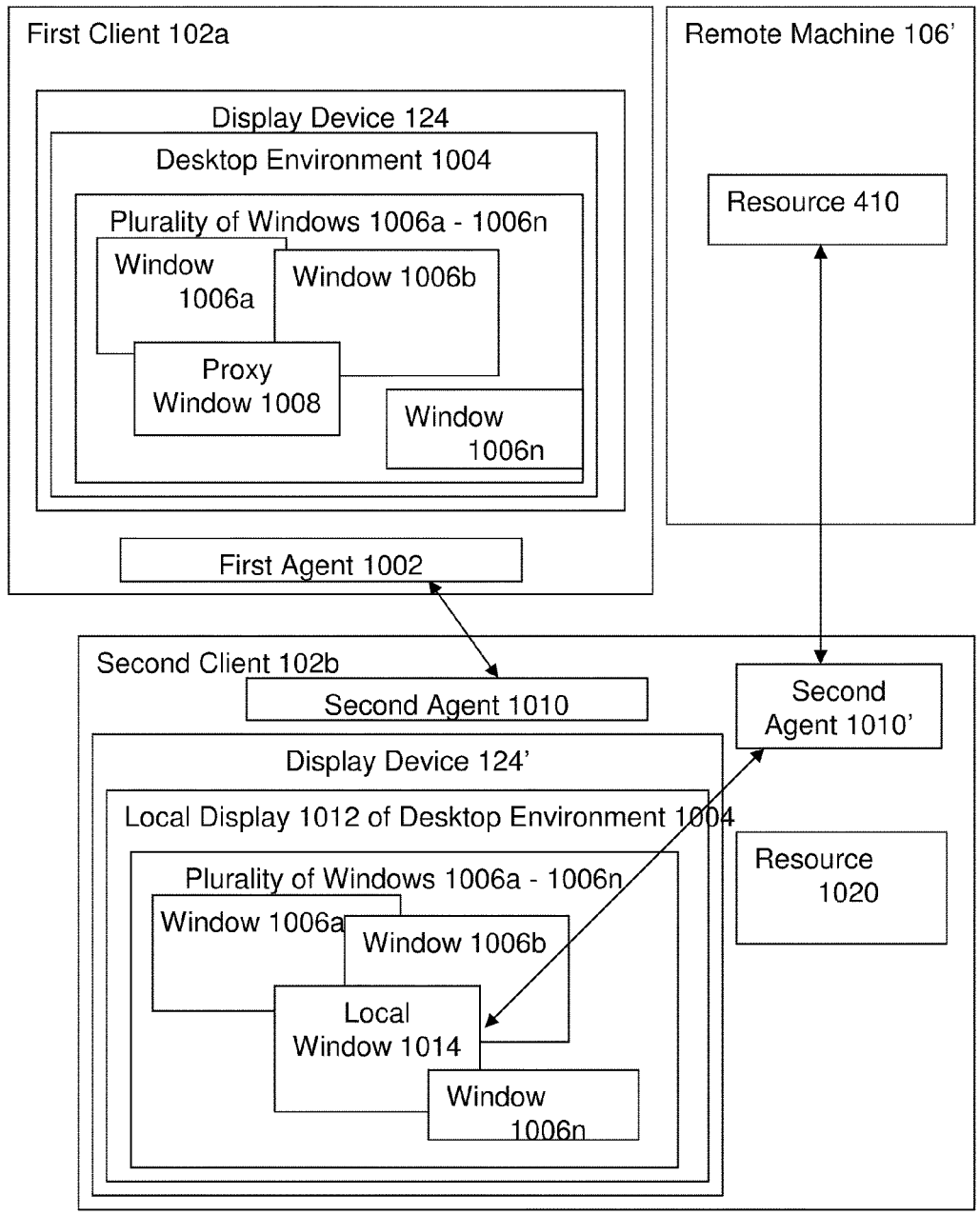
FIG. 12A is a block diagram depicting an embodiment of a system for generating a computing environment incorporating output data from multiple remote machines for display on a local machine.

Referring now to FIG. 12A, a block diagram depicts one embodiment of a system for generating a computing environment on the remote machine for display on the local machine, the computing environment providing integrated access to both resources provided by the local machine and to resources provided by a second remote machine. In brief overview, the system includes a first client 102*a*, a first agent 1002, a second client 102*b*, a second agent 1010, and a remote machine 106'. The first agent 1002 receives an identification of a remote resource 1210 available to a user of the second client 102*b* and provided by the remote machine 106'. The first agent 1002, executing on the first client 102*a*, generates a computing environment 1004, which includes a plurality of windows 1006*a*-206*n* and provides access to i) a resource 1210 available to a user of the second client 102*b* and provided by the remote machine 106', and ii) a resource 1020 provided by the second client 102*b* that is available to the user of the second client 102*b*. The first agent 1002 receives a request for execution of the remote resource 1210 provided by the remote machine 106'. The first agent 1002 directs the second agent 1010 on the second client 102*b* to request execution of the remote resource 1210 provided by the remote machine 106'. The second agent 1010 transmits to the first agent 1002 an identification of a change to a z-order entry of a local window 1014 on the second client 102*b*, the local window 1014 displaying output data generated by the remote resource 1210 provided by the remote machine 106'. The first agent 1002 modifies a z-order entry for a proxy window 1008 representing the local window 1014 in a z-order list on the first client 102*a*, responsive to the identification of the change, the proxy window 1008 having a z-order entry in a z-order list associated with the plurality of windows 1006 in the computing environment 1004.

The second agent 1010 provides access to the computing environment 1004. In some embodiments, establishment of a seamless pass-through presentation layer protocol connection between the computing environment 1004 to the remote machine 106' is requested. In one of these embodiments, a second client agent 1010' is executed on the second client 102*b* to instead establish the connection between the second client 102*b* and the remote machine 106'. In another of these embodiments, the second client agent 1010' looks like a client-side application that is accordingly integrated into the remote desktop by the second agent 1010 and the first agent 1002 using the methods described above in connection with FIGS. 10A, 10B, 11A, and 11B. In one embodiment, the second client agent 1010' is an RDP client. In another embodiment, the second client agent 1010' is an ICA client.

Figure 12B:
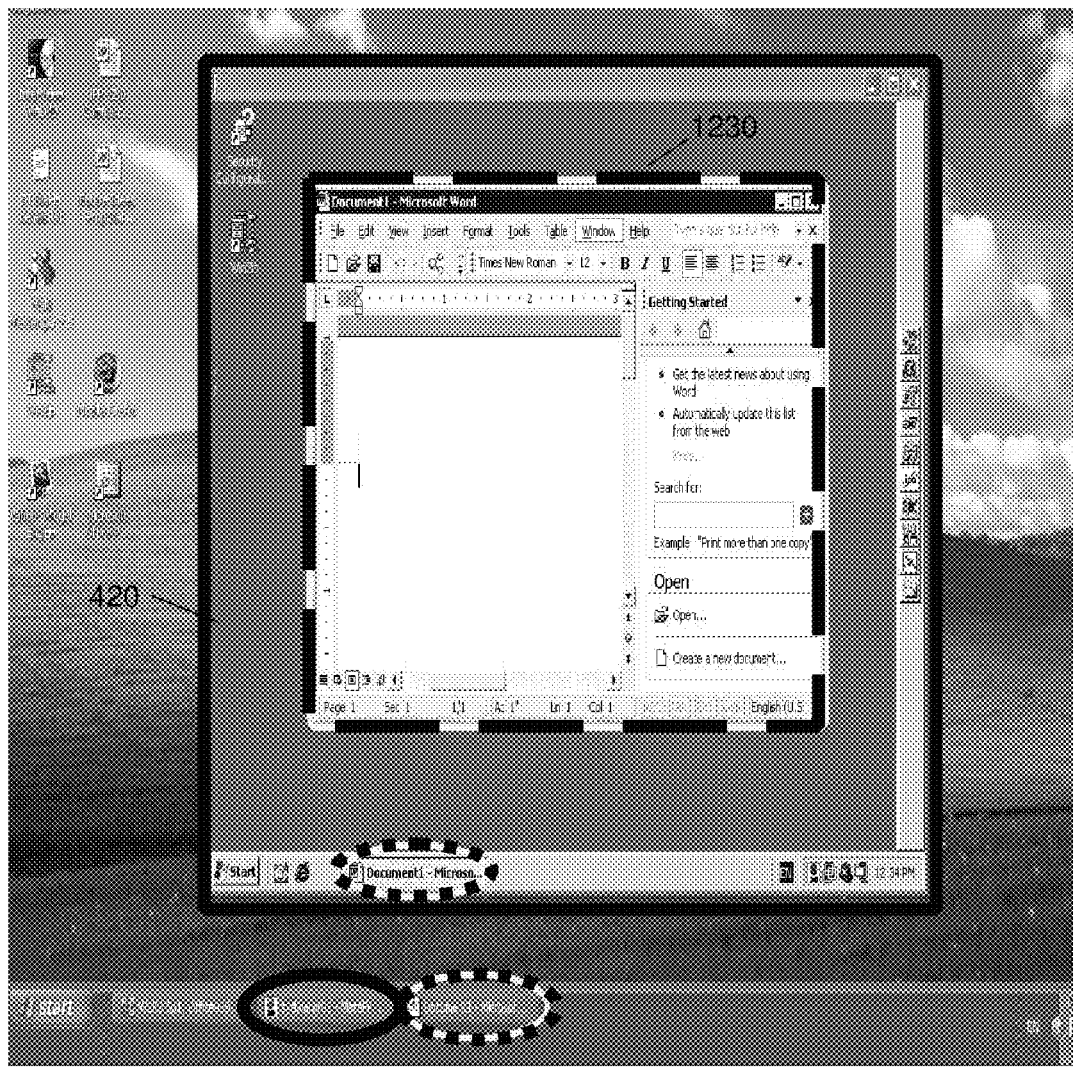
FIG. 12B is a screen shot depicts one embodiment of a system for generating a computing environment incorporating output data from multiple remote machines for display on a local machine.

Referring now to FIG. 12B, a screen shot depicts one embodiment of a system for generating a computing environment on the remote machine for display on the local machine, the computing environment providing integrated access to both resources provided by the local machine and to resources provided by a second remote machine. As depicted in FIG. 12B, two presentation layer protocol sessions are executed on the second client 102*b*. Session 1220, with the bold boundary, is an ICA session providing access to a desktop environment 1004. Session 1230, with the dashed boundary, is an ICA session providing access to a resource (in FIG. 12B, the resource is a word processing program, MICROSOFT WORD). The WORD application window, which is local window 1014, has been merged with the presentation of the desktop session, which is represented by the computing environment 1004. If the first client 102*a* had established the session, the first client 102*a* would have received the output data and would have then forwarded the output data to the second client 102*b* for display. Instead, in this embodiment, the second client 102*b* established the presentation layer protocol session required to access WORD, instead of the first client 102*a* establishing a presentation layer protocol session, and the second client 102*b* receives the output data directly from the remote machine 106.

Figure 13:
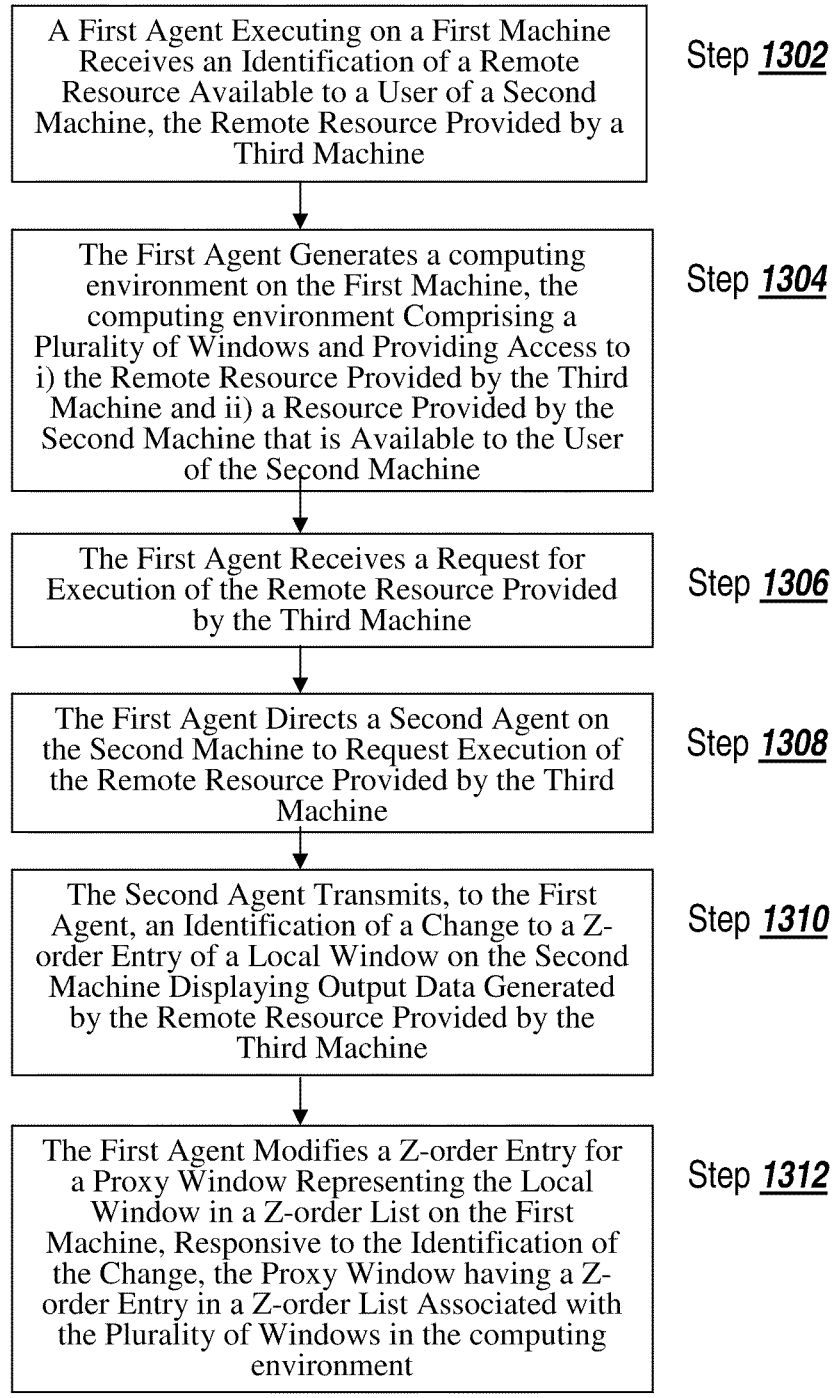
FIG. 13 is a flow diagram depicting one embodiment of a method for generating a computing environment incorporating output data from multiple remote machines for display on a local machine.

Referring now to FIG. 13, a flow diagram depicts one embodiment of the steps taken in a method for generating a computing environment on the remote machine for display on the local machine, the computing environment providing integrated access to both resources provided by the local machine and to resources provided by a second remote machine, includes the step of receiving, by a first agent executing on a first machine, an identification of a remote resource available to a user of a second machine, the remote resource provided by a third machine (step 1302). The first agent monitors a computing environment on the first machine, the computing environment comprising a plurality of windows and providing access to i) the remote resource provided by the third machine and ii) a resource provided by the second machine that is available to the user of the second machine (step 1304). The first agent receives a request for execution of the remote resource provided by the third machine (step 1306). The first agent directs a second agent on the second machine to request execution of the remote resource provided by the third machine (step 1308). The second agent transmits, to the first agent, an identification of a change to a z-order entry of a local window on the second machine displaying output data generated by the remote resource provided by the third machine (step 1310). The first agent modifies a z-order entry for a proxy window representing the local window in a z-order list on the first machine, responsive to the identification of the change, the proxy window having a z-order entry in a z-order list associated with the plurality of windows in the computing environment (step 1312).

Referring now to FIG. 13, and in greater detail, a first agent executing on a first machine receives an identification of a remote resource available to a user of a second machine, the remote resource provided by a third machine (step 1302). In one embodiment, the first agent 1002 receives the identification from the remote machine 106'. In another embodiment, the first agent 1002 receives the identification from the second client 102*b*. In still another embodiment, the first agent 1002 receives the identification from an agent on one of the remote machine 106' and the second client 102*b*. In yet another embodiment, the first agent 1002 receives the identification from a fourth machine 106'''. In one embodiment, a resource 1210 comprises a program, an application, a document, a file, a plurality of applications, a plurality of files, an executable program file, a desktop environment, a computing environment, or other resource made available to a user of the second client 102*b*. The resource 1210 may be delivered to the remote machine 106 via a plurality of access methods including, but not limited to, conventional installation directly on the remote machine 106, delivery to the remote machine 106 via a method for application streaming, or execution from a removable storage device connected to the remote machine 106, such as a USB device.

The first agent monitors a computing environment on the first machine, the computing environment comprising a plurality of windows and providing access to i) the remote resource provided by the third machine and ii) a resource provided by the second machine that is available to the user of the second machine (step 1304). In some embodiments, the first agent monitors the computing environment 1004 as described above in connection with FIGS. 10A, 10B, 11A, and 11B.

The first agent receives a request for execution of the remote resource provided by the third machine (step 1306). In one embodiment, the first agent 1002 receives the request via a communications channel, such as an ICA channel, between the first agent 1002 and the second agent 1010. In another embodiment, the first agent 1002 receives the request when a user of the second client 102b selects a graphical representation of the remote resource 1210 depicted in the local display 1012 of the computing environment 1004. For example, the first agent 1002 may generate a graphical representation of the remote resource 1210, such as an icon, and incorporate the icon into the computing environment 1004 upon receiving the identification of the remote resource 1210 from the remote machine 106'. In still another embodiment, the first agent 1002 receives a request for execution of the remote resource 1210 when a resource executing on one of the first client 102a and the second client 102b attempts to access a resource, such as a file, that requires the execution of the remote resource 1210.

The first agent directs a second agent on the second machine to request execution of the remote resource provided by the third machine (step 1308). In one embodiment, the first agent 1002 directs the second agent 1010 to execute another agent 1010' on the second client 102b and to instruct the second agent 1010' to request execution of the remote resource 1210 provided by the remote machine 106'. In another embodiment, the second agent 1010' is a presentation layer protocol client, such as an ICA or RDP client. In still another embodiment, the second agent 1010' establishes a connection to the remote machine 106' and requests execution of the remote resource 1210. In yet another embodiment, the second agent 1010' receives output data generated by the execution of the remote resource 1210 and displays the output data in the local window 1014. In some embodiments, the second agent 1010 directs the first agent 1002 to request execution of the remote resource 1210 on server 106 upon making a determination the requested resource is unavailable or not executable from the second client 102b.

The second agent transmits, to the first agent, an identification of a change to a z-order entry of a local window on the second machine displaying output data generated by the remote resource provided by the third machine (step 1310). In one embodiment the second agent 1010 transmits the identification of the change to the z-order entry of the local window 1014 to the first agent 1002. In another embodiment the second agent 1010 transmits the identification of the change to the z-order entry of the local window 1014 to the first agent 1002 as described above in connection with FIGS. 10A, 10B, 11A, and 11B.

The first agent modifies a z-order entry for a proxy window representing the local window in a z-order list on the first machine, responsive to the identification of the change, the proxy window having a z-order entry in a z-order list associated with the plurality of windows in the computing environment (step 1312). In some embodiments, the first agent 1002 modifies a z-order entry for a proxy window 1008 as described above in connection with FIGS. 10A, 10B, 11A, and 11B.

In some embodiments, methods and systems described herein provide functionality for addressing limitations on displaying output data on mobile devices, including limitations resulting from the relatively small display form factor and the limited computing capacity. In one of these embodiments, methods and systems are provided for turning the mobile device into an application delivery channel. In another of these embodiments, no changes are required of existing desktop applications to implement these methods and systems, and a wide variety of applications can be accessed on such an application-delivery enabled mobile device.

Referring now to FIG. 14A, a block diagram depicts one embodiment of a system for executing on a mobile computing device a virtual input device for interacting with a resource, wherein output data for the resource is displayed on an external display device. In brief overview, the system includes a mobile computing device 102, a native display 201 on the mobile computing device 102, an external display device 202, and a virtual input device 1402. The mobile computing device 102 executes a first resource 1404. The external display device 202 displays output data generated by the execution of the first resource 1404. The mobile computing device 102 executes a second resource 1406. The second resource 1406 generates a virtual input device 1402. The virtual input device 1402 leverages one or more capabilities of the mobile computing device 102. The virtual input device 1402 allows interaction by a user of the mobile computing device 102 with the display of output data generated by the execution of the first resource 1404.

Referring now to FIG. 14A, and in greater detail, the system includes a mobile computing device 102. In one embodiment, the system is a mobile device 102 as described above in connection with FIGS. 1-13. In another embodiment, the system includes a native display 201 on the mobile computing device 102, an external display device 202, and a virtual input device 1402. The mobile computing device 102 executes a first resource 1404.

The external display device 202 displays output data generated by the execution of the first resource 1404. In one embodiment, the external display device 202 is a monitor. In another embodiment, the external display device 202 is a projector. In still another embodiment, the mobile computing device 102 is connected or attached to an external display device 202, such as a projector that transmits output data to an external display surface. In various embodiments, the external display device 202 may be integrated into the mobile computing device 102. For example, the mobile computing device 102 may include a pico projector, which directs a display of output data generated by a resource executing on the mobile computing device 102 to an external display surface such as a projection screen, wall, or other display surface. In some embodiments, the mobile computing device 102 may include a projection module based on a microelectromechanical system (MEMS), such as, for example and without limitation, a PicoP Display Engine manufactured by Microvision, Inc., of Redmond, Wash.

The mobile computing device 102 executes a second resource 1406, which may be installed on the mobile computing device 102 or delivered to the mobile computing device 102 from a server 106. The second resource 1406 generates a virtual input device 1402 for interaction by a user of the mobile computing device with the display of output data generated by the execution of the first resource. In various embodiments, the mobile computing device 102 may execute the second resource 1406 according to the input needs of the first resource 1404, the input capabilities of the mobile computing device 102, or both. In one embodiment, a virtual input device 1402 includes a graphical representation of a keyboard. In another embodiment, a virtual input device 1402 includes a virtual track pad. In still another embodiment, a virtual input device 1402 includes a virtual pointing device, such as a cursor which may be manipulated by interacting with the virtual input device 1402.

The virtual input device 1402 may be displayed on the native display 201 on the mobile computing device 102. The virtual input device 1402 allows interaction by a user of the mobile computing device 102 with the display of output data generated by the execution of the first resource 1404. In some embodiments, the native display 201 on the mobile computing device 102 includes a touch-screen. In one of these embodiments, a touch-screen sensor includes a touch-responsive surface that detects touch input from a user of the mobile computing device 102. In another of these embodiments, the virtual input device 140 is displayed on the touch-responsive surface. In still another of these embodiments, the touch-screen sensor redirects an identification of a location of the touch input on the touch-responsive surface to an operating system on the mobile computing device 102. In another of these embodiments, the operating system redirects the identification of the location of the touch input to the second resource 1406 for processing. In still another of these embodiments, the second resource 1406 correlates the location of the touch input with a displayed user interaction element. In yet another of these embodiments, the second resource 1406 transmits an identification of a user interaction with the displayed user interaction element to the first resource 1404.

In one embodiment, the virtual input device 1402 includes both a virtual keyboard and a virtual pointing device and interactions with these virtual components are redirected to the mobile device capabilities or to secondary external devices. For example, in another embodiments, mobile devices that have full QWERTY keyboards and cursor positioning buttons or joystick keys can have input received by the virtual keyboard and mouse redirected to those capabilities. In still another embodiment, mobile devices with touch screens can be repurposed as a "soft keyboard" and "soft mouse" and the input received by the virtual keyboard and mouse can be redirected directly to an executing resource. In still even another embodiment, input data received by a mobile device with an externally connected keyboard or mouse can be redirected to the virtual keyboard and mouse.

In some embodiments, a first resource 1404 may also accept input from other devices, such as camera, microphone, point-of-sale (POS) device, etc. In one of these embodiments, a virtual input device 1402 may provide a virtualized version of any such devices and can redirect data communication for these devices. For instance, and in another of these embodiments, if a mobile computing device 102 has a built-in camera, an application displayed on an external display device 202 and accepting input from a camera could be directed to use the mobile device camera. In still another of these embodiments, and by way of example, an application that has audio output could be directed, for example, to the mobile device's speaker or headphone jack.

Referring now to FIG. 14B, a screen shot depicts an embodiment of a mobile computing device 102 displaying a virtual input device 1402 on the native display 201, wherein the virtual input device 1402 permits the user to interact with the output data associated with a resource 1406, such as a word processing application. In this embodiment, the resource 1406 may be executing on the mobile computing device 102. When the mobile computing device 102 is connected to the external display device 202, the window management service 206 may detect the connection and display output data associated with the resource 1406 on the external display device 202 instead of the native display 201 of the mobile computing device 102. In this embodiment, the external display device 202 is a projector that displays the output data on a surface, such as a wall.

In response to output data being transferred to the external display device 202, the mobile computing device 102 may execute a resource that generates a virtual input device 1402. The mobile computing device 102 may evaluate the resource 1406 to determine its input needs. In some embodiments, the mobile computing device 102 may determine that a resource accepts alphanumeric input, audio input, video input, or any other type of input or combinations thereof. In this embodiment, the resource 1402 is a word processing application that needs at least alphanumeric input. In response, the mobile computing device 102 executes a resource to generate a virtual or "soft" keyboard for a virtual input device 1402. The virtual keyboard may be displayed on the native display 201, such as a touch-screen. The touch-screen may detect user interactions and redirect information associated with the user interactions to the virtual input device 1402. The virtual input device 1402 may communicate the resources to the resource 1402.

Referring now to FIG. 14C, a screen shot depicts an embodiment of a mobile computing device displaying a virtual input device 1402 for interaction by a user with a display of output data associated with a resource. In this embodiment, the mobile computing device 102 executes a resource to generate at least a virtual trackpad. The virtual trackpad may be displayed on the native display 201, such as a touch-screen, of the mobile computing device 102. When the touch-screen detects a user interaction, the touch-screen may redirect information associated with the user interaction to the resource generating the virtual input device 1402. The virtual input device 1402 may process the information and determine a user command. The virtual input device 1402 may communicate the user command to the resource being displayed on an external display device (not shown), and the resource being displayed may output data corresponding to the user command.

The embodiment in FIG. 14C also depicts a virtual input device 1402 that repurposes a keyboard on the mobile computing device 102 for the resource being displayed on an external display device. In this embodiment, the mobile computing device 102 displays a keyboard generated by an application installed on the device. The touch-screen may detect a user interaction and transmit information associated with the user interaction to the keyboard application. The keyboard application may interpret the user interaction to determine a user command, such as entering or deleting alphanumeric characters. The keyboard application may communicate the user command to the virtual input device 1402, which may transmit information about the user command to the resource whose output data is being displayed on an external display device. In various embodiments, one resource may generate a virtual trackpad and another resource may repurpose the keyboard on the mobile computing device 102. In other embodiments, the same resource may generate a virtual input device 1402 that generates the virtual trackpad and repurposes the keyboard.

Referring now to FIG. 15, a flow diagram depicts one embodiment of a method for displaying, on a screen of a mobile computing device, a virtual input device for interacting with a resource generating output data displayed on a display surface external to the mobile computing device. The method includes executing, by a mobile computing device, a first resource (1502). The method includes directing a display, on an external display device, of output data generated by the executing first resource (1504). The method includes executing, on the mobile computing device, a second resource generating a virtual input device (1506). The method includes displaying, on a screen of the mobile computing device, the virtual input device (1508). The method includes transmitting, by the second resource to the first resource, an indication of an interaction by a user of the mobile computing device with the virtual input device (1510). In some embodiments, the mobile device 102 is repurposed as a virtual input device that transmits user input to either a locally-executing application or, via presentation-layer protocols, to a remotely-executing application.

Referring now to FIG. 15, and in greater detail, a mobile computing device 102 executes a first resource (1502). In one embodiment, the mobile computing device 102 executes an application generating output data for display to a user of the mobile computing device. In some embodiments, the first resource requests, from a remote computing device, execution of a remotely-located resource. In one of these embodiments, a first resource communicates with the remote computing device according to a presentation layer protocol, for example, by communicating via the ICA protocol, or the RDP protocol. In another of these embodiments, the first resource directs the display of remotely-generated output data on a display device associated with the mobile computing device. In other embodiments, the first resource is stored on the mobile computing device, executes locally, and directs the display of locally-generated output data on a display device associated with the mobile computing device.

A display, by an external display device, of output data generated by the executing first resource is directed (1504). In one embodiment, a window management service directs the display of output data to the external display device 124b. In one embodiment, an operating system executing on the mobile computing device 102 and in communication with the external display device 124b directs the display of output data to the external display device 124b. In another embodiment, the external display device projects the output data to an external display surface, such as a wall, screen, or other surface. In still another embodiment, the display of the output data occurs without modification to the output data generated by the execution of the first resource. In some embodiments, the output data is rendered on a secondary physical display, such as an embedded or external micro projector, heads-up display, laptop, HDTV, or other display. In one of these embodiments, displayed output from the first resource is shown via the secondary display and is, therefore, not limited to only the display capabilities of the mobile computing device display.

The mobile computing device executes a second resource generating a virtual input device (1506). In one embodiment, the second resource communicates with the first resource. In another embodiment, the second resource identifies a type of virtual input device to display; for example, the second resource may select a type of virtual input device to display based on a type of interaction supported by the first resource.

The virtual input device is displayed on a screen of the mobile computing device (1508). In one embodiment, the virtual input device is displayed in conjunction with an existing virtual input device; for example, the mobile computing device may display a virtual (or "soft") keyboard and the second resource may generate a second virtual input device, such as a virtual trackpad displayed in conjunction with the virtual keyboard. In another embodiment, the second resource may generate a customized virtual input device displayed on the mobile computing device in place of the display of output data generated by the first resource. In still another embodiment, the display of the output data generated by the first resource is separated from the display of the virtual input device, instead of combined into a singled display surface, such as either an internal or an external display device.

The second resource transmits, to the first resource, an indication of an interaction by a user of the mobile computing device with the virtual input device (1510). In some embodiments, the second resource communicates with the first resource, allowing a user to interact with the first resource via the virtual input device generated by the second resource and displayed on a separate display device than the first resource.

In one embodiment, the first resource is a client application executing on the mobile computing device 102 and communicating with a remote computing device 106 according to a presentation layer protocol. In another embodiment, the first resource requests execution of a remote resource by the remote computing device. In still another embodiment, the first resource receives, from the remote computing device, output data generated by an execution of the remote resource on the remote computing device. In still even another embodiment, the first resource transmits, to the remote computing device, execution of a remote resource, and receives, from a second remote computing device, output data generated by an execution of the remote resource on the second remote computing device. In yet another embodiment, the mobile computing device directs a display of the remotely-generated output data on the external display device.

In some embodiments, the methods and systems described herein provide functionality for smart translation of user interaction with endpoint devices. In one of these embodiments, methods and systems are provided for translating a user interaction with an endpoint device into a command for processing by a remotely-executing resource. In another of these embodiments, for example, a resource may execute on a first computing device and generate output data that is displayed on a second computing device, which may be referred to as an endpoint device; a user interaction with the endpoint device may be translated into a command that is transmitted to the resource on the first computing device for processing.

In some embodiments, a resource executing on a first computing device provides a user interface allowing a user to interact with output data generated by a resource. In one of these embodiments, for example, output data may include one or more graphical user interface elements, such as a cursor or a scroll bar, displayed with data, such as the text in a word processing application or an image in an image viewing or editing software, and the graphical user interface elements provide a mechanism by which a user of the resource may interact with data generated by the resource. In another of these embodiments, the type of user interface varies based upon the computing environment from which the user views the output data. As described above, a first type of user interface may be provided when a user accesses output data from a mobile computing device and a second type of user interface may be provided when a user accesses output data from a different type of computing device, such as a laptop, or when the user has access to a different type of display device.

In some embodiments, methods for interacting with a user interface are different across different user interfaces—for example, users may access a pointing device (such as a mouse) to manipulate an image of a cursor on a screen in order to interact with a graphical user interface element, or users may interact with a touch screen on a display device and use their fingers to tap on or drag graphical user interface elements from one portion of the display to another. In other embodiments, a method for interacting with a first type of user interface (for example, connecting a mouse to a computing device and using the mouse to control a cursor shown on a display device to interact with the first type of user interface) does not work when applied to a second type of user interface (for example, if a second type of user interface accepts as input a user touch to a screen, the second type of user interface may not provide functionality for displaying a cursor or for accepting input from a pointing device); even if the method does work, it may be a suboptimal method for interacting with the second type of user interface or it may only provide limited functionality for interacting with the second type of user interface. In one of these embodiments, a first type of user interface may be preferable for use on a first type of computing device—for example, a user interface that supports a user entering commands by touching a screen may be better suited for use on a computing device that includes a touch screen than on one that does not. In still other embodiments, a remotely-executing application generates and displays a first type of user interface intended for access via a first type of computing device but which is displayed to a user accessing the user interface from a second type of computing device. For example, a user may access a first type of user interface that was designed for access from a computing device including a pointing device from a computing device that includes a touch screen but not a pointing device.

In some embodiments, the methods and systems described herein provide functionality for translating input of a first type into a second type. In one of these embodiments, input provided by a user via a first type of interface is translated into a command that a second type of interface can process. In another of these embodiments, and by way of example, a user may view data including a user interface displaying interface elements such as a scroll bar and accepting input commands from the user via a pointing device; however, the user may enter a command via a touch screen and the command is translated into a format that the user interface can process. In still another of these embodiments, and as another example, a user viewing a first section of data may have requested a display of a second section of data, for example by using a touch screen to scroll through the data; the command to scroll from the first section of data to the second may be translated into a command to select a graphical user interface element for scrolling down (such as an arrow in a scroll bar) and transmitted to the resource generating the data. In yet another of these embodiments, implementation of this functionality allows a user of a first type of computing device to interact with a display of a first type of user interface using a second type of user interface element optimized for use on the first type of computing device.

Referring now to FIG. 16, a flow diagram depicts one embodiment of a method for translating a user interaction with an input/output device of a first type into a command for processing by a user interface supporting interaction with an input/output device of a second type. In brief overview, the method includes providing an input/output device of a first type for interaction with a user interface of a first type (1602). The method includes identifying a user interaction with a user interface of a second type via the input/output device of the first type (1604). The method includes generating, responsive to the identified user interaction, a command formatted for processing by the user interface of the second type according to a protocol for interacting with an input/output device of a second type (1606). The method includes processing the command by the user interface of the second type (1608).

Referring now to FIG. 16, and in greater detail, an input/output device of a first type is provided for interaction with a user interface of a first type (1602). In one embodiment, the input/output device of the first type is a touch screen. In another embodiment, the user interface of the first type includes functionality for processing touch screen-based interactions with user interface elements displayed by the user interface of the first type. In still another embodiment, the input/output device of the first type is an input/output device such as a keyboard or pointing device. In still even another embodiment, the user interface of the first type includes a graphical element (such as a cursor) displayed to a user and with which the user interacts via the input/output device of the first type. In yet another embodiment, the user interface of the first type provides functionality for processing interactions with the graphical element received via input/output devices such as keyboards or pointing devices.

In some embodiments, a user interface of a second type is displayed to a user. In one of these embodiments, a user of a mobile computing device 102 views a user interface of the second type generated by a resource executing on the mobile computing device 102. In another of these embodiments, a user of a mobile computing device 102 views a user interface of the second type generated by a resource executing on a remote computing device 106. In still another of these embodiments, the user interface of the second type does not include functionality for processing user input generated by user interactions with the input/output device of the first type. In yet another of these embodiments, and by way of example, a user interface of the second type may be a windowing environment that displays widgets such as pull-down menus, scroll bars, and task bars and that includes functionality for processing user input generated by a user interaction with a pointing device or keyboard (e.g., a user clicking on a scroll bar with a mouse), but may not include functionality for processing user input generated by a user interaction with a touch screen.

A user interaction with a user interface of a second type via the input/output device of the first type is identified (1604). In one embodiment, an interaction management component identifies the user interaction. In another embodiment, the user interaction is transmitted to an interaction management component for processing. In an embodiment in which the input/output device of the first type is a touch screen, a user may touch the screen of a mobile computing device in an attempt to manipulate data displayed by the user interface of the second type, such as a windowing environment displaying a pull-down menu.

A command is generated responsive to the identified user interaction, the command formatted for processing by the user interface of the second type according to a protocol for interacting with an input/output device of a second type (1606). In one embodiment, an interaction management component accesses a mapping, table, or other data structure storing configuration data to generate the command. In another embodiment, the interaction management component analyzes the user interaction with input/output device of the first type to identify a request or command intended by the user interaction; for example, the interaction management component may determine that a user touching a section of a touch screen intending to request access to data or to generate a command to modify an existing display of data. In still another embodiment, the interaction management component generates a type of command that is typically a result of a user interaction with the user interface of the second type. In yet another embodiment, and by way of example, the interaction management component determines that a user has interacted with a touch screen in order to request a modification of an existing display of data and the interaction management component generates a command equivalent to a command that would have been generated if the user had accessed an input/output device such as a mouse to select a graphical user interface element.

The command is processed by the user interface of the second type (1608). In one embodiment, the interaction management component transmits the command to a resource generating the user interface of the second type. In another embodiment, the interaction management component transmits the command to a resource executing on the mobile computing device 102. In another embodiment, the interaction management component transmits the command to a resource executing on a second computing device 106.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for displaying and activating disconnected application sessions, it will now become apparent to one of skill in the art that other embodiments incorporating the concepts of the invention may be used. Therefore, the invention should not be limited to certain embodiments.

What is claimed is:

1. A method of repurposing a mobile computing device as a virtual input device for a first resource being displayed on an external display device comprising:
   displaying, by a mobile computing device, on a display of the mobile computing device, output data for a first resource executing on the mobile computing device;
   determining, by the mobile computing device, that an external display device has been connected to the mobile computing device;
   displaying, by the mobile computing device, on the external display device output data for the first resource executing on the mobile device, responsive to the determination;
   transmitting, by the mobile computing device to a server, data indicating input capabilities of the mobile computing device and input requirements of the first resource;
   receiving, by the mobile computing device from the server, a second resource executable by the mobile computing device to repurpose the mobile computing device as a first virtual input device for the first resource, the second resource selected by the server responsive to an identification by the server of the input capabilities of the mobile computing device and input requirements of the first resource;
   executing, by the mobile computing device, the second resource to repurpose the mobile computing device as the first virtual input device for the first resource executing on the mobile device; and
   delivering, by the server to the mobile computing device, a third resource that generates a second virtual input device in conjunction with the first virtual input device of the second resource.

2. The method of claim 1, further comprising delivering, by the server to the mobile computing device, the second resource that generates a virtual keyboard, virtual track pad, virtual pointing device, virtual camera, virtual microphone, virtual point-of-sale device, virtual speaker, virtual headphone jack, or any combination thereof.

3. The method of claim 1, further comprising delivering, by the server to the mobile computing device, the second resource that allows user interaction with output data of the first resource.

4. The method of claim 1, further comprising delivering, by the server to the mobile computing device, the second resource that transmits an identification of a user interaction with at least one of the first virtual input device or the second virtual input device to the first resource.

5. The method of claim 1, further comprising delivering, by the server to the mobile computing device, the second resource that generates at least one user interaction element.

6. The method of claim 1, further comprising delivering, by the server to the mobile computing device, the second resource that redirects user interactions with at least one of the first virtual input device or the second virtual input device to the input capabilities of the mobile computing device.

7. The method of claim 1, further comprising delivering, by the server to the mobile computing device, the second resource that correlates a location of a touch input with a displayed user interaction element.

8. The method of claim 1, further comprising delivering, by the server to the mobile computing device, the second resource for display in conjunction with the first resource on a single display surface.

9. The method of claim 1, further comprising delivering, by the server to the mobile computing device, the second resource that generates a third virtual input device for a second external device connected to the mobile computing device.

10. A system for repurposing a mobile computing device as a virtual input device for a first resource being displayed on an external display device comprising:
    an external display device;
    a mobile computing device;
    a server;
    a client agent executing on the mobile computing device to:
       display on a display of the mobile computing device, output data for a first resource executing on the mobile computing device,
       determine that the external display device has been connected to the mobile computing device,
       display on the external display device output data for a first resource executing on the mobile device, responsive to the determination; and
    a server agent executing on the server to:
       receive data indicating input capabilities of the mobile computing device and data indicating input requirements of the first resource;
       identify, responsive to the input capabilities of the mobile computing device and input requirements of the first resource a second resource to repurpose the mobile computing device as a first virtual input device for the first resource;
       transmit to the mobile computing device the second resource;
       delivers a third resource that generates a second virtual input device in conjunction with the first virtual input device of the second resource; and
    wherein the mobile computing device executes the second resource to repurpose the mobile computing device as the first virtual input device for the first resource executing on the mobile device.

11. The system of claim 10, wherein the second resource generates a virtual keyboard, virtual track pad, virtual pointing device, virtual camera, virtual microphone, virtual point-of-sale device, virtual speaker, virtual headphone jack, or any combination thereof.

12. The system of claim 10, wherein the second resource allows user interaction with output data of the first resource.

13. The system of claim 10, wherein the second resource transmits an identification of a user interaction with at least one of the first virtual input device or the second virtual input device to the first resource.

14. The system of claim 10, wherein the second resource generates at least one user interaction element.

15. The system of claim 10, wherein the second resource redirects user interactions with at least one of the first virtual input device or the second virtual input device to the input capabilities of the mobile computing device.

16. The system of claim 10, wherein the second resource correlates a location of a touch input with a displayed user interaction element.

17. The system of claim 10, wherein the second resource is displayed in conjunction with the first resource on a single display surface.

18. The system of claim 10, wherein the second resource generates a third virtual input device for a second external device connected to the mobile computing device.

19. A method of repurposing a mobile computing device as a virtual input device for a first resource being displayed on an external display device comprising:

displaying, by a mobile computing device, on a display of the mobile computing device, output data for a first resource executing on the mobile computing device;

determining, by the mobile computing device, that an external display device has been connected to the mobile computing device;

displaying, by the mobile computing device, output data for the first resource executing on the mobile device, on the external display device, responsive to the determination;

transmitting, by the mobile computing device to a server, data indicating input capabilities of the mobile computing device and input requirements of the first resource;

receiving, by the mobile computing device from the server, a second resource executable by the mobile computing device to generate a first virtual input device displayed on the display of the mobile computing device for the first resource, the second resource selected by the server responsive to an identification by the server of the input capabilities of the mobile computing device and input requirements of the first resource;

executing, by the mobile computing device, the second resource to generate a first virtual input device displayed on the display of the mobile computing device, responsive to the determination;

delivering, by the server to the mobile computing device, a third resource that generates a second virtual input device in conjunction with the first virtual input device of the second resource; and transmitting, by the second resource to the first resource, a user interaction with at least one of the first virtual input device or the second virtual input device.

20. The method of claim 1, further comprising selecting, by the mobile computing device, a type of virtual input to display using the second resource based on a type of interaction supported by the first resource.

* * * * *